United States Patent
Deluliis et al.

(10) Patent No.: US 9,691,266 B2
(45) Date of Patent: Jun. 27, 2017

(54) SMART HAZARD DETECTOR DRILLS

(71) Applicant: Google Inc., Mountain View, CA (US)

(72) Inventors: Julia R. Deluliis, Boston, MA (US); David Sloo, Menlo Park, CA (US); Ted S. Boda, San Jose, CA (US); Anthony M. Fadell, Woodside, CA (US)

(73) Assignee: GOOGLE INC., Mountain View, CA (US)

( * ) Notice: Subject to any disclaimer, the term of this patent is extended or adjusted under 35 U.S.C. 154(b) by 90 days.

(21) Appl. No.: 14/680,029

(22) Filed: Apr. 6, 2015

(65) Prior Publication Data

US 2015/0287310 A1 Oct. 8, 2015

Related U.S. Application Data

(60) Provisional application No. 61/976,453, filed on Apr. 7, 2014.

(51) Int. Cl.
| | |
|---|---|
| *G08B 17/10* | (2006.01) |
| *G08B 29/14* | (2006.01) |
| *H04W 4/22* | (2009.01) |
| *G08B 21/10* | (2006.01) |
| *G08B 25/10* | (2006.01) |
| *G08B 29/18* | (2006.01) |
| *G08B 29/24* | (2006.01) |
| *G08B 17/113* | (2006.01) |

(52) U.S. Cl.
CPC ............. *G08B 29/14* (2013.01); *G08B 17/10* (2013.01); *G08B 21/10* (2013.01); *G08B 25/10* (2013.01); *G08B 29/188* (2013.01); *G08B 29/24* (2013.01); *H04W 4/22* (2013.01); *G08B 17/113* (2013.01)

(58) Field of Classification Search
CPC .......... H04W 4/02; H04W 4/22; G08B 7/066; G08B 25/14; G08B 29/14; G08B 17/10; G08B 21/10; G08B 25/10
USPC ................................ 340/628, 506; 455/404.1
See application file for complete search history.

(56) References Cited

U.S. PATENT DOCUMENTS

| | | | | |
|---|---|---|---|---|
| 7,221,928 | B2* | 5/2007 | Laird | H04W 4/02 455/404.1 |
| 7,579,945 | B1* | 8/2009 | Richter | G08B 7/066 340/506 |
| 2003/0135324 | A1* | 7/2003 | Navab | G01C 21/00 701/515 |
| 2009/0079575 | A1* | 3/2009 | Bouressa | G07C 9/00111 340/573.4 |
| 2009/0138353 | A1* | 5/2009 | Mendelson | H04W 4/04 455/404.2 |
| 2009/0247116 | A1* | 10/2009 | Sennett | H04W 4/02 455/404.2 |

(Continued)

OTHER PUBLICATIONS

International Partial Search Report for International Application No. PCT/US2015/024744 dated Jul. 6, 2015; 8 pgs.

*Primary Examiner* — John A Tweel, Jr.
(74) *Attorney, Agent, or Firm* — Van Court & Aldridge LLP

(57) ABSTRACT

Systems and methods for initiating a drill by receiving an indication to start a drill. The indication to start the drill is received via a first network interface having a first network interface type. The drill is propagated to other devices in a network via a second network interface having a second network interface type.

20 Claims, 29 Drawing Sheets

(56) References Cited

U.S. PATENT DOCUMENTS

2011/0161239 A1 6/2011 Muehlmeier et al.
2011/0241877 A1 10/2011 Wedig et al.

* cited by examiner

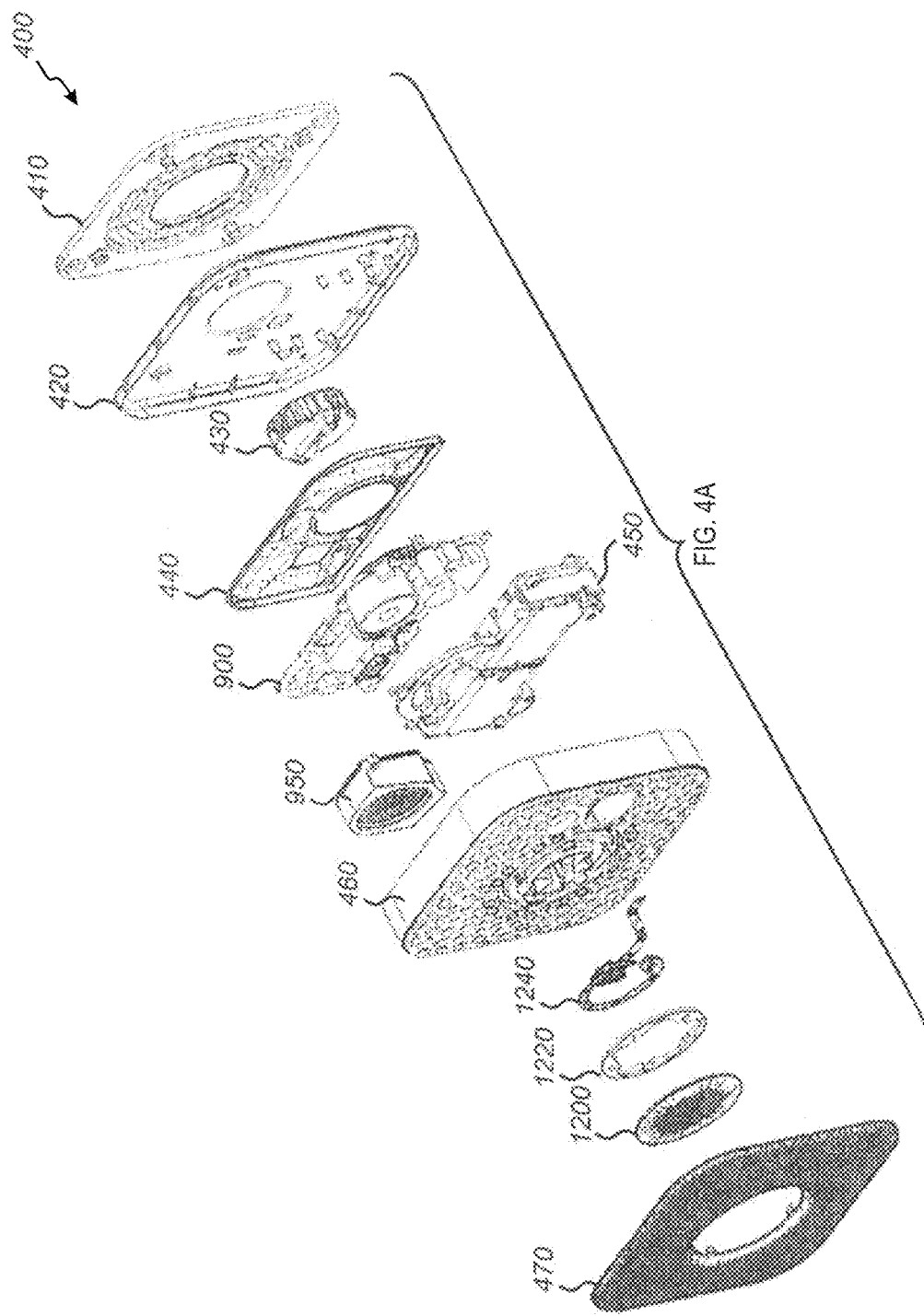

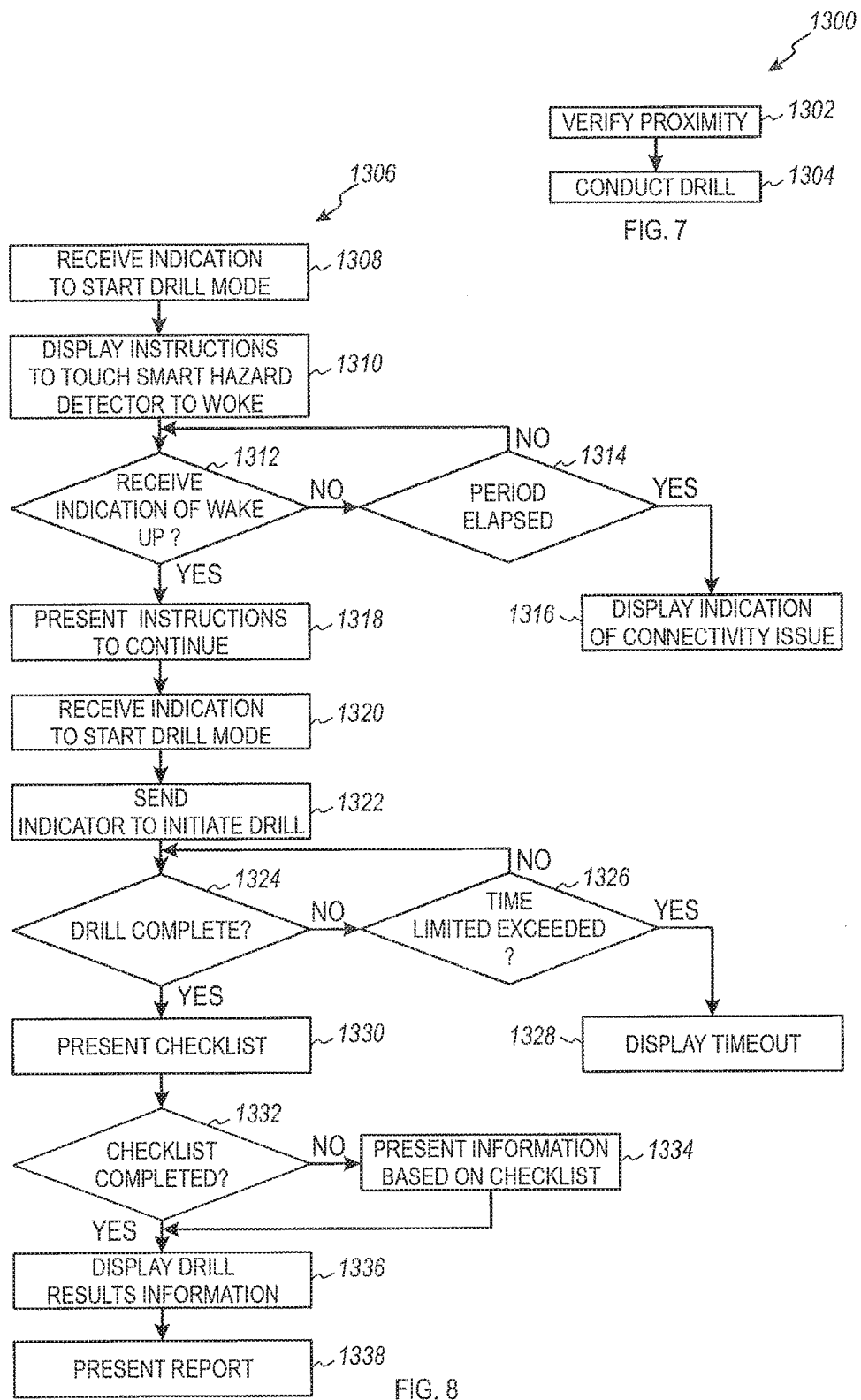

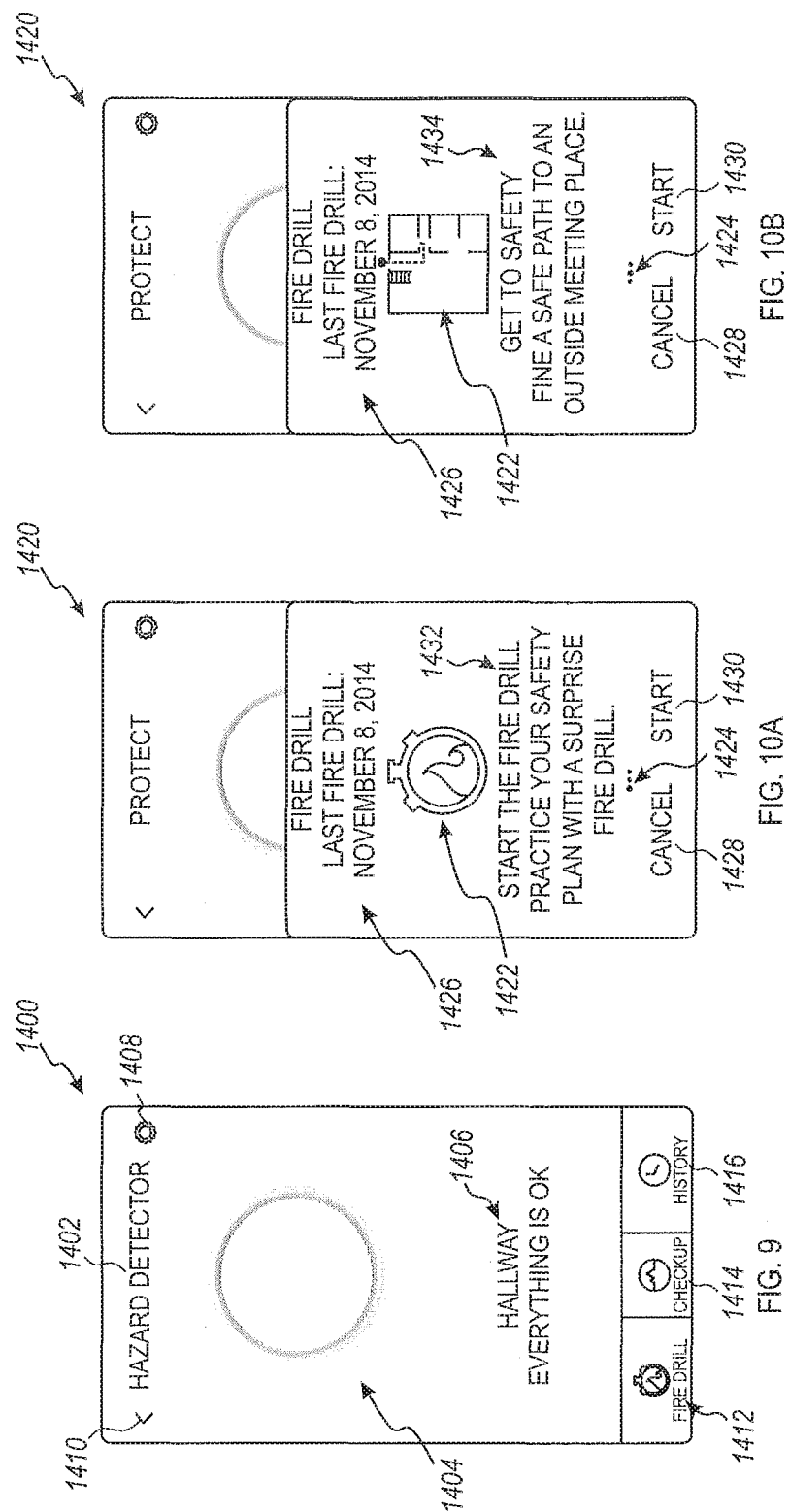

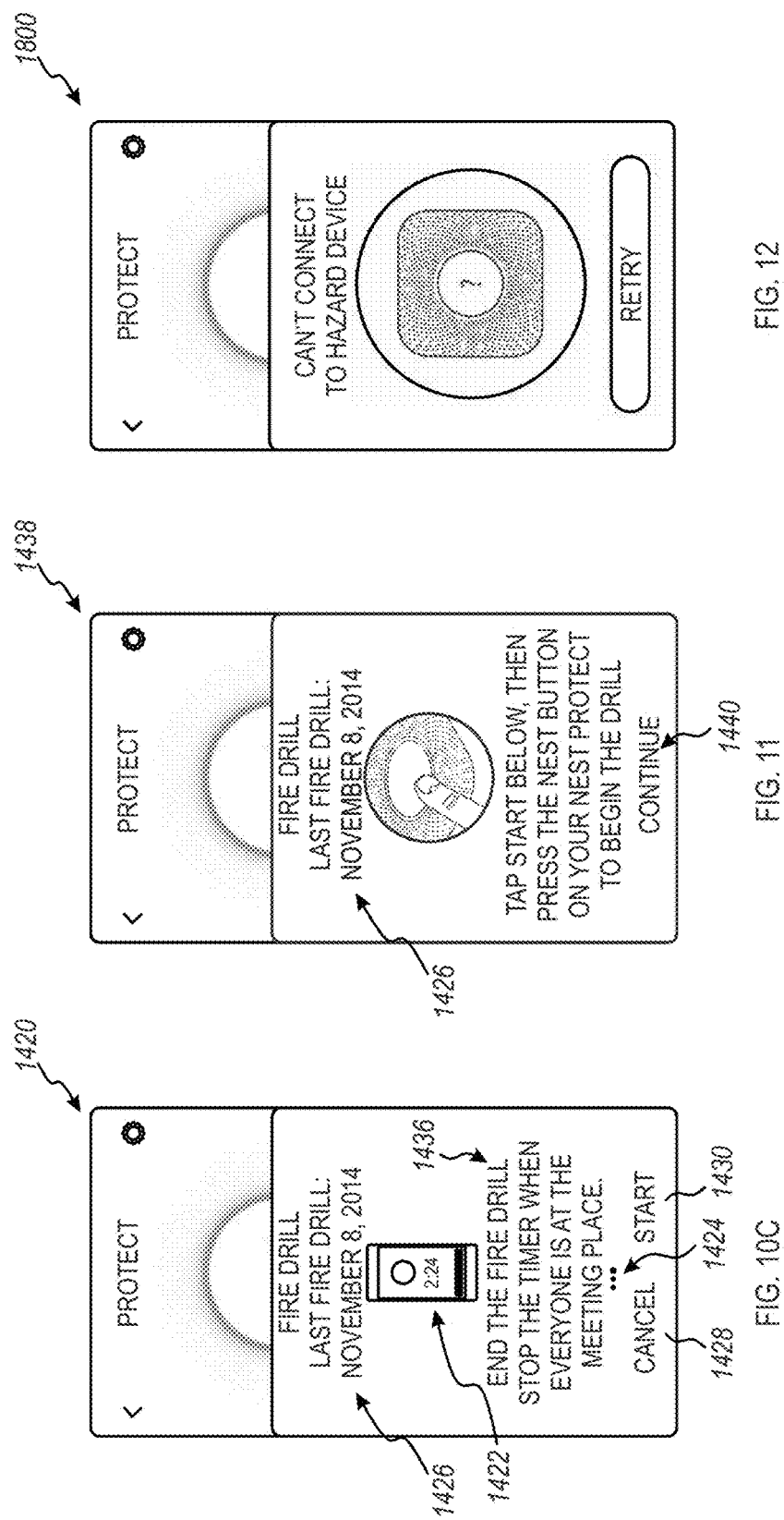

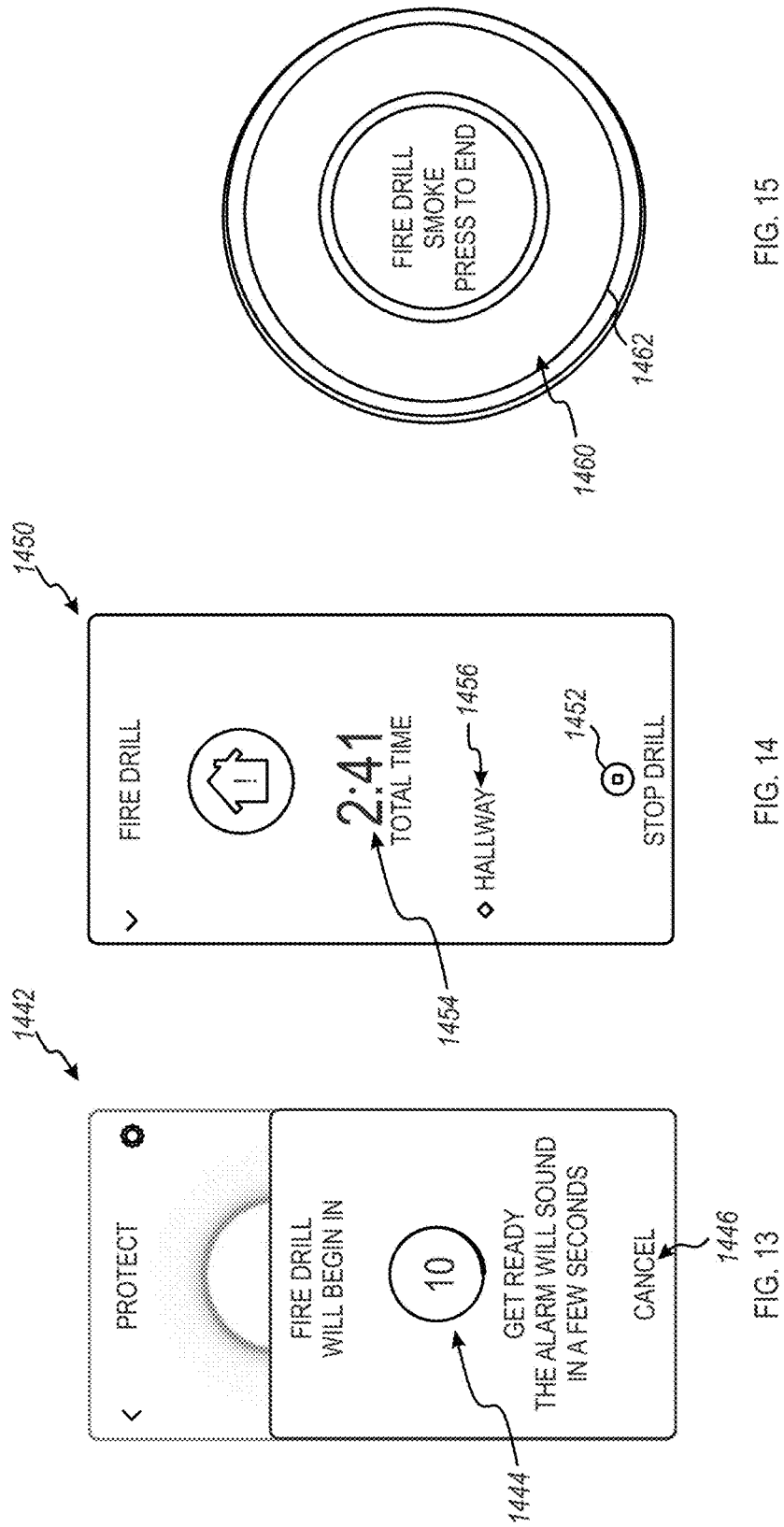

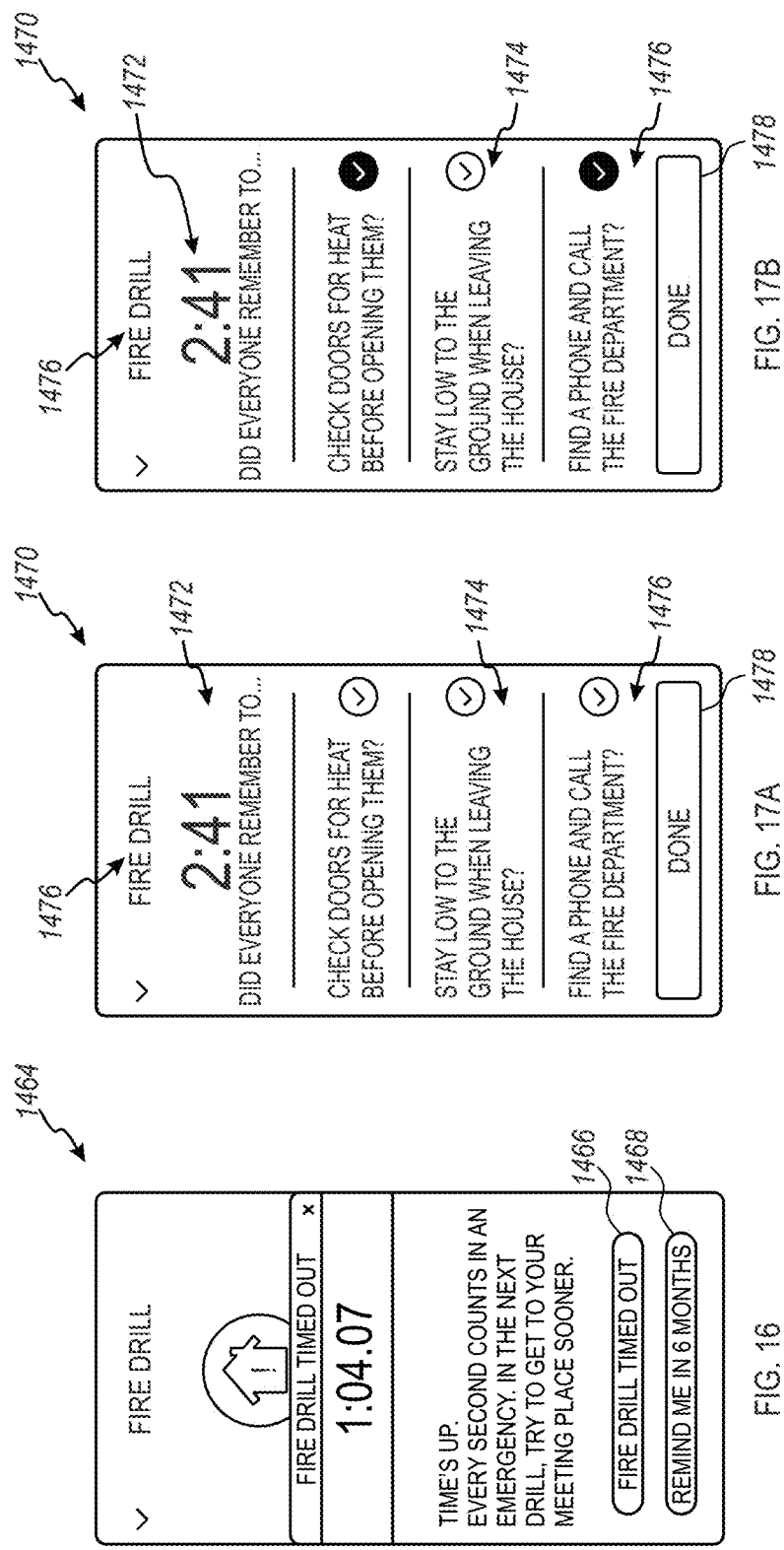

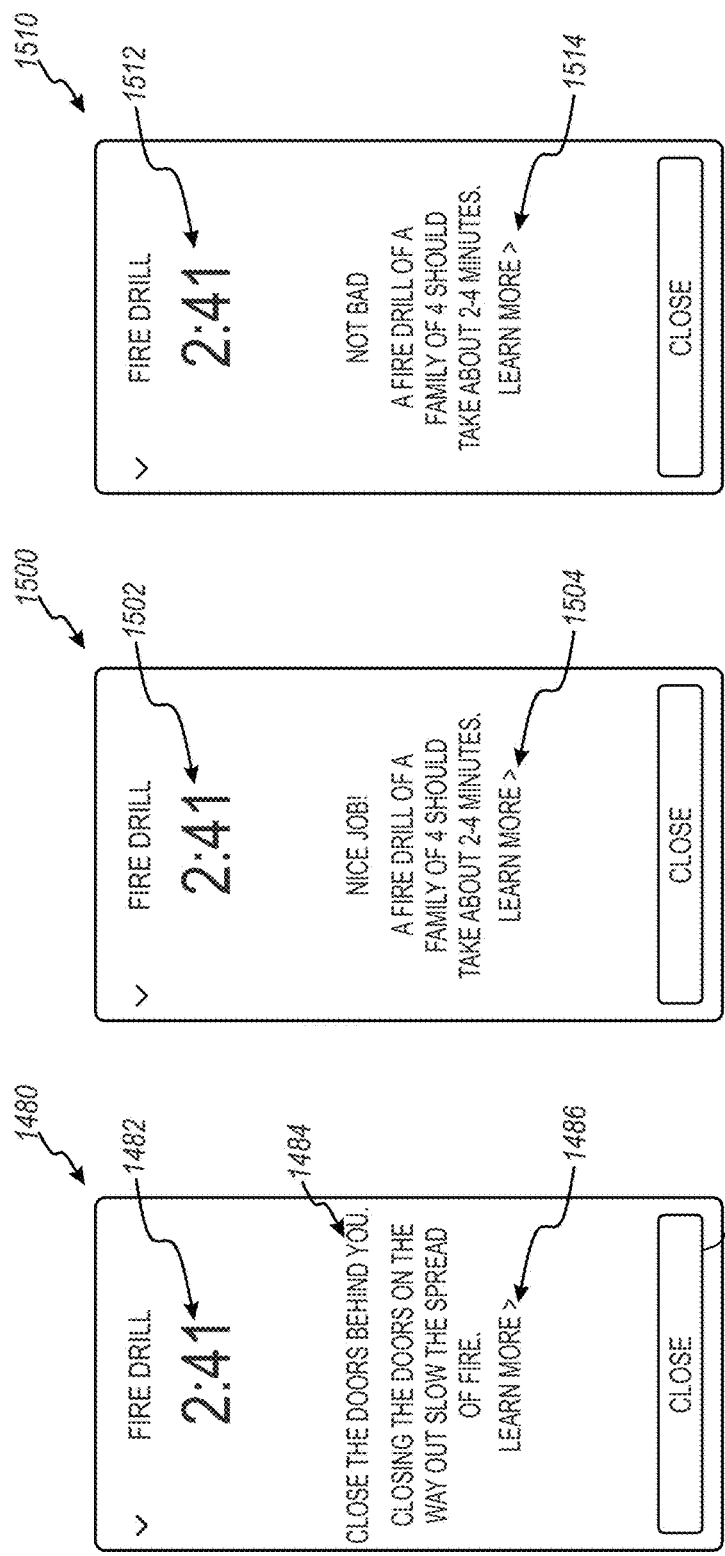

FIG. 39
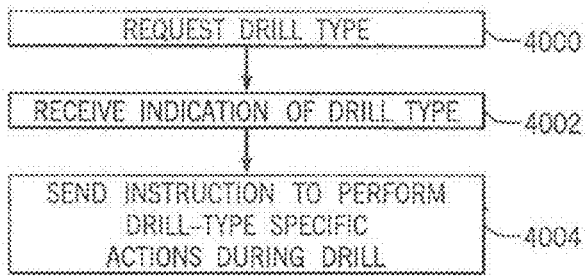
FIG. 40
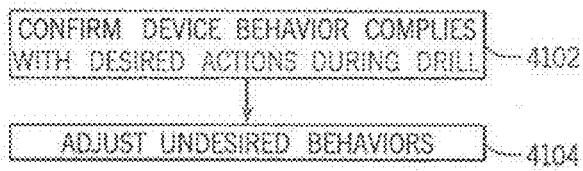
FIG. 41

SMART HAZARD DETECTOR DRILLS

CROSS-REFERENCE TO RELATED APPLICATIONS

This application claims the benefit of Provisional Application Ser. No. 61/976,453, filed Apr. 7, 2015, entitled "Smart Hazard Detector Drills," which is incorporated by reference herein in its entirety.

BACKGROUND OF THE DISCLOSURE

This disclosure relates to systems, devices, methods, and related computer program products for smart buildings including the smart home. More particularly, this patent specification relates to detection units, such as hazard detection units (e.g., smoke detectors. carbon monoxide sensors, etc.) or other monitoring devices, that are useful in smart building and smart home environments and drills to prepare for an actual emergency.

Some homes today are equipped with smart home networks to provide automated control of devices, appliances and systems, such as heating, ventilation, and air conditioning ("HVAC") systems, lighting systems, alarm systems, and home theater and entertainment systems. Smart home networks may include control panels that a person may use to input settings, preferences, and scheduling information that the smart home network uses to provide automated control the various devices, appliances and systems in the home. For example, a person may input a desired temperature and a schedule indicating when the person is away from home. The home automation system uses this information to control the HVAC system to heat or cool the home to the desired temperature when the person is home, and to conserve energy by turning off power-consuming components of the HVAC system when the person is away from the home. Also, for example, a person may input a preferred nighttime lighting scheme for watching television. In response, when the person turns on the television at nighttime, the home automation system automatically adjusts the lighting in the room to the preferred scheme.

BRIEF SUMMARY OF THE DISCLOSURE

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the present disclosure provide methods and systems for facilitating the provisioning, set-up, configuration, control, and/or management of intelligent, network-connected, multi-sensing hazard detection units or smart hazard detectors. These smart hazard detectors may be used within a home, building, or structure to warn occupants of the home, building, or structure of a potential danger. A "pairing" of these network-connected smart hazard detectors and a user account on a cloud-based smart hazard detector management system or an online management account may be accomplished in a manner that reduces or minimizes an amount of user effort involved. After one of these smart hazard detectors is paired with an online management account using a first wireless protocol, another smart hazard detector may communicate with the paired smart hazard detector using a second wireless protocol in order to receive instructions for pairing with the online management account. These smart hazard detectors may perform a variety of functions, such as drilling emergency situations.

According to some embodiments, the smart hazard detectors may be used to drill via various emergency situation emulations to instill proper behavior of individuals and/or devices during an actual emergency. In certain embodiments, a user may activate a drill mode either substantially instantaneously when an initiating device is proximal to one or more smart hazard detectors or in the future using a scheduling function. Moreover, when scheduling or initiating a drill, the user may select various features (e.g., alarm type or location) to be used during implementation of the alarm.

In certain embodiments, the drills may be used in a social reporting scheme such that completed drills may result in positive rewards. In some embodiments, the occurrence of a drill may be shared with others, such as posting a photograph via social media sites. Furthermore, in some embodiments, game information or rewards may be linked to drill results. For example, portions of video games may be unlocked based on drill completion or results. Additionally or alternatively, goals may be set for the drills that encourage improvements via a pseudo-gaming achievement awards.

Some embodiments of the smart hazard detectors may be used to incentivize drilling by providing indications of completion for financial rewards. For example, when the smart hazard detector system determines that a drill has been legitimately performed, the smart hazard detector system may send a completion indication to the building's insurance company to enable the insurance company to reward good drilling procedures by reducing insurance costs.

In certain embodiments, drills may be used to prepare devices for actual emergencies by allowing a user to determine whether a device behavior is desired during an actual emergency. In other words, the drilling process may be used to customize or refine smart device behavior during an actual emergency even smart devices not conventionally used to alert and aid in emergencies or drills. For example, drills may be used to prepare hazard detectors, thermostats, locks, window sensors, HVAC units, light switches, or other suitable smart devices for desired behavior during emergency situations.

Additionally, the smart hazard detectors may be capable of determining various different emergency situations (e.g., smoke detected, CO detected, shelter in place alerts, earthquakes, floods, tornados, etc.) Building tenant reactions to each of these different emergency situations may vary. Accordingly, different drills and/or instructions may be scheduled or initiated to prepare for each type of potential emergency situation.

BRIEF DESCRIPTION OF THE DRAWINGS

Various aspects of this disclosure may be better understood upon reading the following detailed description and upon reference to the drawings in which:

FIG. 4A illustrates an exploded perspective view of an intelligent, multi-sensing, network-connected hazard detector, according to an embodiment;

FIG. 7 illustrates a flowchart illustrating a process for starting an emergency drill, according to an embodiment;

FIG. 8 illustrates a flowchart illustrating a process for starting an emergency drill using a manual actuation, according to an embodiment;

FIG. 9 shows an illustrative user interface that includes a status page for a specific hazard detector device through which a drill is to be initiated according to an embodiment;

FIG. 10A illustrates a first screen that may be used to explain a drill process used in the process of FIG. 8, according to an embodiment;

FIG. 10B illustrates a second screen that may be used to explain a drill process used in the process of FIG. 8, according to an embodiment;

FIG. 10C illustrates a second screen that may be used to explain a drill process used in the process of FIG. 8, according to an embodiment;

FIG. 11 illustrates instructions to waken a sleeping device with manual actuation according to the process of FIG. 8, according to an embodiment;

FIG. 12 illustrates a connection error screen that may be used to indicate that connectivity has failed, according to an embodiment;

FIG. 13 illustrates a drill screen that may be displayed during a drill, according to an embodiment;

FIG. 14 illustrates a delay screen that countsdown a delay before starting a drill, according to an embodiment;

FIG. 15 illustrates another smart device drill screen, according to an embodiment;

FIG. 16 illustrates a drill timeout screen that may be displayed when a drill has timed out, according to an embodiment;

FIG. 17A illustrates an unticked checklist, according to an embodiment;

FIG. 17B illustrates an ticked checklist that indicates which actions were performed during the drill, according to an embodiment;

FIG. 18 illustrates an information page related to the checklist of FIGS. 17A & 17B, according to an embodiment;

FIG. 19 illustrates a success screen that may be presented when a drill has been completed, according to an embodiment;

FIG. 20 illustrates an improvement screen that may be presented when a drill has been completed, according to an embodiment;

FIG. 39 illustrates a profile that may be used in the scheme to determine whether a drill has been successfully completed, according to an embodiment;

FIG. 40 illustrates a process for varying a drill based on drill types, according to an embodiment;

FIG. 41 illustrates a process for teaching devices to perform desired behaviors during or after a drill, according to an embodiment;

DETAILED DESCRIPTION OF THE DISCLOSURE

Figure 1:
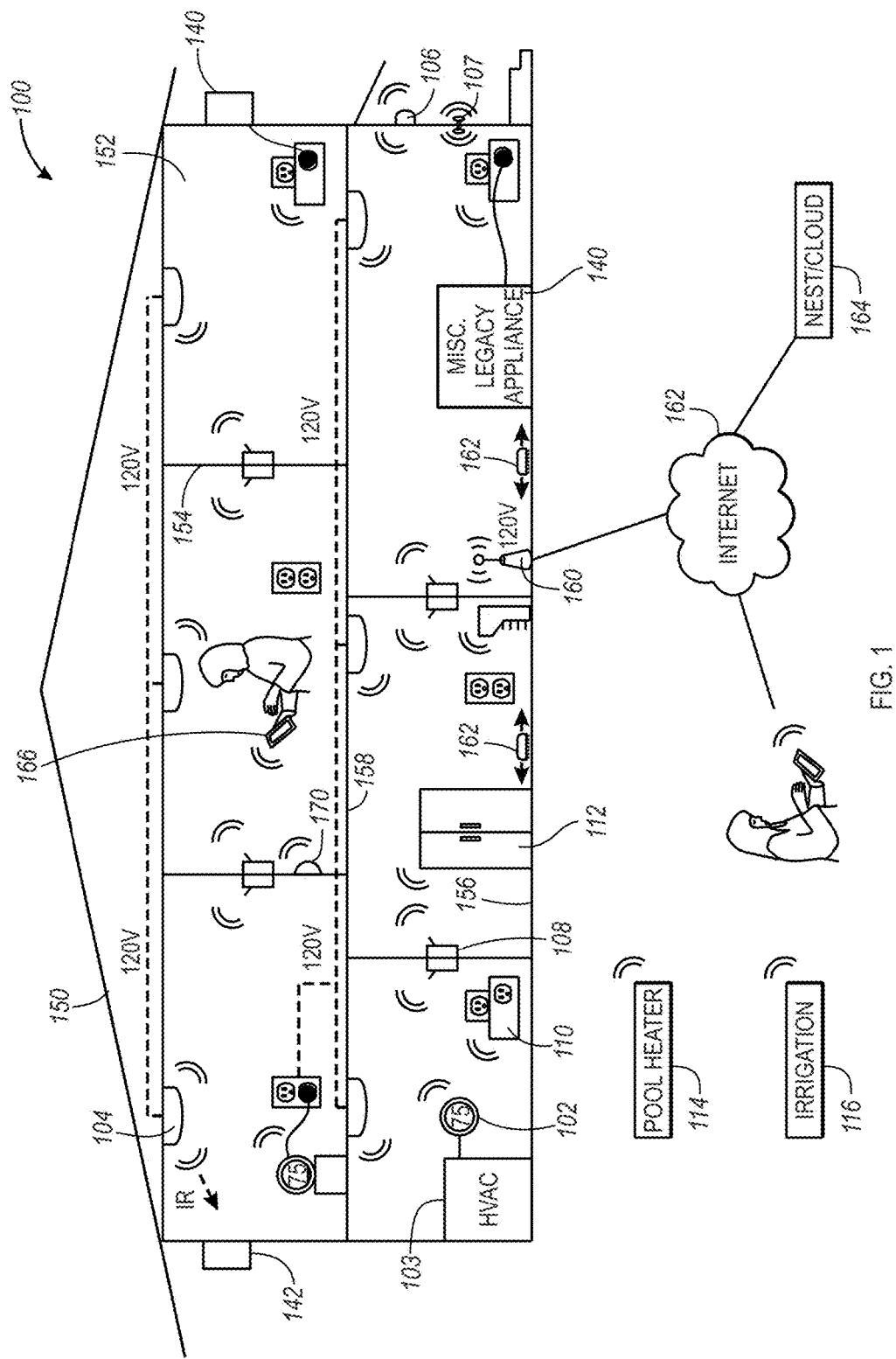
FIG. 1 illustrates an embodiment of a smart-home environment within which one or more of the devices, methods, systems, services, and/or computer program products described herein may be used, according to an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Embodiments of the present disclosure relate generally to drilling emergency situations using smart hazard detectors discussed herein. These smart hazard detectors may be configured and adapted to be implemented in a smart home environment, seamlessly interacting with other devices in the smart home environment and incorporating the other devices into the drilling process. The term "smart hazard detector" is used herein to represent a particular type of device that can be used for detecting hazards occurring within a structure, e.g., a home, an office or another structure. However, this smart hazard detector may also be capable of controlling other devices, detecting non-hazard related events (e.g., security related events), and/or working in cooperation with other devices to provide additional features to the smart home environment. Again, it is within the scope of the present teachings for embodiments of the smart hazard detectors of the present disclosure to detect measurable characteristics other than hazards (e.g., pressure, flow rate, height, position, velocity, acceleration, capacity, power, loudness, and brightness) and monitor and/or respond to one or more measurable characteristics of one or more physical systems.

It should be appreciated that "smart home environments" may refer to smart environments for any building type, such as single-family houses, duplexes, townhomes, multi-unit apartment buildings, hotels, retail stores, office buildings, industrial buildings, and any building that may include one or more smart hazard detectors.

It is to be further appreciated that while the terms user, customer, installer, homeowner, occupant, guest, tenant, landlord, repair person, and similar terms may be used to refer to a person or persons interacting with the smart hazard detector or user interface, these references are by no means to be considered as limiting the scope of the present teachings with respect to the person or persons who are performing such actions. Thus, for example, the terms user, customer, purchaser, installer, subscriber, and homeowner may often refer to the same person in the case of a single-family residential dwelling, because the head of the household is often the person who makes the purchasing decision, buys the unit, and installs and configures the unit, and is also one of the users of the unit. However, in other scenarios, such as a landlord-tenant environment, the customer may be the landlord with respect to purchasing the unit, the installer may be a local apartment supervisor, a first user may be the tenant, and a second user may again be the landlord with respect to remote control functionality. Importantly, while the identity of the person performing the action may be germane to a particular advantage provided by one or more of the embodiments—for example, the password-protected hazard detection functionality described further herein may be particularly advantageous where the landlord holds the sole password and can control hazard detection via the hazard detection device—such identity should not be construed in the descriptions that follow as necessarily limiting the scope of the present teachings to those particular individuals having those particular identities.

The various devices of this disclosure may be used to prepare families and other building occupants for actual emergencies through hazard drills. For example, smart hazard detectors (e.g., smoke and/or CO detectors) may run through a simulated alarm sequence to allow families or other building occupants to practice for an actual emergency. The devices may allow the participants to gauge their preparedness and even offer incentives for practicing hazard drills. For instance, regularly practicing hazard drills (and/or verifying their proper completion) may be rewarded with "achievements" or insurance discounts. Conducting hazard drills also may allow for participants and the smart devices alike to gain information that may be used in an actual emergency. For example, the hazard drills may be used to build a profile of the occupants and/or determine device preferences (e.g., device lighting or alarm preferences) to prepare for an actual emergency. By facilitating hazard drills, the smart devices of this disclosure may provide a helpful framework for emergency preparedness.

I. Smart Hazard Detectors and the Smart Home

With the foregoing in mind, FIG. 1 illustrates an example of a smart-home environment 100 within which one or more of the devices, methods, systems, services, and/or computer program products described further herein can be applicable. The depicted smart-home environment 100 includes a structure 150, which can include, e.g., a house, office building, garage, or mobile home. In some embodiments, the devices can also be integrated into a smart-home environment 100 that does not include an entire structure 150, such as an apartment, condominium, or office space. Further, the smart home environment can control and/or be coupled to devices outside of the actual structure 150. Indeed, several devices in the smart home environment need not physically be within the structure 150 at all. For example, a device controlling a pool heater or irrigation system can be located outside of the structure 150.

The depicted structure 150 includes a plurality of rooms 152, separated at least partly from each other via walls 154. The walls 154 can include interior walls or exterior walls. Each room can further include a floor 156 and a ceiling 158. Devices can be mounted on, integrated with and/or supported by a wall 154, floor 156 or ceiling 158.

In some embodiments, the smart-home environment 100 of FIG. 1 includes a plurality of devices, including intelligent, multi-sensing, network-connected devices that may integrate seamlessly with each other, with a central server, with a cloud-computing system, or a combination thereof to provide any of a variety of useful smart-home objectives. The smart-home environment 100 may include one or more intelligent, multi-sensing, network-connected thermostats 102 (hereinafter referred to as "smart thermostats 102"), one or more intelligent, network-connected, multi-sensing hazard detection units 104 (hereinafter referred to as "smart hazard detectors 104"), one or more intelligent, multi-sensing, network-connected doorbell devices 106 (hereinafter referred to as "smart doorbells 106"), and one or more intelligent, network-connected door locks (hereinafter referred to as "smart door locks 107"). According to embodiments, the smart thermostat 102 detects ambient climate characteristics (e.g., temperature and/or humidity) and controls a HVAC system 103 accordingly. The smart hazard detector 104 may detect the presence of a hazardous substance or a substance indicative of a hazardous substance (e.g., smoke, fire, or carbon monoxide). The smart doorbell 106 may detect a person's approach to or departure from a location (e.g., an outer door), control doorbell functionality, announce a person's approach or departure via audio or visual means, or control settings on a security system (e.g., to activate or deactivate the security system when occupants go and come).

In some embodiments, the smart-home environment 100 of FIG. 1 further includes one or more intelligent, multi-sensing, network-connected wall switches 108 (hereinafter referred to as "smart wall switches 108"), along with one or more intelligent, multi-sensing, network-connected wall plug interfaces 110 (hereinafter referred to as "smart wall plugs 110"). The smart wall switches 108 may detect ambient lighting conditions, detect room-occupancy states, and control a power and/or dim state of one or more lights. In some instances, smart wall switches 108 may also control a power state or speed of a fan, such as a ceiling fan. The smart wall plugs 110 may detect occupancy of a room or enclosure and control supply of power to one or more wall plugs (e.g., such that power is not supplied to the plug if nobody is at home).

Further, in some embodiments, the smart-home environment 100 of FIG. 1 includes a plurality of intelligent, multi-sensing, network-connected appliances 112 (hereinafter referred to as "smart appliances 112"), such as refrigerators, stoves and/or ovens, televisions, washers, dryers, lights, stereos, intercom systems, garage-door openers, floor fans, ceiling fans, wall air conditioners, pool heaters, irrigation systems, security systems, window sensors, security systems, and so forth. According to embodiments, the network-connected appliances 112 may be made compatible with the smart-home environment by cooperating with the respective manufacturers of the appliances. For example, the appliances can be space heaters, window AC units, motorized duct vents, etc. When plugged in, an appliance can announce itself to the smart-home network, such as by indicating what type of appliance it is, and it can automatically integrate with the controls of the smart-home. Such communication by the appliance to the smart home can be facilitated by any wired or wireless communication protocols known by those having ordinary skill in the art. The smart home also can include a variety of non-communicating legacy appliances 140, such as old conventional washer/dryers, refrigerators, and the like which can be controlled, albeit coarsely (ON/OFF), by virtue of the smart wall plugs 110. The smart-home environment 100 can further include a variety of partially communicating legacy appliances 142, such as infrared ("IR") controlled wall air conditioners or other IR-controlled devices, which can be controlled by IR signals provided by the smart hazard detectors 104 or the smart wall switches 108.

According to some embodiments, the smart thermostats 102, the smart hazard detectors 104, the smart doorbells 106, the smart wall switches 108, the smart wall plugs 110, and other devices of the smart-home environment 100 may be modular and may be incorporated into older and new houses. For example, in some embodiments, the devices are designed around a modular platform consisting of two basic components: a head unit and a back plate, also referred to as a docking station. Multiple configurations of the docking station are provided so as to be compatible with any home, such as older and newer homes. However, all of the docking stations include a standard head-connection arrangement, such that any head unit can be removably attached to any docking station. Thus, in some embodiments, the docking stations are interfaces that serve as physical connections to the structure and the voltage wiring of the homes, and the interchangeable head units contain all of the sensors, processors, user interfaces, the batteries, and other functional components of the devices.

Many different commercial and functional possibilities for provisioning, maintenance, and upgrade are possible. For example, after years of using any particular head unit, a user may be able to buy a new version of the head unit and simply plug it into the old docking station. There are also many different versions for the head units, such as low-cost versions with few features, and then a progression of increasingly-capable versions, up to and including extremely fancy head units with a large number of features. Thus, it should be appreciated that the various versions of the head units can all be interchangeable, with any of them working when placed into any docking station. This can advantageously encourage sharing and re-deployment of old head units—for example, when an important high-capability head unit, such as a hazard detector, is replaced by a new version of the head unit, then the old head unit can be re-deployed to a backroom or basement, etc. According to embodiments, when first plugged into a docking station, the head unit can ask the user (by 2D LCD display, 2D/3D holographic projection, voice interaction, etc.) a few simple questions such as, "Where am I" and the user can indicate "living room", "kitchen" and so forth.

The smart-home environment 100 may also include communication with devices outside of the physical home but within a proximate geographical range of the home. For example, the smart-home environment 100 may include a pool heater monitor 114 that communicates a current pool temperature to other devices within the smart-home environment 100 or receives commands for controlling the pool temperature. Similarly, the smart-home environment 100 may include an irrigation monitor 116 that communicates information regarding irrigation systems within the smart-home environment 100 and/or receives control information for controlling such irrigation systems. According to embodiments, an algorithm is provided for considering the geographic location of the smart-home environment 100, such as based on the zip code or geographic coordinates of the home. The geographic information is then used to obtain data helpful for determining optimal times for watering, such data may include sun location information, temperature, due point, soil type of the land on which the home is located, etc.

By virtue of network connectivity, one or more of the smart-home devices of FIG. 1 can further enable a user to interact with the device even if the user is not proximate to the device. For example, a user can communicate with a device using a computer (e.g., a desktop computer, laptop computer, or tablet) or other portable electronic device (e.g., a smartphone) 166. A webpage or application program can be configured to receive communications from the user and control the device based on the communications and/or to present information about the device's operation to the user. For example, the user can view a current setpoint temperature for a device and adjust it using a computer. The user can be in the structure during this remote communication or outside the structure.

As discussed, users can control the smart thermostat and other smart devices in the smart-home environment 100 using a network-connected computer or portable electronic device 166. In some examples, some or all of the occupants (e.g., individuals who live in the home) can register their device 166 with the smart-home environment 100. Such registration can be made at a central server to authenticate the occupant and/or the device as being associated with the home and to give permission to the occupant to use the device to control the smart devices in the home. An occupant can use their registered device 166 to remotely control the smart devices of the home, such as when the occupant is at work or on vacation. The occupant may also use their registered device to control the smart devices when the occupant is actually located inside the home, such as when the occupant is sitting on a couch inside the home. It should be appreciated that instead of or in addition to registering devices 166, the smart-home environment 100 makes inferences about which individuals live in the home and are therefore occupants and which devices 166 are associated with those individuals. As such, the smart-home environment "learns" who is an occupant and permits the devices 166 associated with those individuals to control the smart devices of the home.

In some instances, guests desire to control the smart devices. For example, the smart-home environment may receive communication from an unregistered mobile device of an individual inside of the home, where said individual is not recognized as an occupant of the home. For example, a smart-home environment may receive communication from a mobile device of an individual who is known to be or who is registered as a guest or determined to be on a common network (e.g., SSID WiFi network) as the smart devices.

According to embodiments, a guest-layer of controls can be provided to guests of the smart-home environment 100. The guest-layer of controls gives guests access to basic controls (e.g., a judicially selected subset of features of the smart devices), such as temperature adjustments, but it locks out other functionalities. The guest layer of controls can be thought of as a "safe sandbox" in which guests have limited controls, but they do not have access to more advanced controls that could fundamentally alter, undermine, damage, or otherwise impair the occupant-desired operation of the smart devices. For example, the guest layer of controls may not permit the guest to adjust the heat-pump lockout temperature.

A use case example of this is when a guest is in a smart home, the guest could walk up to the thermostat and turn the dial manually, but the guest may not want to walk around the house "hunting" the thermostat, especially at night while the home is dark and others are sleeping. Further, the guest may not want to go through the hassle of downloading the necessary application to their device for remotely controlling the thermostat. In fact, the guest may not have the home owner's login credentials, etc., and therefore cannot remotely control the thermostat via such an application. Accordingly, according to embodiments of the disclosure, the guest can open a mobile browser on their mobile device, type a keyword, such as "NEST" into the URL field and tap "Go" or "Search", etc. In response, the device presents the guest with a user interface which allows the guest to move the target temperature between a limited range, such as 65 and 80 degrees Fahrenheit. As discussed, the user interface provides a guest layer of controls that are limited to basic functions. The guest cannot change the target humidity, modes, or view energy history.

According to embodiments, to enable guests to access the user interface that provides the guest layer of controls, a local webserver is provided that is accessible in the local area network (LAN). It does not require a password, because physical presence inside the home is established reliably enough by the guest's presence on the LAN. In some embodiments, during installation of the smart device, such as the smart thermostat, the home owner is asked if they want to enable a Local Web Application program (LWA) on the smart device. In some scenarios, business owners will likely say no; home owners will likely say yes. When the LWA option is selected, the smart device broadcasts to the LAN that the above referenced keyword, such as "NEST", is now a host alias for its local web server. Thus, in such embodiments, no matter whose home a guest goes to, that same keyword (e.g., "NEST") is always the URL you use to access the LWA, provided the smart device is purchased from the same manufacturer. Further, according to embodiments, if there is more than one smart device on the LAN, the second and subsequent smart devices do not offer to set up another LWA. Instead, they register themselves as target candidates with the master LWA. And in this case the LWA user would be asked which smart device they want to change the temperature on before getting the simplified user interface for the particular smart device they choose.

According to embodiments, a guest layer of controls may also be provided to users by means other than a device 166. For example, the smart device, such as the smart thermostat, may be equipped with walkup-identification technology (e.g., face recognition, RFID, ultrasonic sensors) that "fingerprints" or creates a "signature" for the occupants of the home. The walkup-identification technology can be the same as or similar to the fingerprinting and signature creating techniques descripted in other sections of this application. In operation, when a person who does not live in the home or is otherwise not registered with the smart home or whose fingerprint or signature is not recognized by the smart home "walks up" to a smart device, the smart device provides the guest with the guest layer of controls, rather than full controls. For example, in some embodiments, the guest layer of controls may block activation of a smart drill without a higher layer of controls.

As described below, the smart thermostat and other smart devices "learn" by observing occupant behavior. For example, the smart thermostat learns occupants' preferred temperature set-points for mornings and evenings, and it learns when the occupants are asleep or awake, as well as when the occupants are typically away or at home, for example. According to embodiments, when a guest controls the smart devices, such as the smart thermostat, the smart devices do not "learn" from the guest. This prevents the guest's adjustments and controls from affecting the learned preferences of the occupants.

According to some embodiments, a smart television remote control is provided. The smart remote control recognizes occupants by thumbprint, visual identification, RFID, etc., and it recognizes a user as a guest or as someone belonging to a particular class having limited control and access (e.g., child). Upon recognizing the user as a guest or someone belonging to a limited class, the smart remote control only permits that user to view a subset of channels and to make limited adjustments to the settings of the television and other devices. For example, a guest cannot adjust the digital video recorder (DVR) settings, and a child is limited to viewing child-appropriate programming.

According to some embodiments, similar controls are provided for other instruments, utilities, and devices in the house. For example, sinks, bathtubs, and showers can be controlled by smart spigots that recognize users as guests or as children and therefore prevent water from exceeding a designated temperature that is considered safe.

In some embodiments, in addition to containing processing and sensing capabilities, each of the devices 102, 104, 106, 107, 108, 110, 112, 114, and 116 (collectively referred to as "the smart devices") is capable of data communications and information sharing with any other of the smart devices, as well as to any central server or cloud-computing system or any other device that is network-connected anywhere in the world. The data communications can be carried out using any of a variety of custom or standard wireless protocols (e.g., 802.11 such as Wi-Fi, 802.15.4 such as ZigBee, 6LoWPAN, or 802.15.1 such as Bluetooth) and/or any of a variety of custom or standard wired protocols (CAT6 Ethernet, HomePlug, etc.)

According to embodiments, all or some of the smart devices can serve as wireless or wired repeaters. For example, a first one of the smart devices can communicate with a second one of the smart device via a wireless router 160. The smart devices can further communicate with each other via a connection to a network, such as the Internet 162. Through the Internet 162, the smart devices can communicate with a central server or a cloud-computing system 164. The central server or cloud-computing system 164 can be associated with a manufacturer, support entity, or service provider associated with the device. For some embodiments, a user may be able to contact customer support using a device itself rather than needing to use other communication means such as a telephone or Internet-connected computer. Further, software updates can be automatically sent from the central server or cloud-computing system 164 to devices (e.g., when available, when purchased, or at routine intervals).

According to embodiments, the smart devices combine to create a mesh network of spokesman and low-power nodes in the smart-home environment 100, where some of the smart devices are "spokesman" nodes and others are "low-powered" nodes. Some of the smart devices in the smart-home environment 100 are battery powered, while others have a regular and reliable power source, such as by connecting to wiring (e.g., to 120V line voltage wires) behind the walls 154 of the smart-home environment. The smart devices that have a regular and reliable power source are referred to as "spokesman" nodes. These nodes are equipped with the capability of using any wireless protocol or manner to facilitate bidirectional communication with any of a variety of other devices in the smart-home environment 100 as well as with the central server or cloud-computing system 164. On the other hand, the devices that are battery powered are referred to as "low-power" nodes. These nodes tend to be smaller than spokesman nodes and may only communicate using wireless protocols that requires very little power, such as Zigbee, 6LoWPAN, etc. Further, some, but not all, low-power nodes are incapable of bidirectional communication. These low-power nodes send messages, but they are unable to "listen". Thus, other devices in the smart-home environment 100, such as the spokesman nodes, cannot send information to these low-power listening-only nodes.

As described, the smart devices serve as low-power and spokesman nodes to create a mesh network in the smart-home environment 100. Individual low-power nodes in the smart-home environment regularly send out messages regarding what they are sensing, and the other low-powered nodes in the smart-home environment—in addition to sending out their own messages—repeat the messages, thereby causing the messages to travel from node to node (i.e., device to device) throughout the smart-home environment 100. The spokesman nodes in the smart-home environment 100 are able to "drop down" to low-powered communication protocols to receive these messages, translate the messages to other communication protocols, and send the translated messages to other spokesman nodes and/or the central server or cloud-computing system 164. Thus, the low-powered nodes using low-power communication protocols are able send messages across the entire smart-home environment 100 as well as over the Internet 162 to the central server or cloud-computing system 164. According to embodiments, the mesh network enables the central server or cloud-computing system 164 regularly receive data from all of the smart devices in the home, make inferences based on the data, and send commands back to one of the smart devices to accomplish some of the smart-home objectives described herein.

As described, the spokesman nodes and some of the low-powered nodes are capable of "listening". Accordingly, users, other devices, and the central server or cloud-computing system 164 can communicate controls to the low-powered nodes. For example, a user can use the portable electronic device (e.g., a smartphone) 166 to send commands over the Internet to the central server or cloud-computing system 164, which then relays the commands to the spokesman nodes in the smart-home environment 100. The spokesman nodes drop down to a low-power protocol to communicate the commands to the low-power nodes throughout the smart-home environment, as well as to other spokesman nodes that did not receive the commands directly from the central server or cloud-computing system 164.

An example of a low-power node is a smart nightlight 170. In addition to housing a light source, the smart nightlight 170 houses an occupancy sensor, such as an ultrasonic or passive IR sensor, and an ambient light sensor, such as a photoresistor or a single-pixel sensor that measures light in the room. In some embodiments, the smart nightlight 170 is configured to activate the light source when its ambient light sensor detects that the room is dark and when its occupancy sensor detects that someone is in the room. In other embodiments, the smart nightlight 170 is simply configured to activate the light source when its ambient light sensor detects that the room is dark. Further, according to embodiments, the smart nightlight 170 includes a low-power wireless communication chip (e.g., ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly, using the mesh network, from node to node (i.e., smart device to smart device) within the smart-home environment 100 as well as over the Internet 162 to the central server or cloud-computing system 164.

Other examples of low-powered nodes include battery-operated versions of the smart hazard detectors 104. These smart hazard detectors 104 are often located in an area without access to constant and reliable power and, as discussed in detail below, may include any number and type of sensors, such as smoke/fire/heat sensors, carbon monoxide/dioxide sensors, occupancy/motion sensors, ambient light sensors, temperature sensors, humidity sensors, and the like. Furthermore, smart hazard detectors 104 can send messages that correspond to each of the respective sensors to the other devices and the central server or cloud-computing system 164, such as by using the mesh network as described above.

Examples of spokesman nodes include smart doorbells 106, smart thermostats 102, smart wall switches 108, and smart wall plugs 110. These devices 102, 106, 108, and 110 are often located near and connected to a reliable power source, and therefore can include more power-consuming components, such as one or more communication chips capable of bidirectional communication in any variety of protocols.

In some embodiments, these low-powered and spokesman nodes (e.g., devices 102, 104, 106, 107, 108, 110, 112, and 170) may function as "tripwires" for an alarm system in the smart-home environment. For example, in the event a perpetrator circumvents detection by alarm sensors located at windows, doors, and other entry points of the smart-home environment 100, the alarm could be triggered upon receiving an occupancy, motion, heat, sound, etc. message from one or more of the low-powered and spokesman nodes in the mesh network. For example, upon receiving a message from a smart nightlight 170 indicating the presence of a person, the central server or cloud-computing system 164 or some other device could trigger an alarm, provided the alarm is armed at the time of detection. Thus, the alarm system could be enhanced by various low-powered and spokesman nodes located throughout the smart-home environment 100. In this example, a user could enhance the security of the smart-home environment 100 by buying and installing extra smart nightlights 170.

In some embodiments, the mesh network can be used to automatically turn on and off lights as a person transitions from room to room. For example, the low-powered and spokesman nodes (e.g., devices 102, 104, 106, 107, 108, 110, 112, and 170) detect the person's movement through the smart-home environment and communicate corresponding messages through the mesh network. Using the messages that indicate which rooms are occupied, the central server or cloud-computing system 164 or some other device activates and deactivates the smart wall switches 108 to automatically provide light as the person moves from room to room in the smart-home environment 100. Further, users may provide pre-configuration information that indicates which smart wall plugs 110 provide power to lamps and other light sources, such as the smart nightlight 170. Alternatively, this mapping of light sources to wall plugs 110 can be done automatically (e.g., the smart wall plugs 110 detect when a light source is plugged into it, and it sends a corresponding message to the central server or cloud-computing system 164). Using this mapping information in combination with messages that indicate which rooms are occupied, the central server or cloud-computing system 164 or some other device activates and deactivates the smart wall plugs 110 that provide power to lamps and other light sources so as to track the person's movement and provide light as the person moves from room to room.

In some embodiments, the mesh network of low-powered and spokesman nodes can be used to provide exit lighting in the event of an emergency or emergency drills. In some instances, to facilitate this, users provide pre-configuration information that indicates exit routes in the smart-home environment 100. For example, for each room in the house, the user may provide a map of the best exit route depending on availability of the route. In some situations the route may be blocked by a hazard, and an alternate route may be illuminated and indicated, if available. It should be appreciated that instead of a user providing this information, the central server or cloud-computing system 164 or some other device could automatically determine the routes using uploaded maps, diagrams, architectural drawings of the smart-home house, as well as using a map generated based on positional information obtained from the nodes of the mesh network (e.g., positional information from the devices is used to construct a map of the house). In operation, when an alarm is activated (e.g., when one or more of the smart hazard detector 104 detects smoke and activates an alarm), the central server or cloud-computing system 164 or some other device uses occupancy information obtained from the low-powered and spokesman nodes to determine which rooms are occupied and then turns on lights (e.g., nightlights 170, wall switches 108, wall plugs 110 that power lamps, etc.) along the exit routes from the occupied rooms so as to provide emergency exit lighting.

Further included and illustrated in the smart-home environment 100 of FIG. 1 are service robots 162 each configured to carry out, in an autonomous manner, any of a variety of household tasks. For some embodiments, the service robots 162 can be respectively configured to perform floor sweeping, floor washing, etc. in a manner similar to that of known commercially available devices such as the ROOMBA™ and SCOOBA™ products sold by iRobot, Inc. of Bedford, Mass. Tasks such as floor sweeping and floor washing can be considered as "away" or "while-away" tasks for purposes of the instant description, as it is generally more desirable for these tasks to be performed when the occupants are not present. For other embodiments, one or more of the service robots 162 are configured to perform tasks such as playing music for an occupant, serving as a localized thermostat for an occupant, serving as a localized air monitor/purifier for an occupant, serving as a localized baby monitor, serving as a localized hazard detector for an occupant, and so forth, it being generally more desirable for such tasks to be carried out in the immediate presence of the human occupant. For purposes of the instant description, such tasks can be considered as "human-facing" or "human-centric" tasks.

When serving as a localized thermostat for an occupant, a particular one of the service robots 162 can be considered to be facilitating what can be called a "personal comfort-area network" for the occupant, with the objective being to keep the occupant's immediate space at a comfortable temperature wherever that occupant may be located in the home. This can be contrasted with conventional wall-mounted room thermostats, which have the more attenuated objective of keeping a statically-defined structural space at a comfortable temperature. According to one embodiment, the localized-thermostat service robot 162 is configured to move itself into the immediate presence (e.g., within five feet) of a particular occupant who has settled into a particular location in the home (e.g. in the dining room to eat their breakfast and read the news). The localized-thermostat service robot 162 includes a temperature sensor, a processor, and wireless communication components configured such that control communications with the HVAC system, either directly or through a wall-mounted wirelessly communicating thermostat coupled to the HVAC system, are maintained and such that the temperature in the immediate vicinity of the occupant is maintained at their desired level. If the occupant then moves and settles into another location (e.g. to the living room couch to watch television), the localized-thermostat service robot 162 proceeds to move and park itself next to the couch and keep that particular immediate space at a comfortable temperature.

Technologies by which the localized-thermostat service robot 162 (and/or the larger smart-home system of FIG. 1) can identify and locate the occupant whose personal-area space is to be kept at a comfortable temperature can include, but are not limited to, RFID sensing (e.g., person having an RFID bracelet, RFID necklace, or RFID key fob), synthetic vision techniques (e.g., video cameras and face recognition processors), audio techniques (e.g., voice, sound pattern, vibration pattern recognition), ultrasound sensing/imaging techniques, and infrared or near-field communication (NFC) techniques (e.g., person wearing an infrared or NFC-capable smartphone), along with rules-based inference engines or artificial intelligence techniques that draw useful conclusions from the sensed information (e.g., if there is only a single occupant present in the home, then that is the person whose immediate space should be kept at a comfortable temperature, and the selection of the desired comfortable temperature should correspond to that occupant's particular stored profile).

When serving as a localized air monitor/purifier for an occupant, a particular service robot 162 can be considered to be facilitating what can be called a "personal health-area network" for the occupant, with the objective being to keep the air quality in the occupant's immediate space at healthy levels. Alternatively or in conjunction therewith, other health-related functions can be provided, such as monitoring the temperature or heart rate of the occupant (e.g., using finely remote sensors, near-field communication with on-person monitors, etc.). When serving as a localized hazard detector for an occupant, a particular service robot 162 can be considered to be facilitating what can be called a "personal safety-area network" for the occupant, with the objective being to ensure there is no excessive carbon monoxide, smoke, fire, etc., in the immediate space of the occupant. Methods analogous to those described above for personal comfort-area networks in terms of occupant identifying and tracking are likewise applicable for personal health-area network and personal safety-area network embodiments.

According to some embodiments, the above-referenced facilitation of personal comfort-area networks, personal health-area networks, personal safety-area networks, and/or other such human-facing functionalities of the service robots 162, are further enhanced by logical integration with other smart sensors in the home according to rules-based inferencing techniques or artificial intelligence techniques for achieving better performance of those human-facing functionalities and/or for achieving those goals in energy-conserving or other resource-conserving ways. Thus, for one embodiment relating to personal health-area networks, the air monitor/purifier service robot 162 can be configured to detect whether a household pet is moving toward the currently settled location of the occupant (e.g., using on-board sensors and/or by data communications with other smart-home sensors along with rules-based inferencing/artificial intelligence techniques), and if so, the air purifying rate is immediately increased in preparation for the arrival of more airborne pet dander. For another embodiment relating to personal safety-area networks, the hazard detector service robot 162 can be advised by other smart-home sensors that the temperature and humidity levels are rising in the kitchen, which is nearby to the occupant's current dining room location, and responsive to this advisory the hazard detector service robot 162 will temporarily raise a hazard detection threshold, such as a smoke detection threshold, under an inference that any small increases in ambient smoke levels will most likely be due to cooking activity and not due to a genuinely hazardous condition.

The above-described "human-facing" and "away" functionalities can be provided, without limitation, by multiple distinct service robots 162 having respective dedicated ones of such functionalities, by a single service robot 162 having an integration of two or more different ones of such functionalities, and/or any combinations thereof (including the ability for a single service robot 162 to have both "away" and "human facing" functionalities) without departing from the scope of the present teachings. Electrical power can be provided by virtue of rechargeable batteries or other rechargeable methods, with FIG. 1 illustrating an exemplary out-of-the-way docking station 164 to which the service robots 162 will automatically dock and recharge its batteries (if needed) during periods of inactivity. Preferably, each service robot 162 includes wireless communication components that facilitate data communications with one or more of the other wirelessly communicating smart-home sensors of FIG. 1 and/or with one or more other service robots 162 (e.g., using Wi-Fi, Zigbee, Z-Wave, 6LoWPAN, etc.), and one or more of the smart-home devices of FIG. 1 can be in communication with a remote server over the Internet. Alternatively or in conjunction therewith, each service robot 162 can be configured to communicate directly with a remote server by virtue of cellular telephone communications, satellite communications, 3G/4G network data communications, or other direct communication method.

Provided according to some embodiments are systems and methods relating to the integration of the service robot(s) 162 with home security sensors and related functionalities of the smart home system. The embodiments are particularly applicable and advantageous when applied for those service robots 162 that perform "away" functionalities or that otherwise are desirable to be active when the home is unoccupied (hereinafter "away-service robots"). Included in the embodiments are methods and systems for ensuring that home security systems, intrusion detection systems, and/or occupancy-sensitive environmental control systems (for example, occupancy-sensitive automated setback thermostats that enter into a lower-energy-using condition when the home is unoccupied) are not erroneously triggered by the away-service robots.

Provided according to one embodiment is a home automation and security system (e.g., as shown in FIG. 1) that is remotely monitored by a monitoring service by virtue of automated systems (e.g., cloud-based servers or other central servers, hereinafter "central server") that are in data communications with one or more network-connected elements of the home automation and security system. The away-service robots are configured to be in operative data communication with the central server, and are configured such that they remain in a non-away-service state (e.g., a dormant state at their docking station) unless permission is granted from the central server (e.g., by virtue of an "away-service-OK" message from the central server) to commence their away-service activities. An away-state determination made by the system, which can be arrived at (i) exclusively by local on-premises smart device(s) based on occupancy sensor data, (ii) exclusively by the central server based on received occupancy sensor data and/or based on received proximity-related information such as GPS coordinates from user smartphones or automobiles, or (iii) any combination of (i) and (ii) can then trigger the granting of away-service permission to the away-service robots by the central server. During the course of the away-service robot activity, during which the away-service robots may continuously detect and send their in-home location coordinates to the central server, the central server can readily filter signals from the occupancy sensing devices to distinguish between the away-service robot activity versus any unexpected intrusion activity, thereby avoiding a false intrusion alarm condition while also ensuring that the home is secure. Alternatively or in conjunction therewith, the central server may provide filtering data (such as an expected occupancy-sensing profile triggered by the away-service robots) to the occupancy sensing nodes or associated processing nodes of the smart home, such that the filtering is performed at the local level. Although somewhat less secure, it would also be within the scope of the present teachings for the central server to temporarily disable the occupancy sensing equipment for the duration of the away-service robot activity.

According to another embodiment, functionality similar to that of the central server in the above example can be performed by an on-site computing device such as a dedicated server computer, a "master" home automation console or panel, or as an adjunct function of one or more of the smart-home devices of FIG. 1. In such an embodiment, there would be no dependency on a remote service provider to provide the "away-service-OK" permission to the away-service robots and the false-alarm-avoidance filtering service or filter information for the sensed intrusion detection signals.

According to other embodiments, there are provided methods and systems for implementing away-service robot functionality while avoiding false home security alarms and false occupancy-sensitive environmental controls without the requirement of a single overall event orchestrator. For purposes of the simplicity in the present disclosure, the home security systems and/or occupancy-sensitive environmental controls that would be triggered by the motion, noise, vibrations, or other disturbances of the away-service robot activity are referenced simply as "activity sensing systems," and when so triggered will yield a "disturbance-detected" outcome representative of the false trigger (for example, an alarm message to a security service, or an "arrival" determination for an automated setback thermostat that causes the home to be heated or cooled to a more comfortable "occupied" setpoint temperature). According to one embodiment, the away-service robots are configured to emit a standard ultrasonic sound throughout the course of their away-service activity, the activity sensing systems are configured to detect that standard ultrasonic sound, and the activity sensing systems are further configured such that no disturbance-detected outcome will occur for as long as that standard ultrasonic sound is detected. For other embodiments, the away-service robots are configured to emit a standard notification signal throughout the course of their away-service activity, the activity sensing systems are configured to detect that standard notification signal, and the activity sensing systems are further configured such that no disturbance-detected outcome will occur for as long as that standard notification signal is detected, wherein the standard notification signal comprises one or more of: an optical notifying signal; an audible notifying signal; an infrared notifying signal; an infrasonic notifying signal; a wirelessly transmitted data notification signal (e.g., an IP broadcast, multicast, or unicast notification signal, or a notification message sent in an TCP/IP two-way communication session).

According to some embodiments, the notification signals sent by the away-service robots to the activity sensing systems are authenticated and encrypted such that the notifications cannot be learned and replicated by a potential burglar. Any of a variety of known encryption/authentication schemes can be used to ensure such data security including, but not limited to, methods involving third party data security services or certificate authorities. For some embodiments, a permission request-response model can be used, wherein any particular away-service robot requests permission from each activity sensing system in the home when it is ready to perform its away-service tasks, and does not initiate such activity until receiving a "yes" or "permission granted" message from each activity sensing system (or from a single activity sensing system serving as a "spokesman" for all of the activity sensing systems). One advantage of the described embodiments that do not require a central event orchestrator is that there can (optionally) be more of an arms-length relationship between the supplier(s) of the home security/environmental control equipment, on the one hand, and the supplier(s) of the away-service robot(s), on the other hand, as it is only required that there is the described standard one-way notification protocol or the described standard two-way request/permission protocol to be agreed upon by the respective suppliers.

According to still other embodiments, the activity sensing systems are configured to detect sounds, vibrations, RF emissions, or other detectable environmental signals or "signatures" that are intrinsically associated with the away-service activity of each away-service robot, and are further configured such that no disturbance-detected outcome will occur for as long as that particular detectable signal or environmental "signature" is detected. By way of example, a particular kind of vacuum-cleaning away-service robot may emit a specific sound or RF signature. For one embodiment, the away-service environmental signatures for each of a plurality of known away-service robots are stored in the memory of the activity sensing systems based on empirically collected data, the environmental signatures being supplied with the activity sensing systems and periodically updated by a remote update server. For another embodiment, the activity sensing systems can be placed into a "training mode" for the particular home in which they are installed, wherein they "listen" and "learn" the particular environmental signatures of the away-service robots for that home during that training session, and thereafter will suppress disturbance-detected outcomes for intervals in which those environmental signatures are heard.

For still another embodiment, which is particularly useful when the activity sensing system is associated with occupancy-sensitive environmental control equipment rather than a home security system, the activity sensing system is configured to automatically learn the environmental signatures for the away-service robots by virtue of automatically performing correlations over time between detected environmental signatures and detected occupancy activity. By way of example, for one embodiment an intelligent automated nonoccupancy-triggered setback thermostat such as the Nest Learning Thermostat can be configured to constantly monitor for audible and RF activity as well as to perform infrared-based occupancy detection. In particular view of the fact that the environmental signature of the away-service robot will remain relatively constant from event to event, and in view of the fact that the away-service events will likely either (a) themselves be triggered by some sort of nonoccupancy condition as measured by the away-service robots themselves, or (b) occur at regular times of day, there will be patterns in the collected data by which the events themselves will become apparent and for which the environmental signatures can be readily learned. Generally speaking, for this automatic-learning embodiment in which the environmental signatures of the away-service robots are automatically learned without requiring user interaction, it is more preferable that a certain number of false triggers be tolerable over the course of the learning process. Accordingly, this automatic-learning embodiment is more preferable for application in occupancy-sensitive environmental control equipment (such as an automated setback thermostat) rather than home security systems for the reason that a few false occupancy determinations may cause a few instances of unnecessary heating or cooling, but will not otherwise have any serious consequences, whereas false home security alarms may have more serious consequences.

According to embodiments, technologies including the sensors of the smart devices located in the mesh network of the smart-home environment in combination with rules-based inference engines or artificial intelligence provided at the central server or cloud-computing system 164 are used to provide a personal "smart alarm clock" for individual occupants of the home. For example, user-occupants can communicate with the central server or cloud-computing system 164 via their mobile devices 166 to access an interface for the smart alarm clock. There, occupants can turn on their "smart alarm clock" and input a wake time for the next day and/or for additional days. In some embodiments, the occupant may have the option of setting a specific wake time for each day of the week, as well as the option of setting some or all of the inputted wake times to "repeat". Artificial intelligence will be used to consider the occupant's response to these alarms when they go off and make inferences about the user's preferred sleep patterns over time.

According to embodiments, the smart device in the smart-home environment 100 that happens to be closest to the occupant when the occupant falls asleep will be the device that transmits messages regarding when the occupant stopped moving, from which the central server or cloud-computing system 164 will make inferences about where and when the occupant prefers to sleep. This closest smart device will as be the device that sounds the alarm to wake the occupant. In this manner, the "smart alarm clock" will follow the occupant throughout the house, by tracking the individual occupants based on their "unique signature", which is determined based on data obtained from sensors located in the smart devices. For example, the sensors include ultrasonic sensors, passive IR sensors, and the like. The unique signature is based on a combination of walking gate, patterns of movement, voice, height, size, etc. It should be appreciated that facial recognition may also be used.

According to an embodiment, the wake times associated with the "smart alarm clock" are used by the smart thermostat 102 to control the HVAC in an efficient manner so as to pre-heat or cool the house to the occupant's desired "sleeping" and "awake" temperature settings. The preferred settings can be learned over time, such as by observing which temperature the occupant sets the thermostat to before going to sleep and which temperature the occupant sets the thermostat to upon waking up.

According to an embodiment, a device is positioned proximate to the occupant's bed, such as on an adjacent nightstand, and collects data as the occupant sleeps using noise sensors, motion sensors (e.g., ultrasonic, IR, and optical), etc. Data may be obtained by the other smart devices in the room as well. Such data may include the occupant's breathing patterns, heart rate, movement, etc. Inferences are made based on this data in combination with data that indicates when the occupant actually wakes up. For example, if—on a regular basis—the occupant's heart rate, breathing, and moving all increase by 5% to 10%, twenty to thirty minutes before the occupant wakes up each morning, then predictions can be made regarding when the occupant is going to wake. Other devices in the home can use these predictions to provide other smart-home objectives, such as adjusting the smart thermostat 102 so as to pre-heat or cool the home to the occupant's desired setting before the occupant wakes up. Further, these predictions can be used to set the "smart alarm clock" for the occupant, to turn on lights, etc.

According to embodiments, technologies including the sensors of the smart devices located throughout the smart-home environment in combination with rules-based inference engines or artificial intelligence provided at the central server or cloud-computing system 164 are used to detect or monitor the progress of Alzheimer's Disease. For example, the unique signatures of the occupants are used to track the individual occupants' movement throughout the smart-home environment 100. This data can be aggregated and analyzed to identify patterns indicative of Alzheimer's. Oftentimes, individuals with Alzheimer's have distinctive patterns of migration in their homes. For example, a person will walk to the kitchen and stand there for a while, then to the living room and stand there for a while, and then back to the kitchen. This pattern will take about thirty minutes, and then the person will repeat the pattern. According to embodiments, the remote servers or cloud computing architectures 164 analyze the person's migration data collected by the mesh network of the smart-home environment to identify such patterns.

Figure 2:
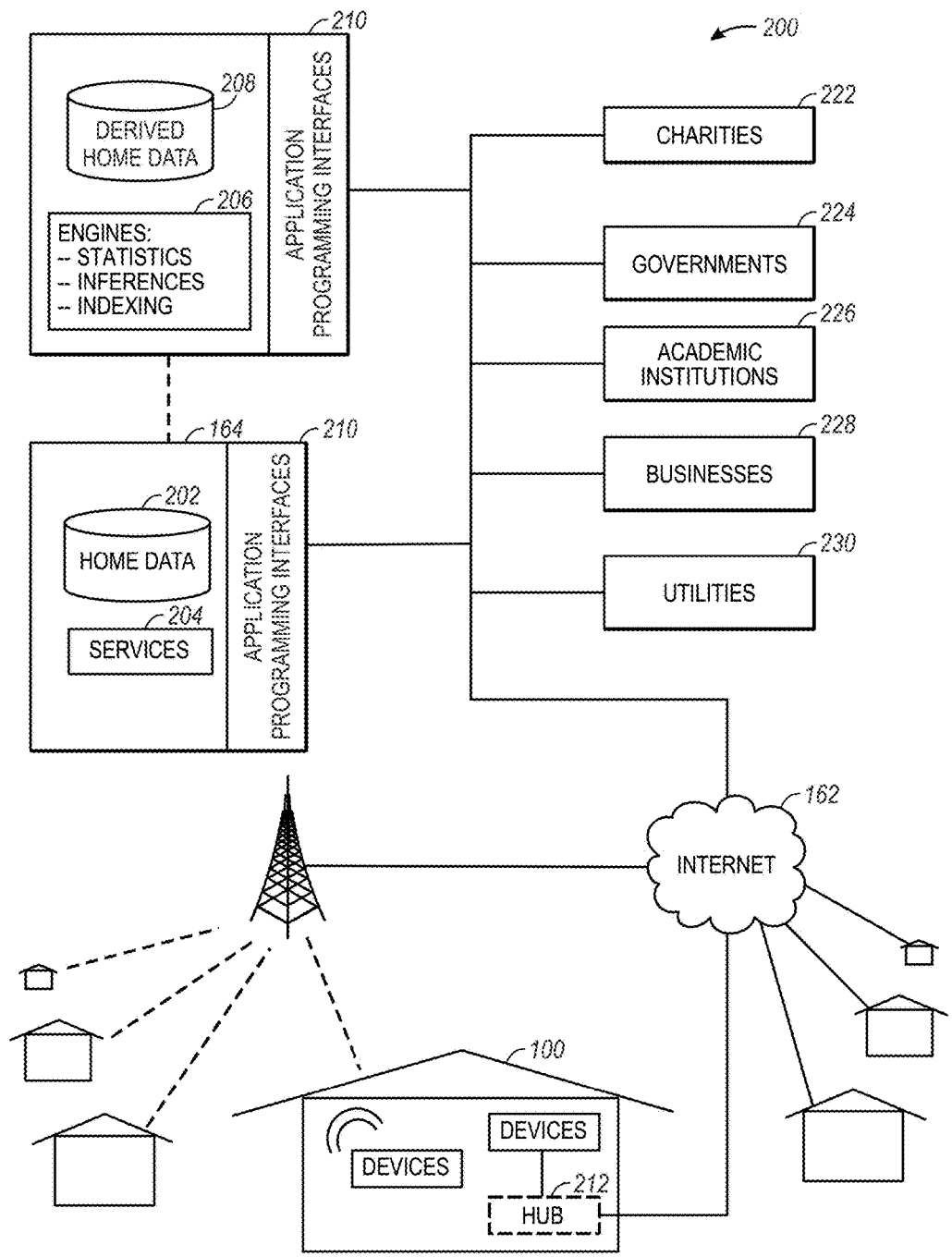
FIG. 2 illustrates a network-level view of an extensible devices and services platform with which the smart-home environment of FIG. 1 can be integrated, according to an embodiment.

FIG. 2 illustrates a network-level view of an extensible devices and services platform 200 with which a plurality of smart-home environments, such as the smart-home environment 100 of FIG. 1, can be integrated. The extensible devices and services platform 200 includes remote servers or cloud computing architectures 164. Each of the intelligent, network-connected devices 102, 104, 106, 107, 108, 110, 112, 114, and 116 from FIG. 1 (identified simply as "smart devices" in FIGS. 2-3 herein) can communicate with the remote servers or cloud computing architectures 164. For example, a connection to the Internet 162 can be established either directly (for example, using 3G/4G connectivity to a wireless carrier), through a wireless mesh network 212 (which can be a scheme ranging from a simple wireless router, for example, up to and including an intelligent, dedicated whole-home control node), or through any combination thereof.

Although in some examples provided herein, the devices and services platform 200 communicates with and collects data from the smart devices of smart-home environment 100 of FIG. 1, it should be appreciated that the devices and services platform 200 communicates with and collects data from a plurality of smart-home environments across the world. For example, the central server or cloud-computing system 164 can collect home data 202 from the devices of one or more smart-home environments, where the devices can routinely transmit home data or can transmit home data in specific instances (e.g., when a device queries the home data 202). Thus, the devices and services platform 200 routinely collects data from homes across the world. As described, the collected home data 202 includes, for example, power consumption data, occupancy data, HVAC settings and usage data, carbon monoxide levels data, carbon dioxide levels data, volatile organic compounds levels data, sleeping schedule data, cooking schedule data, inside and outside temperature humidity data, television viewership data, inside and outside noise level data, etc.

The central server or cloud-computing architecture 164 can further provide one or more services 204. The services 204 can include, e.g., software updates, customer support, sensor data collection/logging, remote access, remote or distributed control, or use suggestions (e.g., based on collected home data 202 to improve performance, reduce utility cost, etc.). Data associated with the services 204 can be stored at the central server or cloud-computing system 164 and the central server or the cloud-computing system 164 can retrieve and transmit the data at an appropriate time (e.g., at regular intervals, upon receiving a request from a user, etc.).

As illustrated in FIG. 2, an embodiment of the extensible devices and services platform 200 includes a processing engine 206, which can be concentrated at a single server or distributed among several different computing entities without limitation. The processing engine 206 can include engines configured to receive data from devices of smart-home environments (e.g., via the Internet or a hubbed network), to index the data, to analyze the data and/or to generate statistics based on the analysis or as part of the analysis. The analyzed data can be stored as derived home data 208.

Results of the analysis or statistics can thereafter be transmitted back to the device that provided home data used to derive the results, to other devices, to a server providing a webpage to a user of the device, or to other non-device entities. For example, use statistics, use statistics relative to use of other devices, use patterns, and/or statistics summarizing sensor readings can be generated by the processing engine 206 and transmitted. The results or statistics can be provided via the Internet 162. In this manner, the processing engine 206 can be configured and programmed to derive a variety of useful information from the home data 202. A single server can include one or more engines.

The derived data can be highly beneficial at a variety of different granularities for a variety of useful purposes, ranging from explicit programmed control of the devices on a per-home, per-neighborhood, or per-region basis (for example, demand-response programs for electrical utilities), to the generation of inferential abstractions that can assist on a per-home basis (for example, an inference can be drawn that the homeowner has left for vacation and so security detection equipment can be put on heightened sensitivity), to the generation of statistics and associated inferential abstractions that can be used for government or charitable purposes. For example, processing engine 206 can generate statistics about device usage across a population of devices and send the statistics to device users, service providers or other entities (e.g., that have requested or may have provided monetary compensation for the statistics).

According to some embodiments, the home data 202, the derived home data 208, and/or another data can be used to create "automated neighborhood safety networks." For example, in the event the central server or cloud-computing architecture 164 receives data indicating that a particular home has been broken into, is experiencing a fire, or some other type of emergency event, an alarm is sent to other smart homes in the "neighborhood." In some instances, the central server or cloud-computing architecture 164 automatically identifies smart homes within a radius of the home experiencing the emergency and sends an alarm to the identified homes. In such instances, the other homes in the "neighborhood" do not have to sign up for or register to be a part of a safety network, but instead are notified of an emergency based on their proximity to the location of the emergency. This creates robust and evolving neighborhood security watch networks, such that if one person's home is getting broken into, an alarm can be sent to nearby homes, such as by audio announcements via the smart devices located in those homes. It should be appreciated that this can be an opt-in service and that, in addition to or instead of the central server or cloud-computing architecture 164 selecting which homes to send alerts to, individuals can subscribe to participate in such networks and individuals can specify which homes they want to receive alerts from. This can include, for example, the homes of family members who live in different cities, such that individuals can receive alerts when their loved ones in other locations are experiencing an emergency.

According to some embodiments, sound, vibration, and/or motion sensing components of the smart devices are used to detect sound, vibration, and/or motion created by running water. Based on the detected sound, vibration, and/or motion, the central server or cloud-computing architecture 164 makes inferences about water usage in the home and provides related services. For example, the central server or cloud-computing architecture 164 can run programs/algorithms that recognize what water sounds like and when it is running in the home. According to one embodiment, to map the various water sources of the home, upon detecting running water, the central server or cloud-computing architecture 164 sends a message an occupant's mobile device asking if water is currently running or if water has been recently run in the home and, if so, which room and which water-consumption appliance (e.g., sink, shower, toilet, etc.) was the source of the water. This enables the central server or cloud-computing architecture 164 to determine the "signature" or "fingerprint" of each water source in the home. This is sometimes referred to herein as "audio fingerprinting water usage."

In one illustrative example, the central server or cloud-computing architecture 164 creates a signature for the toilet in the master bathroom, and whenever that toilet is flushed, the central server or cloud-computing architecture 164 will know that the water usage at that time is associated with that toilet. Thus, the central server or cloud-computing architecture 164 can track the water usage of that toilet as well as each water-consumption application in the home. This information can be correlated to water bills or smart water meters so as to provide users with a breakdown of their water usage.

According to some embodiments, sound, vibration, and/or motion sensing components of the smart devices are used to detect sound, vibration, and/or motion created by mice and other rodents as well as by termites, cockroaches, and other insects (collectively referred to as "pests"). Based on the detected sound, vibration, and/or motion, the central server or cloud-computing architecture 164 makes inferences about pest-detection in the home and provides related services. For example, the central server or cloud-computing architecture 164 can run programs/algorithms that recognize what certain pests sound like, how they move, and/or the vibration they create, individually and/or collectively. According to one embodiment, the central server or cloud-computing architecture 164 can determine the "signatures" of particular types of pests.

For example, in the event the central server or cloud-computing architecture 164 detects sounds that may be associated with pests, it notifies the occupants of such sounds and suggests hiring a pest control company. If it is confirmed that pests are indeed present, the occupants input to the central server or cloud-computing architecture 164 confirms that its detection was correct, along with details regarding the identified pests, such as name, type, description, location, quantity, etc. This enables the central server or cloud-computing architecture 164 to "tune" itself for better detection and create "signatures" or "fingerprints" for specific types of pests. For example, the central server or cloud-computing architecture 164 can use the tuning as well as the signatures and fingerprints to detect pests in other homes, such as nearby homes that may be experiencing problems with the same pests. Further, for example, in the event that two or more homes in a "neighborhood" are experiencing problems with the same or similar types of pests, the central server or cloud-computing architecture 164 can make inferences that nearby homes may also have such problems or may be susceptible to having such problems, and it can send warning messages to those homes to help facilitate early detection and prevention.

In some embodiments, to encourage innovation and research and to increase products and services available to users, the devices and services platform 200 expose a range of application programming interfaces (APIs) 210 to third parties, such as charities 222, governmental entities 224 (e.g., the Food and Drug Administration or the Environmental Protection Agency), academic institutions 226 (e.g., university researchers), businesses 228 (e.g., providing device warranties or service to related equipment, targeting advertisements based on home data), utility companies 230, and other third parties. The APIs 210 may be coupled to and permit third-party systems to communicate with the central server or the cloud-computing system 164, including the services 204, the processing engine 206, the home data 202, and the derived home data 208. For example, APIs 210 may allow applications executed by the third parties to initiate specific data processing tasks that are executed by the central server or the cloud-computing system 164, as well as to receive dynamic updates to the home data 202 and the derived home data 208.

For example, third parties can develop programs and/or applications, such as web or mobile apps that integrate with the central server or the cloud-computing system 164 to provide services and information to users. Such programs and application may be, for example, designed to help users reduce energy consumption, to preemptively service faulty equipment, to prepare for high service demands, to track past service performance, etc., or to perform any of a variety of beneficial functions or tasks now known or hereinafter developed.

According to some embodiments, third-party applications make inferences from the home data 202 and the derived home data 208, such inferences may include when are occupants home, when are they sleeping, when are they cooking, when are they in the den watching television, and when do they shower. The answers to these questions may help third-parties benefit consumers by providing them with interesting information, products and services as well as with providing them with targeted advertisements.

In one example, a shipping company creates an application that makes inferences regarding when people are at home. The application uses the inferences to schedule deliveries for times when people will most likely be at home. The application can also build delivery routes around these scheduled times. This reduces the number of instances where the shipping company has to make multiple attempts to deliver packages, and it reduces the number of times consumers have to pick up their packages from the shipping company.

Figure 3:
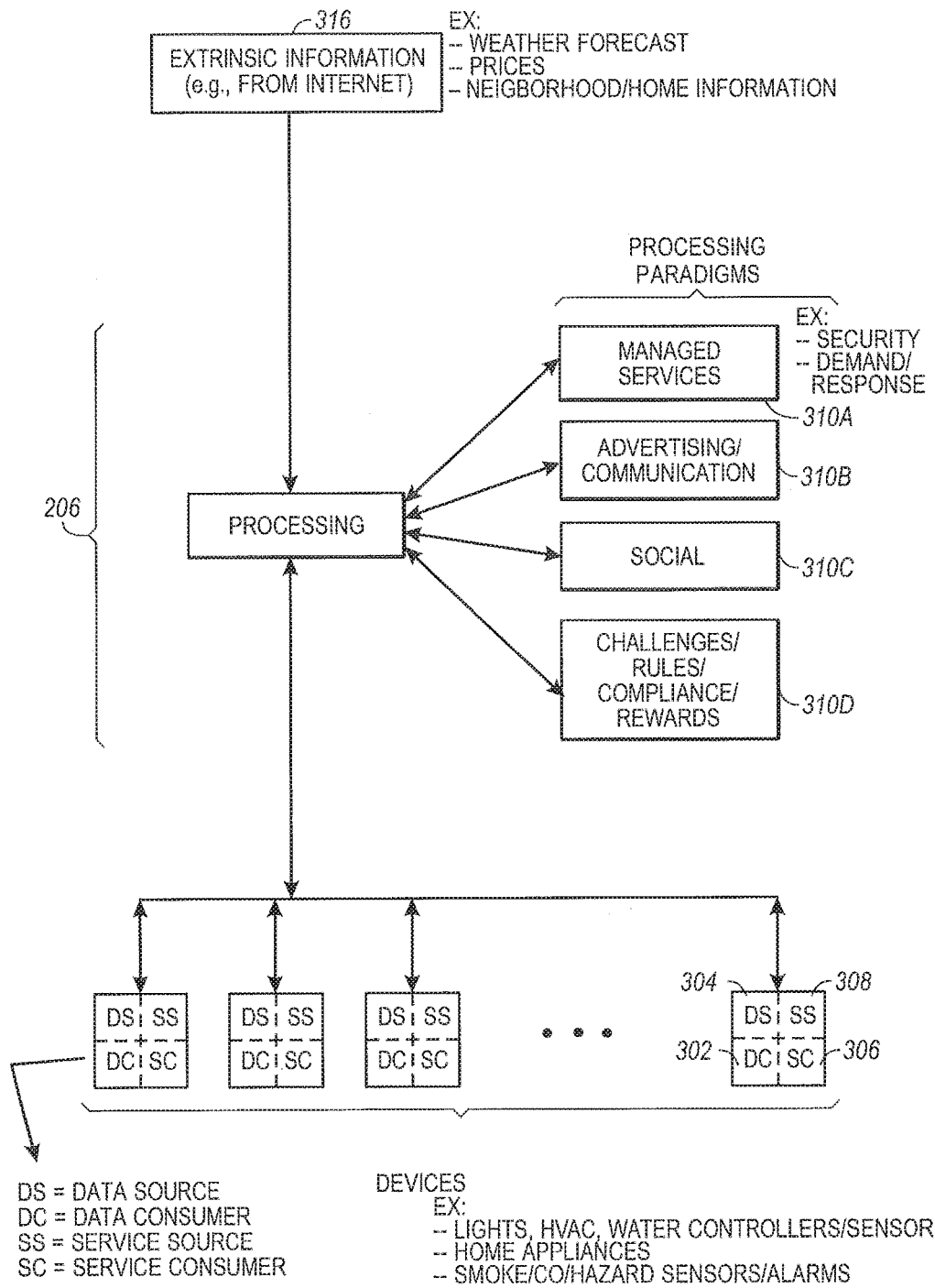
FIG. 3 illustrates a functional view of the extensible devices and services platform of FIG. 2, with reference to a processing engine as well as devices of the smart-home environment, according to an embodiment.

FIG. 3 illustrates an abstracted functional view of the extensible devices and services platform 200 of FIG. 2, with particular reference to the processing engine 206 as well as devices, such as those of the smart-home environment 100 of FIG. 1. Even though devices situated in smart-home environments will have an endless variety of different individual capabilities and limitations, they can all be thought of as sharing common characteristics in that each of them is a data consumer 302 (DC), a data source 304 (DS), a services consumer 306 (SC), and a services source 308 (SS). Advantageously, in addition to providing the essential control information needed for the devices to achieve their local and immediate objectives, the extensible devices and services platform 200 can also be configured to harness the large amount of data that is flowing out of these devices. In addition to enhancing or optimizing the actual operation of the devices themselves with respect to their immediate functions, the extensible devices and services platform 200 can be directed to "repurposing" that data in a variety of automated, extensible, flexible, and/or scalable ways to achieve a variety of useful objectives. These objectives may be predefined or adaptively identified based on, e.g., usage patterns, device efficiency, and/or user input (e.g., requesting specific functionality).

For example, FIG. 3 shows processing engine 206 as including a number of paradigms 310. Processing engine 206 can include a managed services paradigm 310a that monitors and manages primary or secondary device functions. The device functions can include ensuring proper operation of a device given user inputs, estimating that (e.g., and responding to an instance in which) an intruder is or is attempting to be in a dwelling, detecting a failure of equipment coupled to the device (e.g., a light bulb having burned out), implementing or otherwise responding to energy demand response events, or alerting a user of a current or predicted future event or characteristic. Processing engine 206 can further include an advertising/communication paradigm 310b that estimates characteristics (e.g., demographic information), desires and/or products of interest of a user based on device usage. Services, promotions, products or upgrades can then be offered or automatically provided to the user. Processing engine 206 can further include a social paradigm 310c that uses information from a social network, provides information to a social network (for example, based on device usage), and/or processes data associated with user and/or device interactions with the social network platform. For example, a user's status as reported to their trusted contacts on the social network could be updated to indicate when they are home based on light detection, security system inactivation or device usage detectors. As another example, a user may be able to share device-usage statistics with other users. In yet another example, a user may share HVAC settings that result in low power bills and other users may download the HVAC settings to their smart thermostat 102 to reduce their power bills.

The processing engine 206 can include a challenges/rules/compliance/rewards paradigm 310d that informs a user of challenges, competitions, rules, compliance regulations and/or rewards and/or that uses operation data to determine whether a challenge has been met, a rule or regulation has been complied with and/or a reward has been earned. The challenges, rules or regulations can relate to efforts to conserve energy, to live safely (e.g., reducing exposure to toxins or carcinogens), to conserve money and/or equipment life, to improve health, etc. For example, one challenge may involve participants turning down their thermostat by one degree for one week. Those that successfully complete the challenge are rewarded, such as by coupons, virtual currency, status, etc. Regarding compliance, an example involves a rental-property owner making a rule that no renters are permitted to access certain owner's rooms. The devices in the room having occupancy sensors could send updates to the owner when the room is accessed.

The processing engine 206 can integrate or otherwise utilize extrinsic information 316 from extrinsic sources to improve the functioning of one or more processing paradigms. Extrinsic information 316 can be used to interpret data received from a device, to determine a characteristic of the environment near the device (e.g., outside a structure that the device is enclosed in), to determine services or products available to the user, to identify a social network or social-network information, to determine contact information of entities (e.g., public-service entities such as an emergency-response team, the police or a hospital) near the device, etc., to identify statistical or environmental conditions, trends or other information associated with a home or neighborhood, and so forth.

An extraordinary range and variety of benefits can be brought about by, and fit within the scope of, the described extensible devices and services platform 200, ranging from the ordinary to the profound. Thus, in one "ordinary" example, each bedroom of the smart-home environment 100 can be provided with a smart wall switch 108, a smart wall plug 110, and/or smart hazard detectors 104, all or some of which include an occupancy sensor, wherein the occupancy sensor is also capable of inferring (e.g., by virtue of motion detection, facial recognition, audible sound patterns, etc.) whether the occupant is asleep or awake. If a serious fire event is sensed, the remote security/monitoring service or fire department is advised of how many occupants there are in each bedroom, and whether those occupants are still asleep (or immobile) or whether they have properly evacuated the bedroom. While this is, of course, a very advantageous capability accommodated by the described extensible devices and services platform, there can be substantially more "profound" examples that can truly illustrate the potential of a larger "intelligence" that can be made available. By way of perhaps a more "profound" example, the same bedroom occupancy data that is being used for fire safety can also be "repurposed" by the processing engine 206 in the context of a social paradigm of neighborhood child development and education. Thus, for example, the same bedroom occupancy and motion data discussed in the "ordinary" example can be collected and made available (properly anonymized) for processing in which the sleep patterns of schoolchildren in a particular ZIP code can be identified and tracked. Localized variations in the sleeping patterns of the schoolchildren may be identified and correlated, for example, to different nutrition programs in local schools.

Figure 4B:
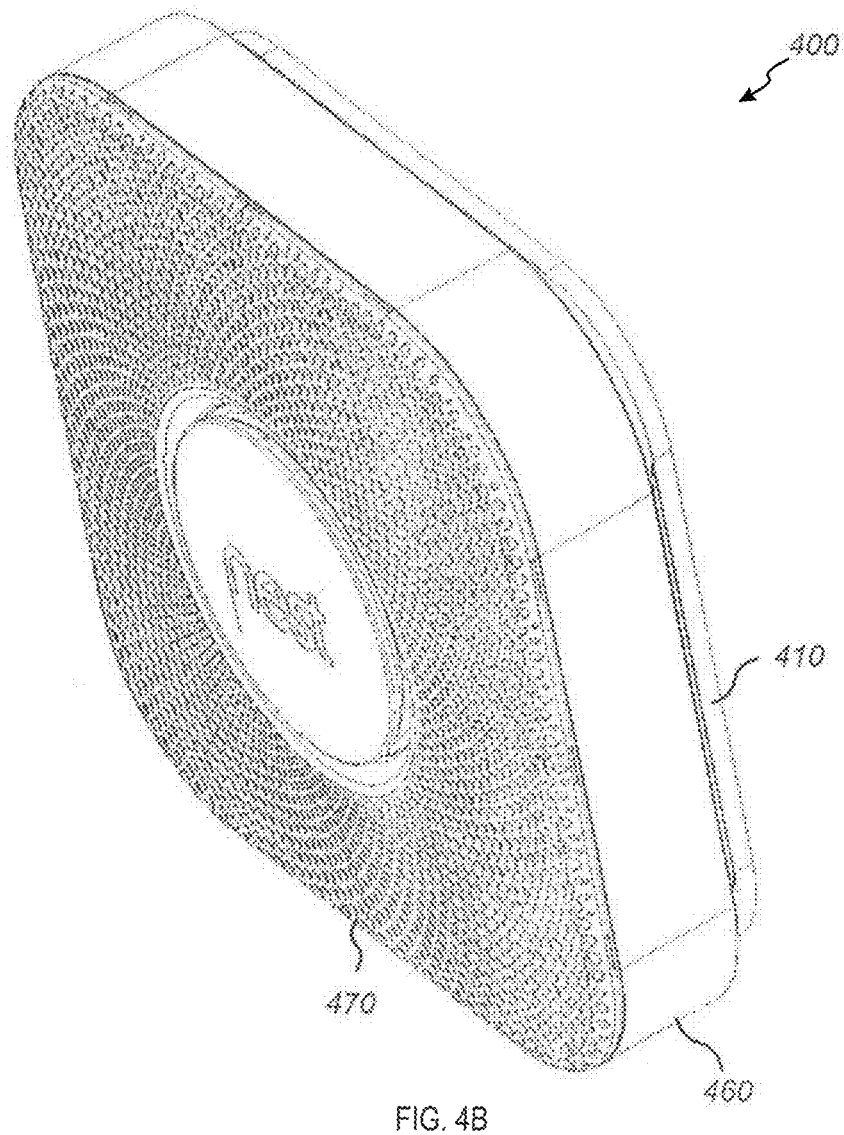
FIG. 4B illustrates an assembled perspective view of an intelligent, multi-sensing, network-connected hazard detector, according to an embodiment.

Referring now to FIGS. 4A and 4B, illustrated is a hazard detector 400 that may be used as part of a smart home environment 100 as previously described. FIG. 4A illustrates an exploded perspective view of the hazard detector 400, while FIG. 4B illustrates an assembled view of the same hazard detector 400. In one embodiment, hazard detector 400 is a smoke detector that is configured to detect the presence of smoke and sound an alarm to audibly warn an occupant or occupants of the home or structure of a potential fire or other danger. In other embodiments, hazard detector 400 may be a carbon monoxide detector, heat detector, and the like. In one embodiment, hazard detector 400 is a multi-sensing detector that includes a smoke detector, carbon monoxide detector, heat detector, motion detector, and the like. Many of the present teachings are particularly advantageous for embodiments in which the hazard detector 400 is a multi-sensing detector, particularly since combining the various sensing modes together into a single device can pose substantial challenges with respect to one or more of device compactness, component powering, and overall component governance and coordination.

For convenience in describing the embodiments herein, the device 400 will be referred to hereinbelow as smart hazard detector or hazard detector 400, although it should be realized that hazard detector 400 may include various other devices and that the scope of the present teachings is not necessarily limited to hazard detectors in which smoke is required as one of the anomalies to be detected. Thus, for example, depending on the particular context as would be apparent to a person skilled in the art upon reading the instant disclosure, one or more of the advantageous features and embodiments described herein may be readily applicable to a multifunctional hazard sensor that detects carbon monoxide and motion only, or pollen and motion only, or noise pollution and pollen only, and so forth. Nevertheless, the combining of smoke detection functionality with other sensing functions does bring about one or more particularly problematic issues that are addressed by one or more of the present teachings.

In one embodiment, hazard detector 400 is a roughly square or rectangular shaped object having a width of approximately 120 to 134 mm and a thickness of approximately 38 mm. Stated differently, hazard detector 400 is a multi-sensing unit having a fairly compact shape and size that may be easily attached to a wall or ceiling of a home or structure so as to be able, among other functionalities, to detect the presence of smoke and alert an occupant therein of the potential fire danger. As shown in FIG. 4A, hazard detector 400 includes a mounting plate 410 that may be attached to a wall of the building or structure to secure the hazard detector 400 thereto. Hazard detector 400 also includes a back plate 420 that may be mounted to the mounting plate 410 and a front casing 460 that may be coupled with or otherwise secured to back plate 420 to define a housing having an interior region within which components of the hazard detector 400 are contained. A circuit board 900 may be coupled with or attached to back plate 420. Various components may be mounted on circuit board 900. For example, a smoke chamber 430 may be coupled with or mounted on circuit board 900 and configured to detect the presence of smoke. In one embodiment, smoke chamber 430 may be mid-mounted relative to circuit board 900 so that air may flow into smoke chamber 430 from a position above circuit board 900 and below circuit board 900. A speaker 950 and alarm device (not numbered) may also be mounted on circuit board 900 to audibly warn an occupant of a potential fire danger when the presence of smoke is detected via smoke chamber 430. Other components, such as a motion sensor, carbon monoxide sensor, microprocessor, and the like may likewise be mounted on circuit board 900 as described herein.

In some embodiments, a protective plate 440 may be attached to or otherwise coupled with circuit board 900 to provide a visually pleasing appearance to the inner components of hazard detector 400 and/or to funnel or direct airflow to smoke chamber 430. For example, when a user views the internal components of hazard detector 400, such as through vents in back plate 420, protective plate 440 may provide the appearance of a relatively smooth surface and otherwise hide the components or circuitry of circuit board 900. Protective plate 440 may likewise function to direct a flow of air from the vents of back plate 420 toward smoke chamber 430 so as to facilitate air flow into and out of smoke chamber 430.

Hazard detector 400 may also include a battery pack 450 that is configured to provide power to the various components of hazard detector 400 when hazard detector 400 is not coupled with an external power source, such as a 120 V power source of the home or structure. In some embodiments, a cover plate 470 may be coupled with the front casing 460 to provide a visually pleasing appearance to hazard detector 400 and/or for other functional purposes. In a specific embodiment, cover plate 470 may include a plurality of holes or openings that allow one or more sensors coupled with circuit board 900 to view or see through a surface of cover plate 470 so as to sense objects external to hazard detector 400. The plurality of openings of cover plate 470 may be arranged to provide a visually pleasing appearance when viewed by occupants of the home or structure. In one embodiment, the plurality of openings of cover plate 470 may be arranged according to a repeating pattern, such as a Fibonacci or other sequence.

A lens button 1200 may be coupled with or otherwise mounted to cover plate 470. Lens button 1200 may allow one or more sensors to view through the lens button 1200 for various purposes. For example, in one embodiment a passive IR sensor (not shown) may be positioned behind the lens button 1200 and configured to view through the lens button 1200 to detect the presence of an occupant or occupants within the home or structure. In some embodiments, lens button 1200 may also function as a button that may be pressed by a user to input various commands to hazard detector 400, such as to shut off an alarm that is triggered in response to a false or otherwise harmless condition. Positioned distally behind lens button 1200 may be a light ring 1220 that is configured to receive light, such as from an LED or another light emitting element, and disperse the light within ring 1220 to provide a desired visual appearance, such as a halo behind lens button 1200. Positioned distally behind light ring 1220 may be a flexible circuit board 1240 that includes one or more electrical components, such as a passive IR sensor (hereinafter PIR sensor), LEDs, and the like. Flexible circuit board 1240 (hereinafter flex ring 1240) may be electrically coupled with circuit board 900 to communicate and/or receive instructions from one or more microprocessors mounted on a circuit board (not shown) during operation of hazard detector 400. Additional details of the components of hazard detector 400 are described in relation to FIGS. 5A-D and 6A-F.

FIG. 4B illustrates hazard detector 400 with the various components assembled. Specifically, this figure shows the mounting plate 410, front casing 460, back plate 420, and cover plate 470 in an assembled configuration with the various other components contained within an interior space of hazard detector 400. This figure also shows the plurality of holes or openings of cover plate 470 forming a visually pleasing design that is viewable by occupant of a room within which the hazard detector 400 is mounted. The lens button 1200 is shown attached to the hazard detector 400 so as to be centrally positioned with respect to cover plate 470. As briefly described, light ring 1220 may be used to provide a halo appearance of light around and behind lens button 1200. The assembled hazard detector 400 provides a compact yet multifunctional device.

Figure 5A:
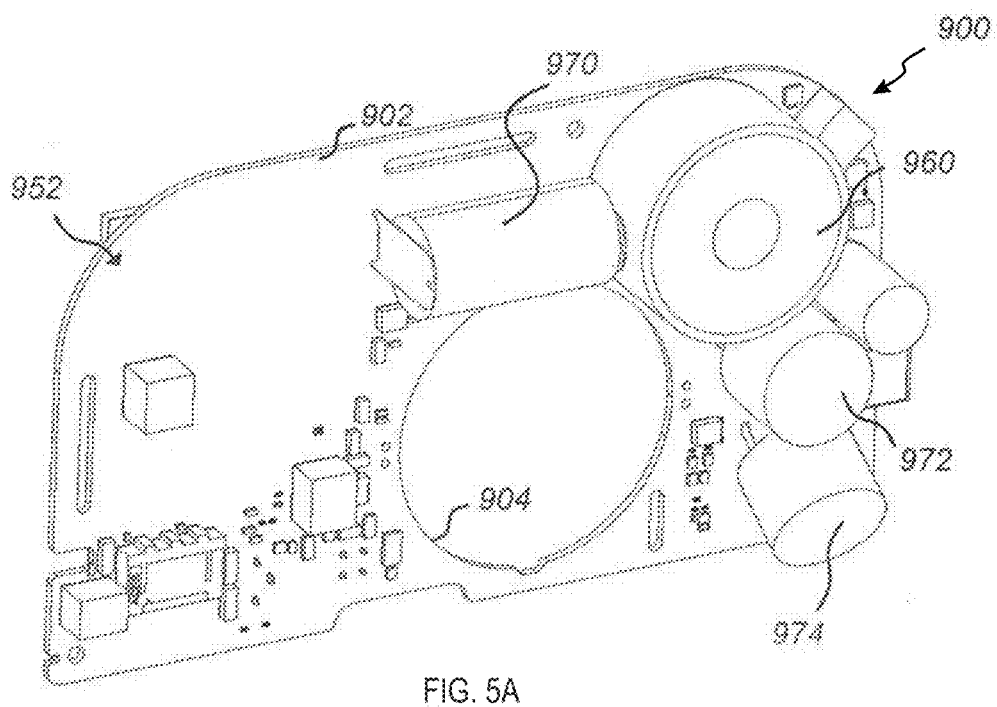
FIG. 5A illustrates a front perspective view of a circuit board of the hazard detector of FIGS. 4A-B, according to an embodiment.
Figure 5B:
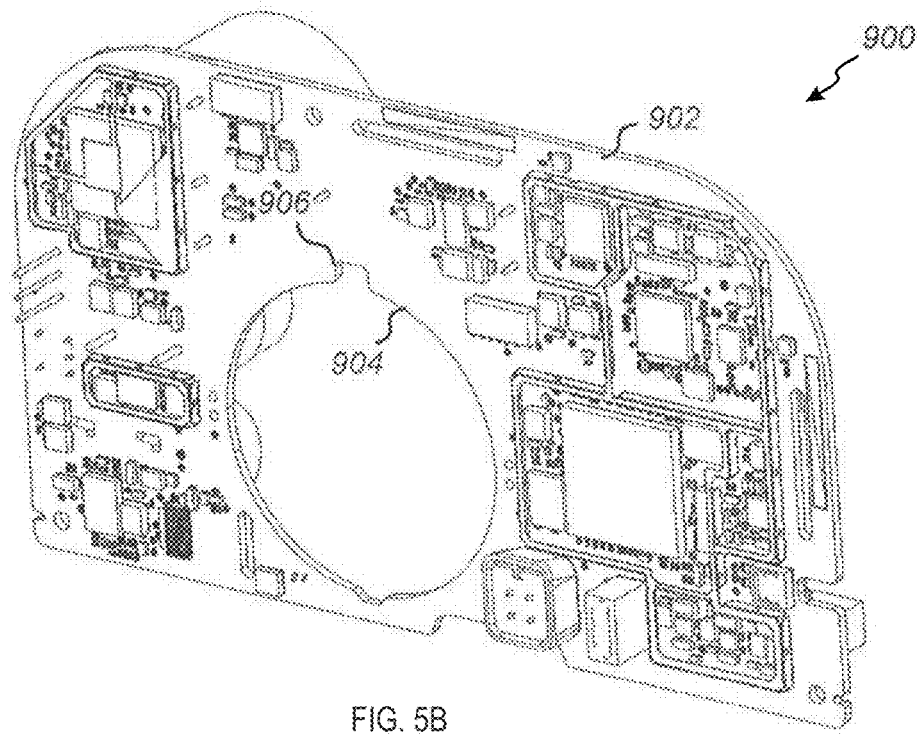
FIG. 5B illustrates a rear perspective view of the circuit board of FIG. 5A, according to an embodiment.

Referring now to FIGS. 5A and 5B, illustrated are front and rear perspective views of circuit board 900. Circuit board 900 includes a main body 902 having a front side or surface and a rear side or surface. As described herein, various electrical components are mounted on circuit board 900. In some embodiments, these components may be mounted on the front surface of circuit board 900, on the rear surface of circuit board 900 opposite the front surface, or on both surfaces of the circuit board 900. For example, in a specific embodiment one or more microprocessors and/or other processor related components may be mounted on the rear surface of circuit board 900 facing protective plate 440 while one or more functional components (e.g. an alarm device, CO detector, speaker, motion sensors, Wi-Fi network interface components, Bluetooth components for ordinary Bluetooth or low energy, 802.15.4 network interface components, such as a Zigbee device, and the like) are mounted on a front surface of circuit board 900 facing a room of the home or structure in which the hazard detector 400 is positioned. Other components may be mid-mounted relative to circuit board 900 so that opposing surfaces are positioned on opposing sides of the circuit board 900 as described herein.

As shown in FIG. 5A, in a specific embodiment the front surface of circuit board 900 may include a CO detector 970 that is configured to detect the presence of carbon monoxide gas and trigger an alarm device 960 if the carbon monoxide gas levels are determined to be too high. The alarm device 960 (which can be a piezoelectric buzzer having an intentionally shrill or jarring sound) may likewise be mounted on the front surface of circuit board 900 so as to face an occupant of the room in which the hazard detector 400 is positioned to alarm the occupant of a potential danger. Alarm device 960 may be configured to produce one or more sounds or signals to alert the occupant of the potential danger. The front surface may further include an area 952 in which a speaker 950 is positioned. Speaker 950 may be configured to provide audible warnings or messages to the occupant of the room. For example, speaker 950 may alert the occupant of a potential danger and instruct the occupant to exit the room. In some embodiments, speaker 950 may provide specific instructions to the occupant, such as an exit route to use when exiting the room and/or home or structure. Other messages may likewise be communicated to the occupant, such as to alert the occupant that the batteries are low, that CO levels are relatively high in the room, that hazard detector 400 needs periodic cleaning, or alert the occupant of any other abnormalities or issues related to hazard detector 400 or components thereof.

Circuit board 900 may also include one or more motion sensors mounted on the front surface thereof. The motion sensors may be used to determine the presence of an individual within a room or surrounding area of hazard detector 400. This information may be used to change the functionality of hazard detector 400 and/or one or more other devices connected in a common network as described previously. For example, this information may be relayed to a smart thermostat to inform the thermostat that occupants of the home or structure are present so that the smart thermostat may condition the home or structure according to one or more learned or programmed settings. Hazard detector 400 may likewise use this information for one or more purposes, such as to quiet the alarm device (e.g. gesture hush) as described herein or for various other reasons.

In one embodiment, a first ultrasonic sensor 972 and a second ultrasonic sensor 974 may be mounted on the front surface of circuit board 900. The two ultrasonic sensors, 972 and 974, may be offset axially so as to point in slightly different directions. In this orientation, each ultrasonic sensor may be used to detect the motion of an individual based on an orientation of the hazard detector 400 relative to the room and/or occupant. Detecting the motion of the individual may be used to quiet the alarm device as described herein (i.e., gesture hush) or for any other reason. In one embodiment, an axis of the first ultrasonic sensor 972 may be oriented substantially outward relative to hazard detector 400 while an axis of the second ultrasonic sensor 974 is oriented at an angle relative to the axis of first ultrasonic sensor 972. The first ultrasonic sensor 972 may sense motion of an individual when the hazard detector 400 is mounted on a ceiling of the home or structure. Because the first ultrasonic sensor 972 is oriented substantially outward relative to hazard detector 400, the first ultrasonic sensor 972 essentially looks straight down on individuals beneath hazard detector 400. The second ultrasonic sensor 974 may similarly sense motion of the individual when the hazard detector 400 is mounted on a wall of the home or structure. Because the second ultrasonic sensor 974 is oriented at an angle relative to the first ultrasonic sensor 972 and hazard detector 400, the second ultrasonic sensor essentially looks downward toward the floor when the hazard detector 400 is mounted on a wall of the home or structure, rather than looking directly outward as first ultrasonic sensor 972. In one embodiment, the angular offset of the two ultrasonic sensors may be approximately 30° or any other desired value.

In another embodiment, the two ultrasonic sensors, 972 and 974, may be replaced by a single ultrasonic sensor that is configured to rotate within hazard detector 400 so that the single ultrasonic sensor is capable of looking straight outward similar to first ultrasonic sensor 972 or capable of looking downward similar to second ultrasonic sensor 974. The single ultrasonic sensor may be coupled to circuit board 900 via a hinge that allows the ultrasonic sensor to rotate based on the orientation of hazard detector 400. For example, when hazard detector 400 is mounted to a ceiling of the home or structure, gravity may orient the ultrasonic sensor so as to look straight downward; whereas when hazard detector 400 is coupled to a wall of the home or structure, gravity may cause the ultrasonic sensor to rotate via the hinge and look downward toward a floor and relative to hazard detector 400. In another embodiment, a motor may be coupled with the single ultrasonic sensor so as to rotate the ultrasonic sensor based on the orientation of hazard detector 400. In this manner, the ultrasonic sensor may always point in a direction that is likely to detect motion of an individual within the room or space surrounding the hazard detector 400. In yet another embodiment, the single ultrasonic sensor may have a wide field of view that is able to substantially accommodate both mounting positions of the two ultrasonic sensors 972 and 974.

As shown in FIGS. 5A and 5B, body 902 of circuit board 900 also includes a substantially centrally located aperture 904 through which smoke chamber 430 is inserted so as to mid-mount the smoke chamber 430 relative to circuit board 900. Aperture 904 may also include a pair of notches 906 through which wires are inserted to electrically couple the smoke chamber 430 with circuit board 900. As previously described, mid-mounting of the smoke chamber 430 through an aperture 904 allows smoke and air to enter smoke chamber 430 from both the front surface or side of circuit board 900 and the rear surface or side of circuit board 900. Various aspects of the electrical components on the circuit board 900 are now described, the positions thereon of many of which will be apparent to the skilled reader in view of the descriptions herein and FIGS. 5A-5B. Included on the circuit board 900 can be several components, including a system processor, relatively high-power wireless communications circuitry and antenna (e.g., 802.11, ordinary Bluetooth, etc.), relatively low-power wireless communications circuitry and antenna (e.g., 802.15.4, Bluetooth low energy, etc.), non-volatile memory, audio speaker 950, one or more interface sensors, a safety processor, safety sensors, alarm device 960, a power source, and powering circuitry. The components are operative to provide failsafe safety detection features and user interface features using circuit topology and power budgeting methods that minimize power consumption. According to one preferred embodiment, a bifurcated or hybrid processor circuit topology is used for handling the various features of the hazard detector 400, wherein the safety processor is a relatively small, relatively lean processor that is dedicated to core safety sensor governance and core alarming functionality as would be provided on a conventional smoke/CO alarm, and wherein the system processor is a relatively larger, relatively higher-powered processor that is dedicated to more advanced features such as cloud communications, user interface features, occupancy and other advanced environmental tracking features, and more generally any other task that would not be considered a "core" or "conventional" safety sensing and alarming task.

By way of example and not by way of limitation, the safety processor may be a Freescale KL15 microcontroller, while the system processor may be a Freescale K60 microcontroller. Preferably, the safety processor is programmed and configured such that it is capable of operating and performing its core safety-related duties regardless of the status or state of the system processor. Thus, for example, even if the system processor is not available or is otherwise incapable of performing any functions, the safety processor will continue to perform its core safety-related tasks such that the hazard detector 400 still meets all industry and/or government safety standards that are required for the smoke, CO, and/or other safety-related monitoring for which the hazard detector 400 is offered (provided, of course, that there is sufficient electrical power available for the safety processor to operate). The system processor, on the other hand, performs what might be called "optional" or "advanced" functions that are overlaid onto the functionality of the safety processor, where "optional" or "advanced" refers to tasks that are not specifically required for compliance with industry and/or governmental safety standards. Thus, although the system processor is designed to interoperate with the safety processor in a manner that can improve the overall performance, feature set, and/or functionality of the hazard detector 400, the hazard detector 400 may meet core safety-related industry and/or government safety standards using only the safety processor. Being generally a larger and more capable processor than the safety processor, the system processor will generally consume more power than the safety processor when both are active.

Similarly, when both processors are inactive, the system processor will still consume more power than the safety processor. The system processor can be operative to process user interface features and monitor interface sensors (such as occupancy sensors, audio sensors, cameras, etc., which are not directly related to core safety sensing). For example, the system processor can direct wireless data traffic on both high and low power wireless communications circuitry, access non-volatile memory, communicate with the safety processor, and cause audio to be emitted from speaker 950. As another example, the system processor can monitor interface sensors to determine whether any actions need to be taken (e.g., shut off a blaring alarm in response to a user detected action to hush the alarm). The safety processor can be operative to handle core safety related tasks of the hazard detector 400. The safety processor can poll safety sensors (e.g., smoke, CO) and activate alarm device 960 when one or more of safety sensors indicate a hazard event is detected. The safety processor can operate independently of the system processor and can activate alarm device 960 regardless of what state the system processor is in. For example, if the system processor is performing an active function (e.g., performing a Wi-Fi update) or is shut down due to power constraints, the safety processor can still activate alarm device 960 when a hazard event is detected.

In certain embodiments, the safety processor may execute software that is updated or changed via software and/or firmware updates. In some embodiments, the software running on the safety processor may be permanently fixed and may never be updated via a software or firmware update after the hazard detector 400 leaves the factory. Compared to the system processor, the safety processor is a less power consuming processor. Using the safety processor to monitor the safety sensors, as opposed to using the system processor to do this, can yield power savings because safety processor may be constantly monitoring the safety sensors. If the system processor were to constantly monitor the safety sensors, power savings may not be realized. In addition to the power savings realized by using safety processor for monitoring the safety sensors, bifurcating the processors can also ensure that the safety features of the hazard detector 400 always work, regardless of whether the higher level user interface works. The relatively high power wireless communications circuitry can include, for example, a Wi-Fi module capable of communicating according to any of the 802.11 protocols.

By way of example, the relatively high power wireless communications circuitry may be implemented using a Broadcom BCM43362 Wi-Fi module, Bluetooth components, and/or other components. The relatively low power wireless communications circuitry can include a low power Wireless Personal Area Network (6LoWPAN) module or a ZigBee module capable of communicating according to an 802.15.4 protocol. Additionally or alternatively, the relatively low power wireless communications circuitry can include Bluetooth low energy (BLE) components. For example, in one embodiment, the relatively low power wireless communications circuitry may be implemented using an Ember EM357 6LoWPAN module. The non-volatile memory can be any suitable permanent memory storage such as, for example, NAND Flash, a hard disk drive, NOR, ROM, or phase change memory. In one embodiment, the non-volatile memory can store audio clips that can be played back using the speaker 950. The audio clips can include installation instructions or warnings in one or more languages. The interface sensors can includes sensors that are monitored by the system processor, while the safety sensors can include sensors that are monitored by the safety processor. Sensors 220 and 232 can be mounted to a printed circuit board (e.g., the same board processor 210 and 230 are mounted to), a flexible printed circuit board, a housing of system 205, or a combination thereof.

The interface sensors can include, for example, an ambient light sensor (ALS) (such as can be implemented using a discrete photodiode), a passive infrared (PIR) motion sensor (such as can be implemented using an Excelitas PYQ1348 module), and one or more ultrasonic sensors (such as can be implemented using one or more Manorshi MS-P1640H12TR modules). The safety sensors can include, for example, the smoke detection chamber 430 (which can employ, for example, an Excelitas IR module), the CO detection module 970 (which can employ, for example, a Figaro TGS5342 sensor), and a temperature and humidity sensor (which can employ, for example, a Sensirion SHT20 module). The power source can supply power to enable operation of the hazard detector and can include any suitable source of energy. Embodiments discussed herein can include AC line power, battery power, a combination of AC line power with a battery backup, and externally supplied DC power (e.g., USB supplied power). Embodiments that use AC line power, AC line power with battery backup, or externally supplied DC power may be subject to different power conservation constraints than battery only embodiments.

Battery-only powered embodiments are designed to manage power consumption of a finite energy supply such that hazard detector 400 operates for a minimum period of time of at least seven (7), eight (8), nine (9), or ten (10) years. Line powered embodiments are not as constrained. Line powered with battery backup embodiments may employ power conservation methods to prolong the life of the backup battery. In battery-only embodiments, the power source can include one or more batteries, such as the battery pack 450. The batteries can be constructed from different compositions (e.g., alkaline or lithium iron disulfide) and different end-user configurations (e.g., permanent, user replaceable, or non-user replaceable) can be used. In one embodiment, six cells of Li—FeS$_2$ can be arranged in two stacks of three. Such an arrangement can yield about 27000 mWh of total available power for the hazard detector 400.

Figure 5C:
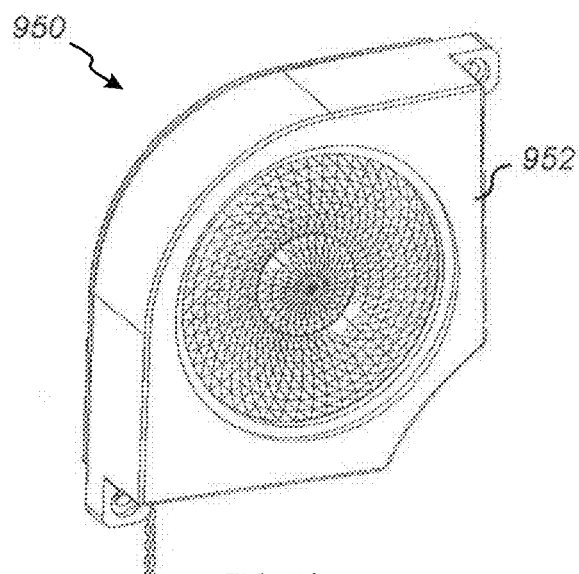
FIG. 5C illustrates a front rear perspective view of a speaker that is mountable on the circuit board of the hazard detector of FIGS. 5A-B, according to an embodiment.
Figure 5D:
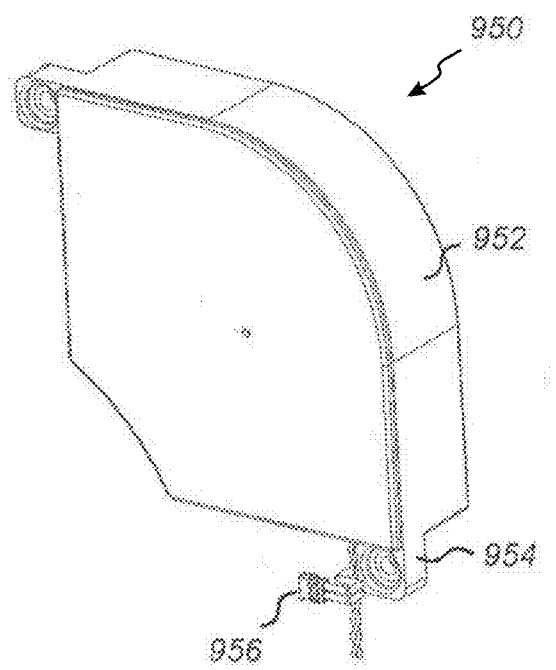
FIG. 5D illustrates a rear perspective view of a speaker that is mountable on the circuit board of the hazard detector of FIGS. 5A-B, according to an embodiment.

Referring now to FIGS. 5C and 5D, illustrated are front and rear perspective views of a speaker 950 that is electrically coupled with circuit board 900 so as to receive instructions therefrom. Speaker 950 includes a speaker body 952 and one or more mounting flanges 954 that allow the speaker 950 to be coupled with or mounted on front casing 460. Speaker 950 also includes a plug 956 or other mounting component that allows the speaker 950 to be electrically coupled with circuit board 900. As previously described, speaker 950 may be used to audibly alert an occupant of a room within which hazard detector 400 is positioned, or to provide other messages to the occupant of the room. For example, speaker 950 may be used to alert a firefighter or other rescuer regarding the occupants remaining in the home or structure after a fire or other danger is detected or may be used to inform an occupant of a safest route out of the home or structure.

Figure 6A:
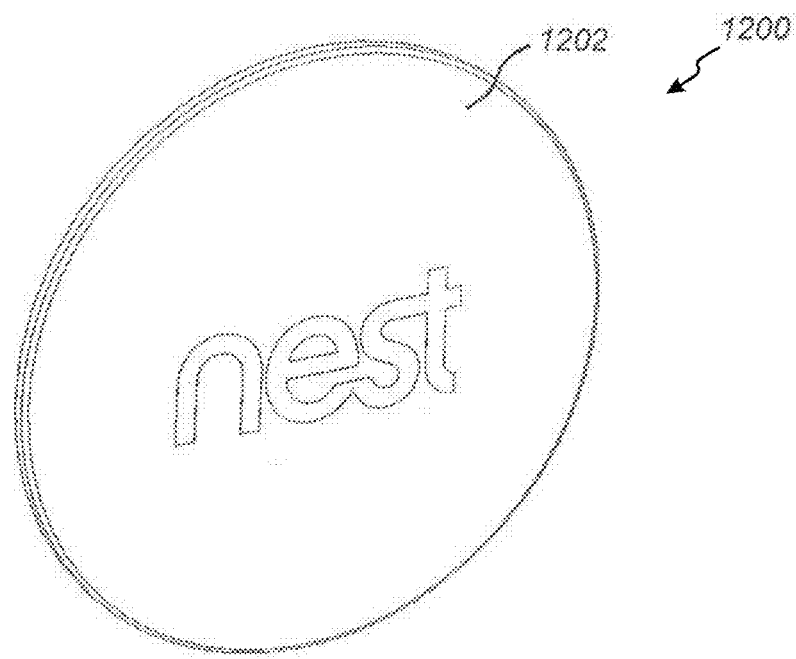
FIG. 6A illustrates a front perspective view of a lens button of the hazard detector of FIGS. 4A-B, according to an embodiment.
Figure 6B:
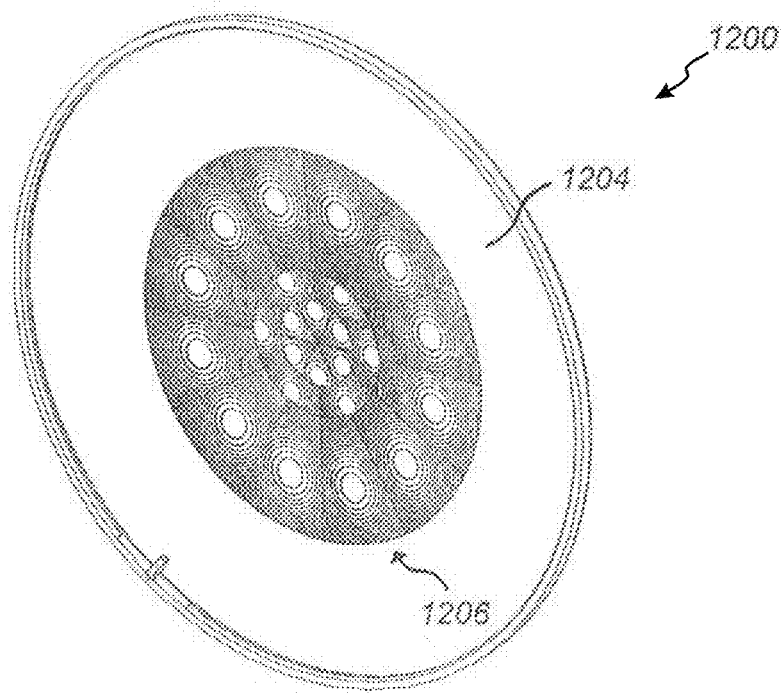
FIG. 6B illustrates a rear perspective view of the lens button of FIG. 6A, according to an embodiment.

Referring now to FIGS. 6A and 6B, illustrated are front and rear perspective views of a lens button 1200. Lens button 1200 includes a front surface 1202 and a rear surface 1204. Lens button 1200 is configured to be coupled with front casing 460 by attaching lens button 1200 to light ring 1220, and coupling light ring 1220 to a surface portion of front casing 460, as shown in FIG. 4B. Lens button 1200 is configured to be pressed by a user to provide input to hazard detector 400 and/or for various other purposes, such as quieting an alarm device. Lens button 1200 is further configured to be transparent to one or more sensors positioned behind lens button 1200. For example, in one embodiment, a PIR sensor is positioned behind lens button 1200. The PIR sensor is able to view external objects through lens button 1200 to determine if an occupant is present within a room in which hazard detector 400 is positioned.

The rear surface 1204 of lens button 1200 may have a Fresnel lens pattern 1206 that allows the PIR sensor, or another sensor, positioned behind lens button 1200 to view far into the room in which hazard detector 400 is positioned. In one embodiment, Fresnel lens pattern 1206 may include a plurality of concentrically arranged rings that each provides a slightly different viewing cone. Each concentrically arranged ring may provide a progressively larger viewing area or cone than rings concentrically arranged and located radially closer to a central axis of lens button 1200. In one embodiment, an internal angle of the viewing cones provided by Fresnel lens pattern 1206 may vary from between about 15° and about 150° so as to provide a viewing radius on a floor or wall positioned directly in front of the hazard detector 400 at a distance of approximately 10 feet or between about 0.5 m and about 8.8 m. In this manner, the PIR sensor, or other sensor, positioned behind lens button 1200 may easily detect the presence of an occupant within a room in which hazard detector 400 is positioned.

Figure 6C:
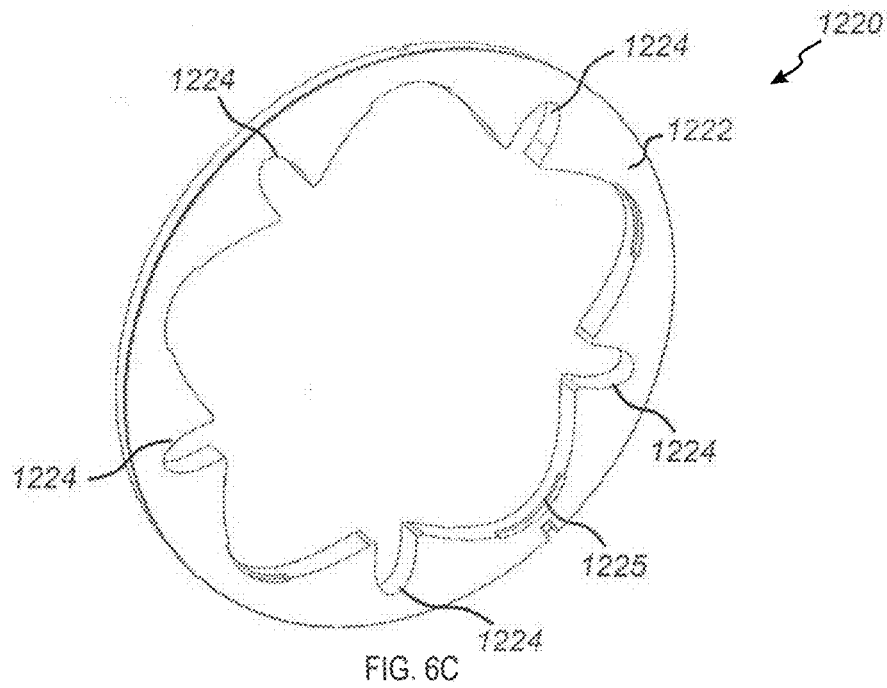
FIG. 6C illustrates a front perspective view of a light guide of the hazard detector of FIGS. 4A-B, according to an embodiment.
Figure 6D:
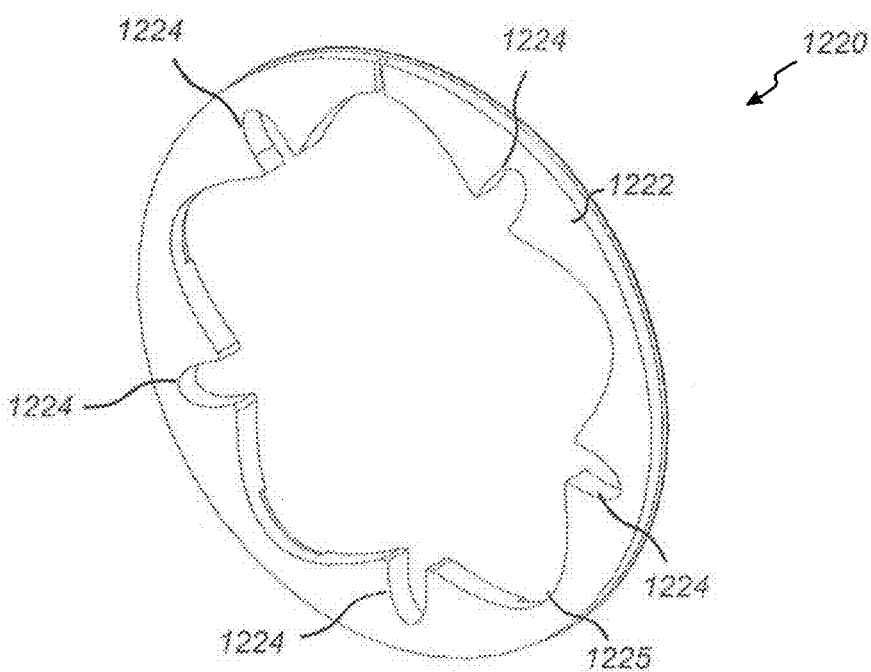
FIG. 6D illustrates a rear perspective view of the light guide of FIG. 6C, according to an embodiment.

Referring now to FIGS. 6C and 6D, illustrated are front and rear perspective views of a light ring 1220 that may be used to disperse light provided by an LED or other light source so as to provide a halo effect behind and around lens button 1200. Light ring 1220 includes a body portion 1222 and may be coupled with lens button 1200 via adhesive bonding or any other method known in the art. In turn, light ring 1220 may be coupled with front casing 460 such as by orienting light ring 1220 with respect to a surface of front casing 460 and pressing light ring 1220 axially downward relative to front casing 460 so that recessed portions 1225 of light ring 1220 mate and couple with tabs (not shown) of front casing 460. These tabs may fit over the recessed portions 1225 of light ring 1220 and secure light ring 1220 adjacent a surface of front casing 460. Light ring 1220 also includes a plurality of second recesses 1224 within which an LED (not shown) or other light source may be positioned to illuminate light ring 1220. In operation, light ring 1220 disperses light provided by the LED or other light source to provide a halo effect behind and around lens button 1200.

Figure 6E:
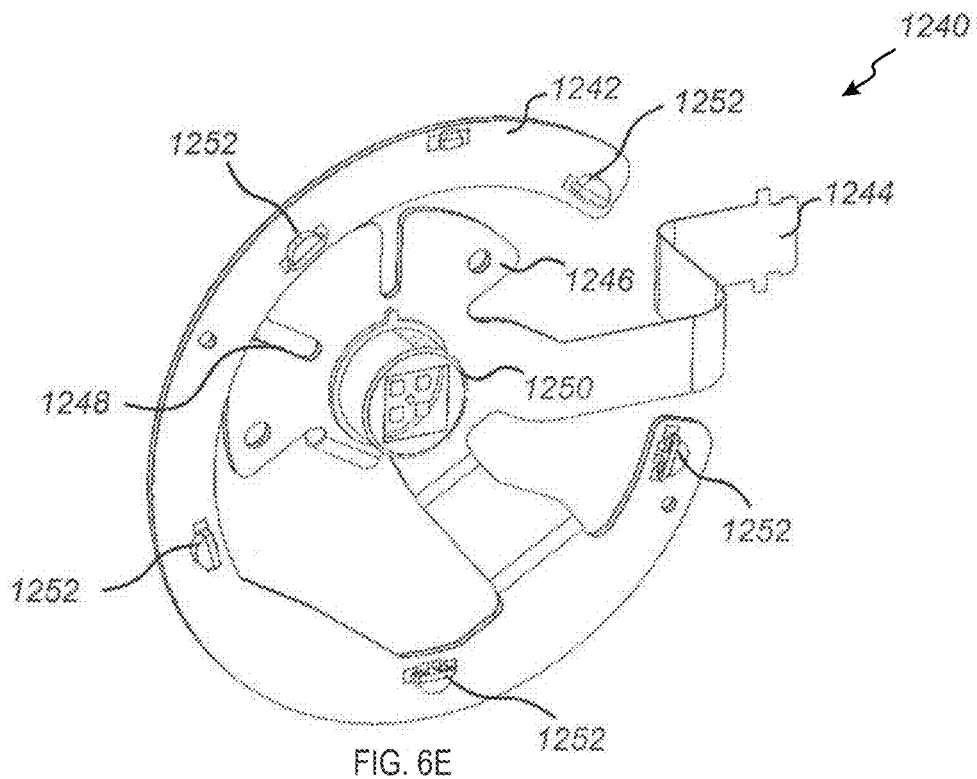
FIG. 6E illustrates a front perspective view of a flexible strip of the hazard detector of FIGS. 4A-B, according to an embodiment.
Figure 6F:
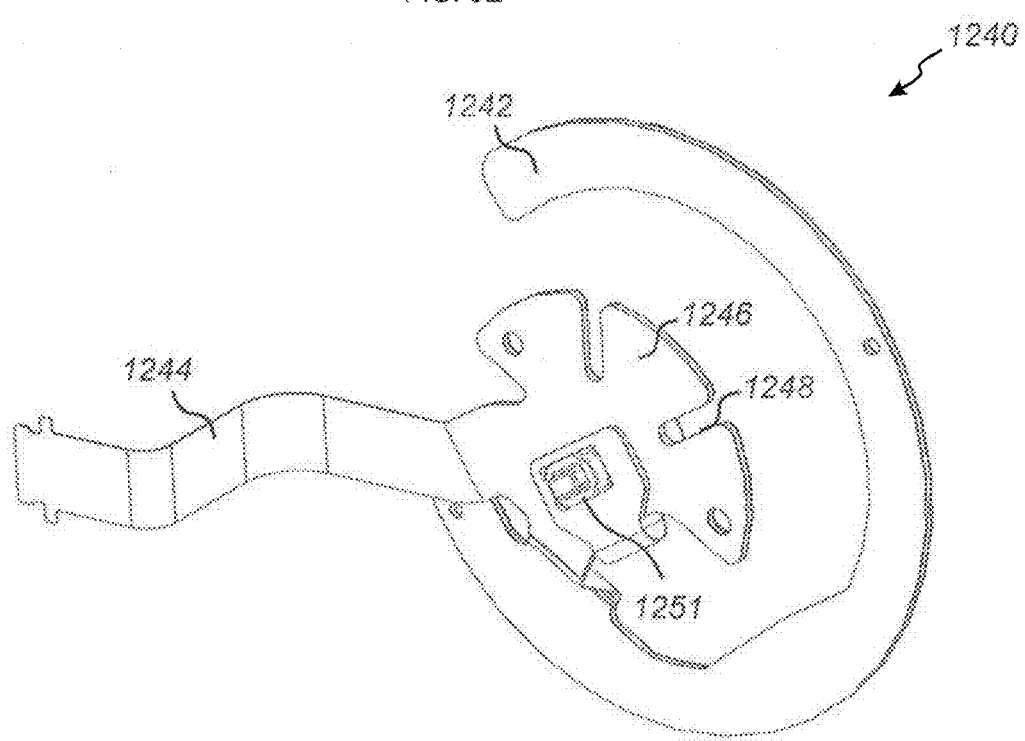
FIG. 6F illustrates a rear perspective view of the flexible strip of FIG. 6E, according to an embodiment.

Referring now to FIGS. 6E and 6F, illustrated are front and rear perspective views of a flexible circuit board or flex ring 1240 that may electrically couple components positioned in front of circuit board 900, such as lens button 1200, with circuit board 900. Flex ring 1240 includes a tail end or ribbon 1244 that may be insertable into a component of circuit board 900 to electrically couple lens button 1200, light ring 1220, and/or one or more components with circuit board 900. Flex ring 1240 also includes a central portion that may include a PIR sensor 1250 that is positioned so as to be behind lens button 1200. The central portion of flex ring 1240 further includes a plurality of flanges 1246 that mate with flanges (not shown) of front casing 460 so as to orient flex ring 1240 relative to front casing 460 and/or couple flex ring 1240 therewith. Specifically, a channel 1248 between flanges 1246 may fit around flanges (not shown) of front casing 460 to orient and couple flex ring 1240 with front casing 460. Flex ring 1240 further includes a circumferentially arranged ring portion 1242 having a plurality of LED lights 1252, or other source of light, coupled therewith. The plurality of LED lights 1252 are arranged so as to be insertable within recessed portions 1224 of light ring 1220. LED lights 1252 illuminate light ring 1220 as previously described. A bottom surface of the central portion of flex ring 1240 includes a button 1251 that is actuated as lens button 1200 is pressed by a user. In this manner, input is provided to the hazard detector 400 by the user as previously described.

II. Smart Hazard Drills

Electronic devices such as the hazard detectors 104 and 400 may identify and warn of a hazard in an actual emergency. Actual emergencies, however, are rare. When people confront unusual and unexpected hazard events, it may be extremely helpful to have practiced or prepared for them in advance. The smart home devices mentioned above, including the hazard detectors 104 and/or 400, may provide a framework to allow families and/or individuals to practice hazard drills (e.g., fire drills, smoke detection drills, carbon monoxide detection drills, earthquake drills, tornado drills, and so forth), to become better prepared in the unlikely event of an actual emergency.

FIG. 7 illustrates a process 1300 that may be employed for starting drills using the smart hazard detectors 104 and 400 and/or other smart devices. The process 1300 begins by verifying proximity of an initiator of the drill (block 1302). For example, such determinations may be made through wireless communications (e.g., Bluetooth, near field communications, and/or other short range wireless communications) or manual inputs (e.g., pressing manual button on a device in the smart network). Once the proximity of the initiator has been verified, devices in the smart network begin the drill (block 1304). In some embodiments, the drill may begin immediately, may be delayed a specific amount of time (e.g., 10 seconds), or may be scheduled for some time in the future.

Although the process 1300 includes proximity detection, other embodiments may include starting a drill remotely using other verification such, as passwords and/or certificates to verify that the drilling initiator has authority to do so. Moreover, in some embodiments, the drill may be initiated by a remote, paused, and continued by a device that is in proximity to one or more devices in the smart network.

a. Manual Proximity Detection

FIG. 8 illustrates a flowchart illustrating an embodiment of a drilling process 1306 that may be implemented by one of the smart devices or another electronic device (e.g., a personal handheld device such as device 166) (referred to in this section as the initiating device). The drilling process 1306 begins when an initiating device receives an indication from a user, such as a head of household, that a drill mode is to be initiated (block 1308). For example, in some embodiments, the initiating device may receive a selection within a user interface 1400 of a fire drill option 1402 as illustrated in FIG. 9.

As illustrated in FIG. 9, the user interface 1400 may include a status page for a specific hazard detector device through which the drill is to be initiated. As illustrated, the user interface 1400 may be presented via a smart phone, personal digital assistant, tablet computer, and/or other computing device. In some embodiments, a user interface may be presented using one or more smart devices (e.g., thermometer) coupled to the smart network. In the illustrated embodiment, the user interface 1400 includes a device identifier 1402 that identifies the device to which the device presenting the user interface 1400 is connected. The user interface 1400 also includes a status identifier 1404 that indicates a status of the device indicated by the device identifier 1402. The status identifier 1404 may include a ring that changes by status. For example, the ring may be green when everything is ok, may be yellow during an alert, red during an emergency, and/or orange during a drill. In certain embodiments, the status identifier 1404 may include other visual indicators that identify a status of the device. The user interface 1400 may also include auxiliary information 1406, such as a location for the device and textual information regarding a status of the device.

The user interface 1400 may also include settings 1408 that enables entry of one or more settings preferences for the drill, device, smart network, and/or other behaviors. Furthermore, the user interface 1400 may also include navigation controls 1410, such as a back button to return to a main menu that lists available devices to which the computing device causing the display of the user interface 1400.

The user interface 1400 may also include a drill item 1412 that may be used to begin the drill by sending the indication to the smart device as discussed in relation to block 1308 in FIG. 8. In some embodiments, multiple drill items may be presented using the user interface. For example, the user interface 400 may include a fire drill item, a CO drill item, and/or other drill types. The user interface 1400 may also include a checkup item 1414 that when selected verifies connection and/or functionality of the device. For example, the checkup item 1414 may be selected to cause the device to alarm without starting a drill on all devices in the smart network. The user interface 1400 may also include a history item 1416 that enables viewing of history of drilling, as discussed later.

In some embodiments, upon selection of the drill item 1412, the initiating device may advance the initiating device to an instruction page 1420 illustrated in FIGS. 10A-10C that explains the drill process to the user. In some embodiments, the instruction page 1420 may include a scrollable section 1422 that allows scrolling within the page to show different instructions based user swipes or other interactions. The instruction page 1420 may include an indication 1424 that displays whether additional information may be displayed and/or a sequence for which the information currently being displayed resides. In other embodiments, all information may be shown on a single page concurrently. The instruction page 1420 may also include status information 1426 that displays information indicating that the menu being navigated is for a specific drill type (e.g., fire drill). The status information 1426 can also include information about the most recently performed drill of the drill type. The instruction page 1420 may also include a cancel item 1428 that cancels the drill process and a start item 1430 that causes the drill process to proceed. As previously discussed, the instruction page 1420 may include different information for different portions of the drill process. For example, the instruction page 1420 may include beginning instructions 1432, mid-process instructions 1434, and/or process ending instructions 1436.

Returning to FIG. 8, the initiating device receiving the indication may also display instructions to the user to wake the hazard detector 400 to communicate with the device (block 1310). Specifically, the hazard detectors 400 in the home may be communicating with one another using relatively low-power wireless communication to conserve power. To be able to communicate outside of the low-power network with other devices, such as the initiating device or a service over the Internet, the hazard detectors 400 first may be awoken. Thus, in some embodiments, the instructions on the initiating device may direct the user to touch the lens button 1200 to cause the hazard detector 400 to awake as shown in the instructions 1438 of FIG. 11. In some embodiments, the instructions 1438 may include a continue item 1440 that may be selected to indicate that the device has been awakened. In certain embodiments, the device may send an indication to the initiating device to indicate that it has awoken.

In certain embodiments, when the hazard detector 400 awakens, it activates the higher power network radio (e.g., WiFi) to enable communication with the initiating device or a network service (e.g., a local or Internet service via an Internet gateway) that the initiating device has been communicating with. The hazard detector 400 that was awoken by the user may also send instructions to other devices by the relatively low-power wireless communication to wake up. After displaying the instructions, the initiating device may determine whether the hazard detector 400 has awoken or the network service may begin communicating with the hazard detector 400 (block 1312). In some embodiments, the initiating device may determine that the hazard detector 400 has awakened by completing a pairing communication with hazard detector 400. If the initiating device has not received an indication of waking from the hazard detector 400 or the network service, the initiating device may determine if a response period having a predetermined length has elapsed (block 1314). Once the period has elapsed, the initiating device may indicate that the connection has failed, such as the connection error screen 1800 illustrated in FIG. 12 (block 1316).

Returning to FIG. 8, in some embodiments, once the initiating device has received notification of wakefulness from the hazard detector 400, the initiating device may present instructions to the user to continue the process 1300 (block 1318). In some embodiments, the initiating device may instead proceed with the drill by receiving an indication to proceed (e.g., continue item 1440) prior to receiving notification of wakefulness. In certain embodiments, the continue item 1440 may be locked until the notification of wakefulness has been received. Upon selection of the continue button 1440, the initiating device may receive an indication to proceed (block 1320). In some embodiments, the drill beginning may be delayed for some period of time. For example, by delaying the drill beginning, a user pressing the button on the device may move away from the device after pressing the button before the device starts drilling. During this delay, the initiating device may display a delay screen 1442 as illustrated in FIG. 13. The delay screen 1442 may include a countdown 1444 that indicates how long until the alarm begins. The delay screen 1442 may also include a drill cancel item 1446 that, upon selection, cancels the drill.

Upon receipt of this indication, the initiating device may cause the drill to begin by sending an indication of initiation of the drill (block 1322). In some embodiments, this indication may be performed via the pairing communication initiated during the wakening process. As discussed below, in some embodiments, the drill may be performed at a time subsequent to the indication of desire to initiate a drill by scheduling the drill.

A family may initiate a practice hazard drill as discussed above. The instructions to the user displayed on the initiating device may explain how to conduct the drill with the various members of the household. The initiating device may also provide other information to the user to assist in the drill, such as a timer indicating elapsed time since the start of the drill. The initiating device may also instruct the user to make the drill as realistic as possible by placing the household members in the locations where they might be in an actual emergency (e.g., children in their respective rooms, etc.).

When the drill begins, the hazard detectors 400 may begin to sound an alarm. The alarm provided by the hazard detectors 400 may be substantially similar to the alarm that would be emitted in an actual emergency, but with certain specific changes. For example, between alarm soundings, the hazard detectors 400 may also state "THIS IS ONLY A DRILL" or provide a different indication that an actual emergency is not underway (e.g., showing a different color on the interface of the hazard detectors 400). In other embodiments, the hazard detectors 400 may sound an alarm that is exactly the same as would be emitted in an actual emergency and may not provide any other overt indication that a drill is occurring, other than starting based on the request of the user. In some cases, the hazard detectors 400 may initially announce that a hazard drill is about to occur, and thereafter emit an alarm exactly like that which would occur in an actual emergency.

As the hazard drill is performed, the initiating device may display instructions for the operator during the drill as well as a timer. For example, when the initiating device is a mobile phone, the device may show the drill screen 1450 illustrated in FIG. 14. The drill screen 1450 may also include a drill stop button 1452 that enables the user to stop the drill. In some embodiments, the drill screen 1450 may include a timer 1454 that indicates a duration of the alarm. The drill screen 1450 may also include a location indicator 1456. In some embodiments, the location indicator indicates a location that is selected by the user (before or during drill process), randomly selected, programmed, and/or otherwise selected. When the device is a thermostat, the device may show a drill screen 1460 illustrated in FIG. 15. As illustrated, the drill screen 1460 may indicate that a drill is underway and may include a drill stop interface button 1462 that enables the user to stop the drill by pressing on the initiating device.

During the hazard drill, the initiating device may be used to determine whether the drill is complete (block 1324). In some embodiments, the initiating device may determine that the drill is complete when the drill stop button 1452 or 1462 are pressed, a number of individuals have exited the building, a predetermined period of time has elapsed, or other indications of drill completion are received.

In some embodiments, drilling may be made into a game for the family to participate by setting goals based on house size, average times in a similar area, and/or previous drills. Before the drill is completed, the initiating device may determine whether a time limit for the alarm is specified and has been exceeded (block 1326). If a time limit exists and the time has been exceeded, the initiating device may display a timeout screen that informs the user that the drill took too long (block 1328). For example, as illustrated in FIG. 16, the device may display a timeout screen 1464 that enables the user to reattempt the drill via a retry button 1466 or remind the user to perform another drill in six months via a remind button 1468.

For example, one of the adults in a family of two adults and two children may initiate the hazard drill. The initiating adult may review the instructions on the initiating device and pass the instructions on to the rest of the family. As the hazard drill takes place, the adults may monitor the children and provide additional guidance to practice the safe completion of the drill.

If the drill is completed within the target goal time or no target goal is present, the initiating device may present a checklist of various actions to be performed during the drill (block 1330). For example, the initiating device may present a checklist page 1470 as illustrated in FIGS. 17A and 17B The checklist page 1470 includes a timer 1472 displaying how long the drill was active. The checklist page 1470 also includes a checklist 1474 that includes a number of actions to be performed during the drill.

The checklist 1476 includes an entry portion 1478 that allows entry of indications of whether the indicated action was performed during the drill. For example, using the entry portion 1478, a user may indicate whether doors were checked for heat before being opened, participants stayed at appropriate heights (e.g., bent low for fire/smoke and upright for CO), found a phone to call the fire department, met at a predetermined escape location, closed doors for fire drills, left doors open for CO, and/or other actions appropriate to a an event that is being emulated in the drill. As illustrated in FIG. 17A, the entry portion 1476 may include unchecked options that may be checked as illustrated in FIG. 17B. The checklist page 1470 also includes an acceptance item 1478 that may be selected when the entry portion 1476 is completed. Upon acceptance of the checklist, the initiating device determines whether all items in the checklist were marked as completed (block 1332).

If all items in the checklist were not completed, the initiating device presents information based on the checklist (block 1334). For example, an information page 1480, as illustrated in FIG. 18, may be presented by the initiating device. The information page 1480 may include a time indication 1482 that indicates how long the drill lasted. The information page 1480 also includes instructions 1484 that reflect actions that should have been taken during the drill. As illustrated, if a user did not indicate that doors were closed behind participants in the drill, the instructions 1484 inform the user that the doors should have been closed and inform the user that closing the doors slows the spread of fire during an actual fire. Similarly, the instructions 1484 may inform the user to call the fire department after completing the drill/fire exit, to plan an escape route that includes at least two routes for each person/location in the house, to stay low during fires, to stay upright during CO events, check doors for heat using the backs of hands before opening a door during a fire, and/or other similar safety tips.

As illustrated, the instructions 1484 may include a short description explaining why the actions are recommended. Furthermore, the instructions 1484 may include a link 1486 to additional information. The link 1486 may include hyperlinks to safety organization web pages and/or other locations explaining the importance of and the rationale behind the safety tips. The information page 1480 also includes an acceptance button 1488 that may be selected after the user has viewed the instructions 1484. In some embodiments, the instructions 1484 may span several pages and may be navigated using swipes or presses of the acceptance button 1448 to proceed to the next safety tip.

Figure 21:
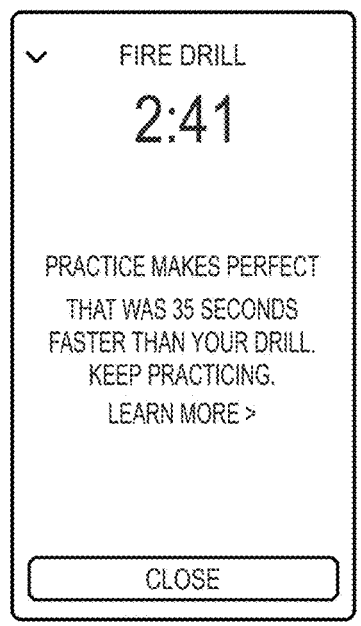
FIG. 21 illustrates a comparison screen that compares previously completed drill results, according to an embodiment.

After the drill has been completed, the initiating device may display a success screen that indicates information about the drill (block 1336). This information may be used to verify the proper completion of the hazard drill (e.g., to award insurance discounts or other preparedness incentives) and convey additional information to the user. In some embodiments, the device may display success screen 1500 of FIG. 19 when the drill is completed within a recommended amount of time regardless of whether the drill has a time limit. The display screen 1500 indicates a time 1502 for a duration of the drill and a commendation 1504 for timely completion. In embodiments with or without a time limit, a recommended completion time may exist (e.g., 2-4 minutes). If the drill is not completed within the recommended completion time (regardless of whether the drill timed out), an improvement page 1510 may be presented, as illustrated in FIG. 20. The improvement page 1510 includes a timer 1512 indicating the completion time for the drill and an encouragement portion 1514 encouraging the drill time to be improved and relative comparison of completion time to a recommended time based on similar-sized buildings, recorded times in similar areas, previously-conducted drills, and/or other factors relevant to drill times. In some embodiments, a completion screen 1520 may be presented to indicate completion time relative to other previously-completed drills, as illustrated in FIG. 21.

The completion screens 1500 and 1510 may include additional controls such as a retry button or a remind button. In some embodiments, the completion screen may include an option to initiate a social report (block 1338). For example, upon selection of a social report, the device may automatically send a report to a social network site or allow the user to send a report. In some embodiments, the report may be a post on a social media site. For example, a post might state, "We had a family fire drill. We all got out in 30 seconds."

Figure 22:
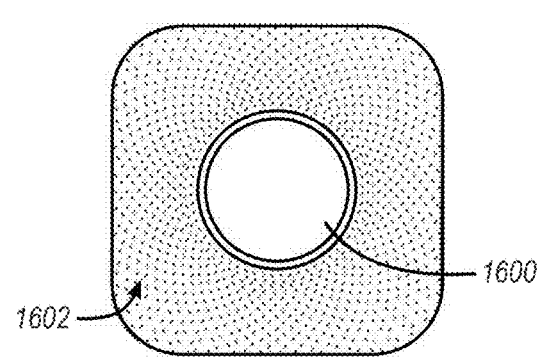
FIG. 22 illustrates a ring that may be depressed on a hazard detector to initiate the drill, according to an embodiment.

In some embodiments, the hazard drill may be initiated using only the hazard detector 400. For example, buttons or combination of button presses or patterns of button presses may be used to activate a drill mode within the hazard detector. For example, a button 1600 of a smart hazard detector 1602 of FIG. 22 may be pressed for ten or more seconds followed by a quick double press to initiate a drill mode for the hazard detector 400.

Figure 23:
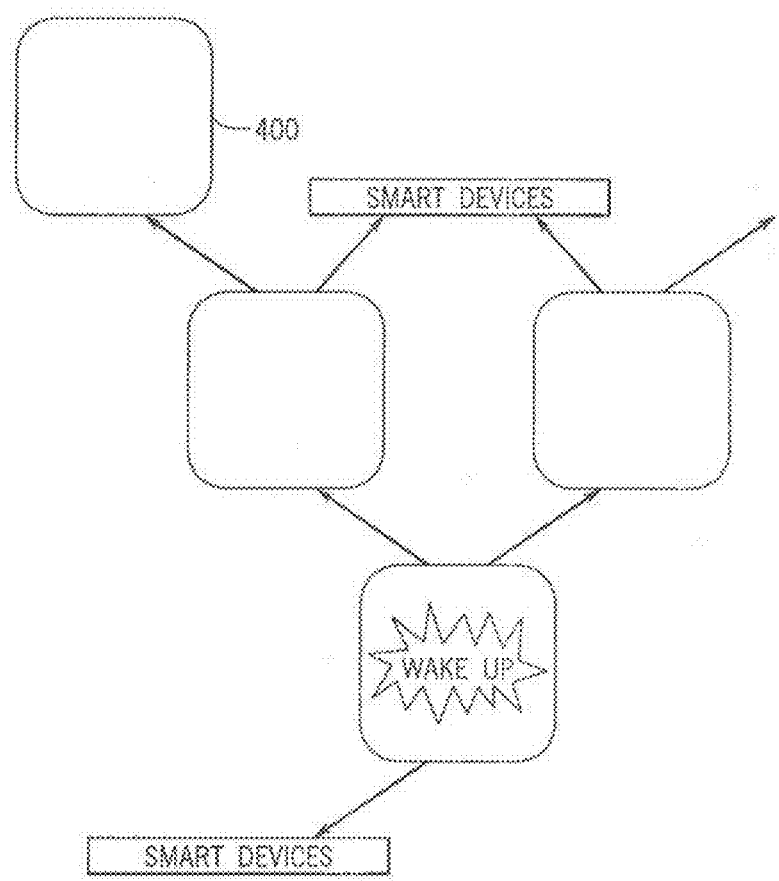
FIG. 23 illustrates a wake up and drill propagation scheme on a wireless mesh network, according to an embodiment.
Figure 24:
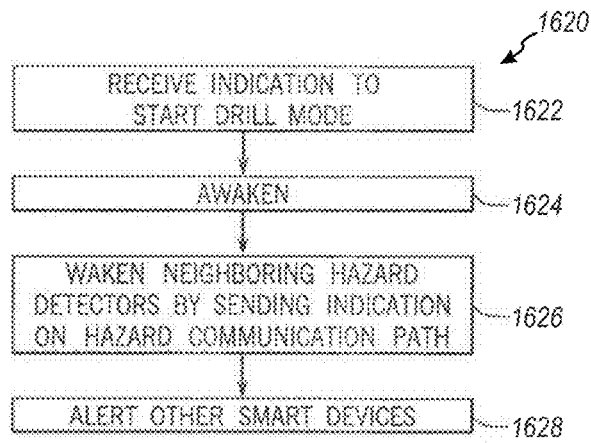
FIG. 24 illustrates a process that may be used to wake up and drill propagations using the scheme of FIG. 23, according to an embodiment.

As illustrated in FIG. 23, when the hazard detector 400 receives a drill mode activation via direct communication, another smart device, or from the network service that the initiating device is communicating with, the hazard detector 400 may wake up and then may wake and/or sound an alarm for other hazard detectors 400 as well as send drill information to other smart devices. FIG. 24 illustrates a process 1620 for awakening and notifying other hazard detectors 400. Upon receiving an indication to enter a drill mode (block 1622), the hazard detector 400 may awaken (block 1624) if in a sleep mode. In some embodiments, the awakening may occur during a next scheduled awaken period for the hazard detector 400. While the hazard detector 400 is awake and in a drill mode, the hazard detector may waken neighboring hazard detectors by sending an indication via a hazard communication path (block 1626). For example, the hazard detectors may communicate via an interconnection hardwire or a low power network connection (e.g., 802.15.4) that instructs the other hazard detectors to awaken an enter drill mode according to a pre-negotiated alarm profile, as described in U.S. patent application Ser. No. 14/588,104, entitled "Alarm Profile for a Fabric Network" filed on Dec. 31, 2014, which is incorporated by reference in its entirety.

In some embodiments, the hazard detector 400 may merely instruct other hazard detectors to awaken and communicate via the higher power network (e.g., WiFi) to enable the device or the hazard detector 400 to communicate via the higher power network. Furthermore, in some embodiments, the hazard detector 400 (or the initiating device initiating the drill) may alert other smart devices of the activation of a hazard drill mode. As will be discussed below, these alerted smart devices may be used in the drill to emulate behaviors in an actual emergency.

b. Wireless Proximity Detection

Figure 25:
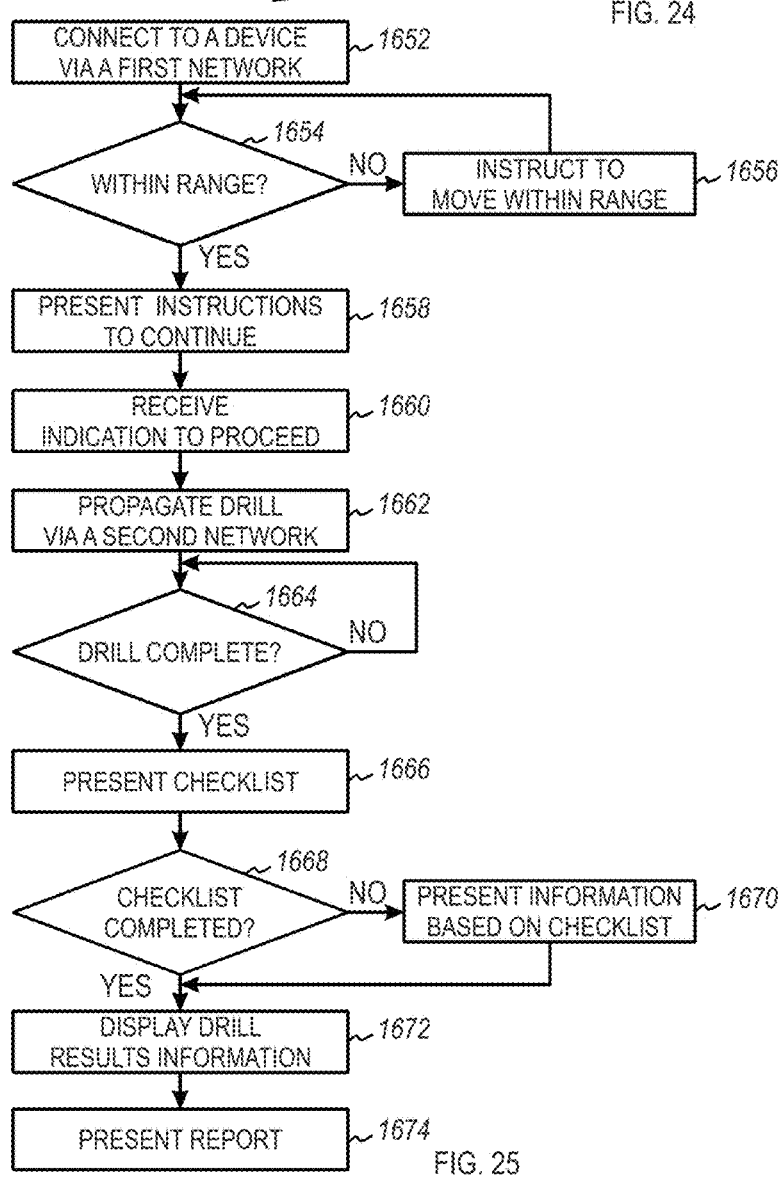
FIG. 25 illustrates a flowchart illustrating a process for starting an emergency drill using a wireless connection, according to an embodiment.

In both of the manual initiation scenarios discussed above, proximity detection is conducted by including physical interaction with one or more smart devices in the smart network at the location where the drill is to occur. However, in some embodiments, proximity detection may be completed without physical interaction with any devices in the network. For example, FIG. 25 illustrates a process 1650 that may be performed using a wireless network connection. The process 1652 begins when a hazard detector (or other smart device in the smart network) connects to an initiator device via a first network (block 1652). For example, a smart phone may connect to a hazard detector using a Bluetooth low energy (BLE) wireless connection and/or any other suitable wireless connection (e.g., 802.15.4, WiFi). The hazard detector then determines whether the initiating device is within a predetermined proximity of the hazard detector. For example, if the hazard detector connects to the initiating device using BLE, the hazard detector determines that the initiating device is within range. However, if the hazard detector connects to the initiating device using WiFi, the hazard detector may inspect a signal strength of the connection between the initiating device and a wireless router and/or geotagging information in a communication sent between the devices. Additionally or alternatively, the hazard detector may request the initiating device to verify proximity by connecting to one or more other smart devices in the smart network using a near field communication (NFC).

Until the initiating device can verify that it is within range of the hazard detector, the hazard detector may instruct the initiating device to move within range of the hazard detector by moving closer to the hazard detector (block 1656). Once the initiating device is within range of the hazard detector, the initiating device presents instructions to continue (block 1658). The initiating device receives an indication to proceed, e.g., via the user interface 1400 (block 1660). The hazard detector then propagates the drill to other hazard detectors and/or other smart devices over a second network (block 1662). For example, in at least one embodiment, the hazard detector connects to the initiating device using a BLE connection, but the hazard detector propagates the drill using an 802.15.4 network. The hazard detectors and smart devices in the smart network drill until the drill is complete (block 1664). After the drill has been completed, the initiating device presents a checklist (block 1666), as previously discussed. If the checklist has not been completed (block 1668), the initiating device presents information based on the checklist (block 1670). The information presentation scene may include all summary information for the drill. If the checklist has been completed, the initiating device may display drill result information (block 1672), as previously discussed. In some embodiments, the initiating device may be used to present a report to insurance organizations, social media, safety organizations, and/or social media. For example, the initiating device may request whether anonymized data may be shared with safety organizations to better compile safety information in homes.

c. Drill Scheduling

Figure 26:
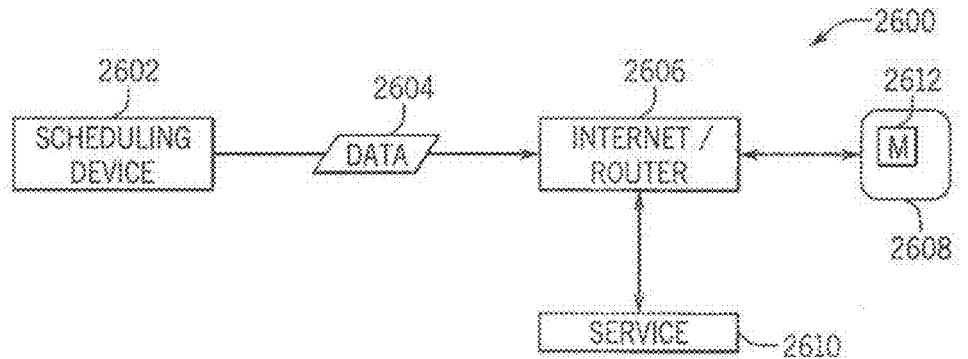
FIG. 26 illustrates a block diagram of a scheduling system that may be used to schedule a drill in the future, according to an embodiment.
Figure 27:
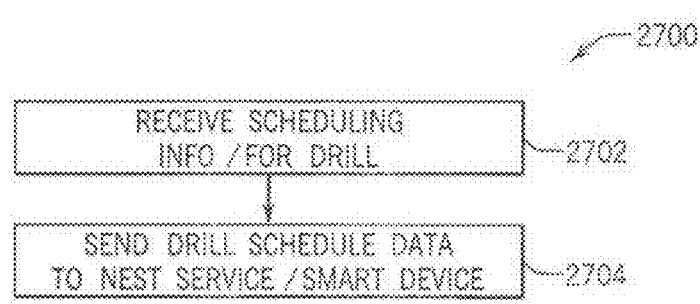
FIG. 27 illustrates a process that may be used to schedule a drill using the scheduling system of FIG. 26, according to an embodiment.

FIG. 26 illustrates a block diagram of a scheduling system 2600 that may be used to schedule a drill in the future. In the illustrated embodiment, a scheduling device 2602 may be used to schedule a drill. The scheduling device 2602 may include any electronic device that is capable of sending scheduling data 2604 via the Internet or router 2606 to one or more smart devices (e.g., hazard detector 2608), the service 2610, or other Internet services suitable for storing and scheduling drills. For example, the scheduling device 2600 may be used to perform the process 2700 of FIG. 27 to schedule the drill. The scheduling device 2600 may receive scheduling information for a drill (block 2702) via a respective interface (e.g., keyboard, touch screen, mouse, etc.). The scheduling device 2600 then may send the scheduling information to the service 2602 or a smart device for storage (block 2704). In some embodiments, the service 2610 may store information or scheduling information related to a drill until a predetermined period before the drill (e.g., a week). At this point, the service may send the scheduled drill information to a smart device for storage on the network. The scheduled drill information may be stored in a memory 2612 of the hazard detector 2608 or some other suitable device (e.g., thermostat) to be conveyed to the hazard detector 2608 at a later time. By storing the information locally, a scheduled drill may be conducted regardless of the availability of an Internet connection from the local smart network that has the smart devices.

Figure 28:
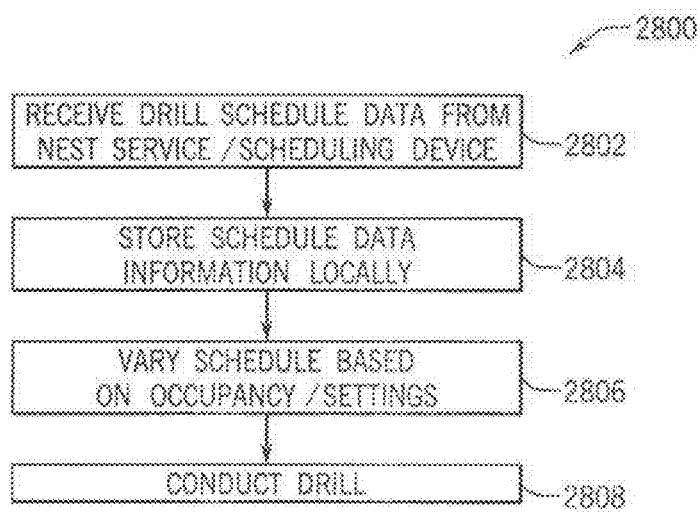
FIG. 28 illustrates a process for conducting a scheduled drill, according to an embodiment.

FIG. 28 illustrates a process 2800 for conducting a scheduled drill. The hazard detector 2608 may receive drill schedule data from the scheduling device 2602, the Nest service 2610 or another smart device (block 2802). The hazard detector 2608 then may store the schedule data information locally (block 2804). As discussed below, the schedule may be varied based on occupancy or other settings (block 2806). For example, the hazard detector 2608 may choose to delay a drill if the smart network has determined that less than a minimum number of users are in the building or proximity detection by an authorized person cannot be performed. In some embodiments, the hazard detector 2608 may also delay drills until users have been in the building for a predetermined period of time (e.g., more than 10 minutes). By delaying until after entry for some period, the hazard drill may more accurately reflect an emergency situation or allow the users to become settled before conducting the drill. At the originally scheduled time, or at a varied time, the hazard detector 2608 conducts the drill (block 2808). In some embodiments, the hazard drill may vary based on pre-entered or default settings.

Figure 29:
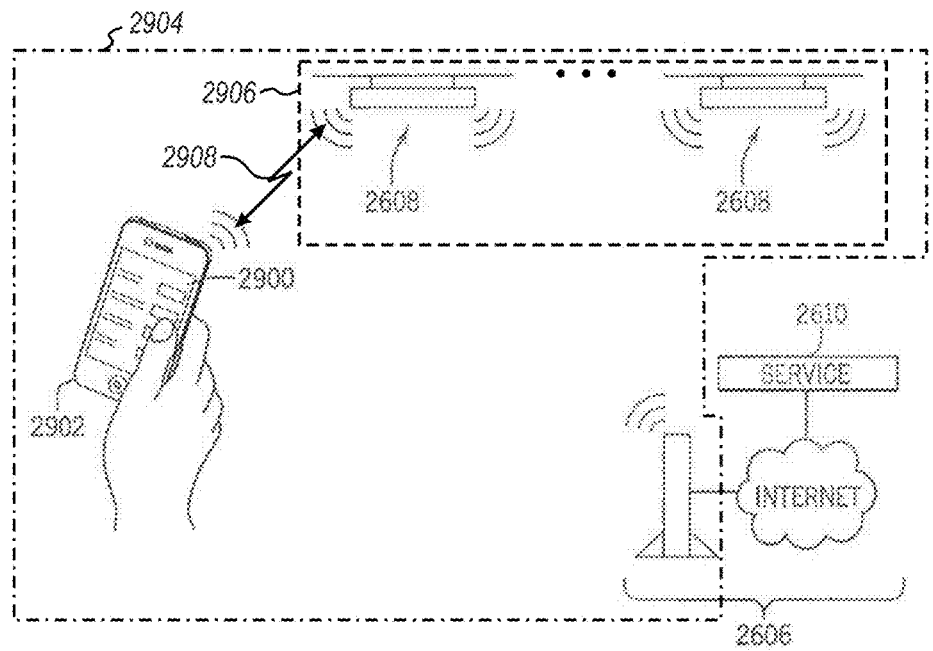
FIG. 29 illustrates a configuration screen used in a scheduling system, according to an embodiment.

FIG. 29 illustrates a configuration screen that may be used to configure drills via an electronic device 2902. The electronic device 2902 may be a scheduling device or any smart device that may be used to initiate a drill. FIG. 29 further illustrates that at least two networks 2904 and 2906 may be present in a single structure. In the illustrated embodiment, the electronic device 2900 and the hazard detectors 2608 connect to a WiFi network 2904, and the hazard detectors 2608 also interconnect using an 802.15.4 network 2906. Since, in some embodiments, the WiFi signal is not suitable for proximity detection due to relatively long connection distances, the electronic device 2900 may verify proximity to the hazard detector using auditory or optical methods. For example, the electronic device 2900 may produce an auditory tone or signal (e.g., ultrasonic signal) that may be detected by the hazard detector 2608 to verify that the electronic device 2900 is within a predetermined distance. Additionally or alternatively, the electronic device may produce light (e.g., infrared light). Moreover, in some embodiments, such signals may be broadcast by the hazard detector 2608 at a frequency that may be confirmed by the electronic device 2900 to verify proximity.

Figure 30:
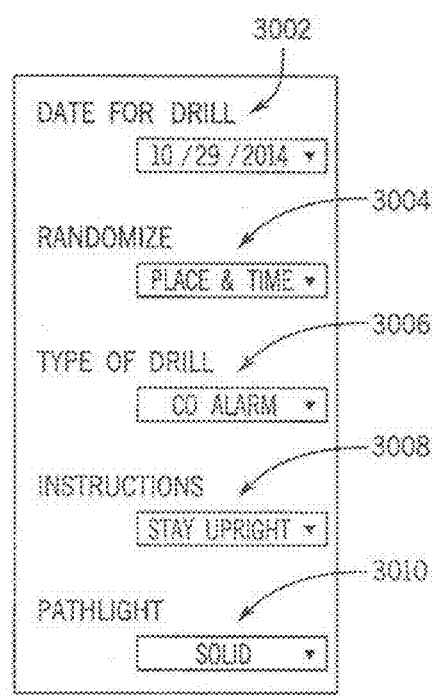
FIG. 30 illustrates a screen that may be used to enter or change settings used to perform a drill, according to an embodiment.

FIG. 30 illustrates a screen that may be used to enter or change settings used to perform a drill. In the illustrated embodiment, five options are presented for the user in a configuration screen 3000. The options may include various available options that the user may select or allow.

For example, the configuration screen 3000 may enable a user to select a future date for a scheduled drill via a time scheduling option 3002. In some embodiments, the time that may be selected may pertain to a specific month, week, range of days, a specific day or even a specific time within a day. In certain embodiments, the scheduled time of the drill may be randomized to some degree. For example, the hazard detector 400 may alternate between different locations in a home as the location of the hypothetical emergency for the drill. For example, in a first drill, the hazard detector 400 may announce that smoke has been detected in a first room, but during a second drill the hazard detector 400 may announce that smoke has been detected in a different room. During the hazard drill, then, the household members may practice the drill based on these different conditions. For example, when the hazard drill simulates that smoke has been detected in the first room, the household members may keep away from the first room on their way out of the building. When the hazard drill simulates that smoke has been detected in the second room, the household members may keep away from the second room on their way out of the building. Because the hazard detectors 400 may have occupancy sensors (which, although these may not be in use during an actual emergency, may be used during a drill), the occupancy sensors may be used to determine the location and manner of exit by the household members. The hazard detectors 400 thus may, in certain cases, use occupancy detection as a gauge for how well the hazard drill was performed by the household members. In the example, simulating smoke being detected in various rooms, the hazard detectors 400 may use occupancy detection to verify that the household members avoided those rooms.

The hazard detector 400 may also randomize a time of a drill to some degree. For example, in the randomize option 3004, a user might be presented with options to vary a drill start time by some amount (e.g., plus or minus 90 minutes). By increasing the level of randomness, a user might be more aware of what a reaction to an actual emergency rather than a response to a drill that the user knew the exact drill start time. The randomize option 3004 may enable a user to adjust the variation window in which the drill may be started by inputting a time via any suitable input mechanism such as a slider bar or text entry box.

The configuration screen 3000 may also present a type of drill option 3006 that enables a user to select which type of emergency to prepare for. For example, the type of drill may include a fire drill (e.g., smoke based alarm), CO drill, shelter-in-place drill, earthquake drill, flood drill, tornado drill, radon drill, or other suitable drill types. In real emergency situations, each of these emergencies may have a specific set of rules that may be emulated within a corresponding drill. These sets of rules may include instructions that are presented to building occupants visually or audibly. As will be discussed below, in some embodiments, additional devices may be controlled during the drill similarly to how they would be controlled during an actual emergency.

For example, when a fire drill is performed, devices may be switched off directly or using the smart outlets 110. Furthermore, in some embodiments, the configuration screen 3000 may present options for rules within each of the types of drills.

The configuration screen 3000 may further present an instructions option 3008 that controls which instructions are to be presented during the drill (and/or related emergencies). For example, the selected instructions may be audibly presented during a drill or an emergency by the hazard detector 400 or presented on one or more smart devices visually.

Figure 31:
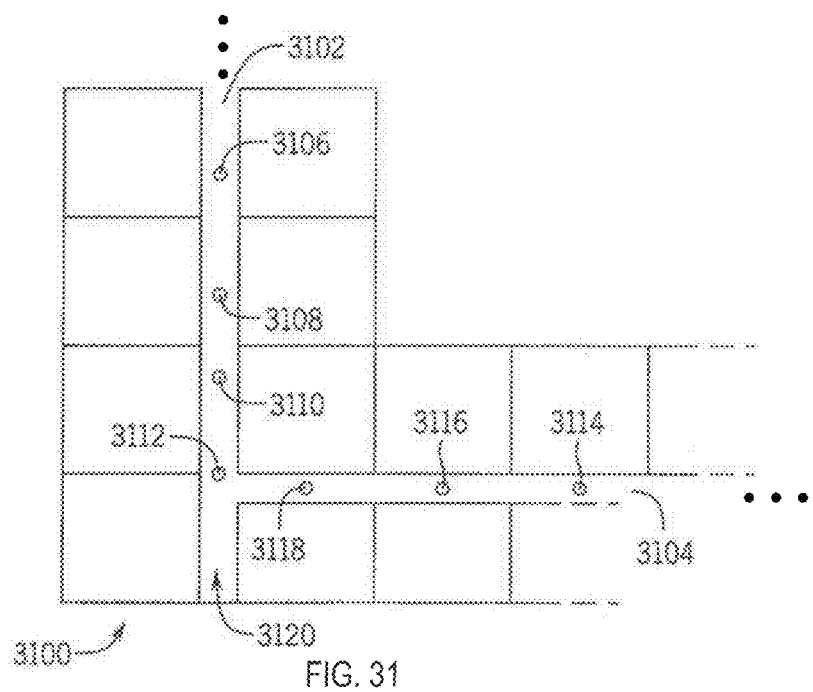
FIG. 31 illustrates a portion of a building that may use a sequential strobe during a drill or emergency, according to an embodiment.

The configuration screen 3000 may also include a pathlight option 3010 that controls use of LEDs or other controlled devices that may involve illumination during the drill or actual emergency. For example, a person may select a solid option for pathlight that causes hazard detectors 400 to brightly illuminate routes to increase visibility during a drill. For example, each hazard detector 400 may flash red as part of the alarm, but between flashes, the hazard detector 400 may flash white rather than flash off to increase visibility for the user. The pathlight option 3010 may also include a moving strobe that flashes in a linear pattern that will lead building occupants to an exit during a drill or an emergency, similar to exit lighting in an airplane. For example, FIG. 31 illustrates a portion of a building 3100 that includes two hallways 3102 and 3104. In each hallway, smart devices 3106, 3108, 3110, 3112, 3114, 3116, and 3118 (e.g., hazard detector 400) may be interconnected. In the hallway 3102, smart devices 3106-3112 may flash linearly to direct building occupants toward a fire exit 3120. Specifically, smart device 3106 may flash then smart devices 3108, 3110, and 3112 sequentially. Similarly, in the hallway 3102, the smart devices 3114, 3116, 3118, and 3112 may flash sequentially. By flashing the smart devices in such a manner even a building occupant unfamiliar with the building 3100 may be able to find the closest fire exit even when the building 3100 is relatively high.

Returning to FIG. 29, the configuration screen 3000 may include additional options, such as controls various rules for devices during drills. For example, the configuration screen 3000 may allow a user to indicate that the user does not desire for any smart devices to be disabled during the drill.

Figure 32:
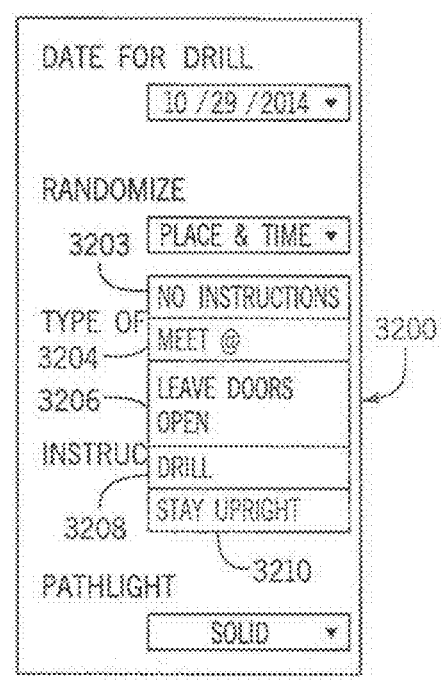
FIG. 32 illustrates an option selection interface that may be used to enter or change settings in the screen of FIG. 30, according to an embodiment.

FIG. 32 illustrates an option selection interface 3200 that enables a user to choose one or more selections in the configuration screen 3000. For example, the illustrated option selection interface 3200 includes options for presenting no instructions 3202 or presenting instructions stating the meeting location for the occupants 3204, instructions stating to leave doors open when exiting 3206, instructions informing occupants that the current alert pertains to drill 3208, or instructions stating that occupants should remain upright when exiting the building 3210. In some embodiments, only one option may be selected while other embodiments allow multiple selections.

d. Incentives for Hazard Drills

Figure 33:
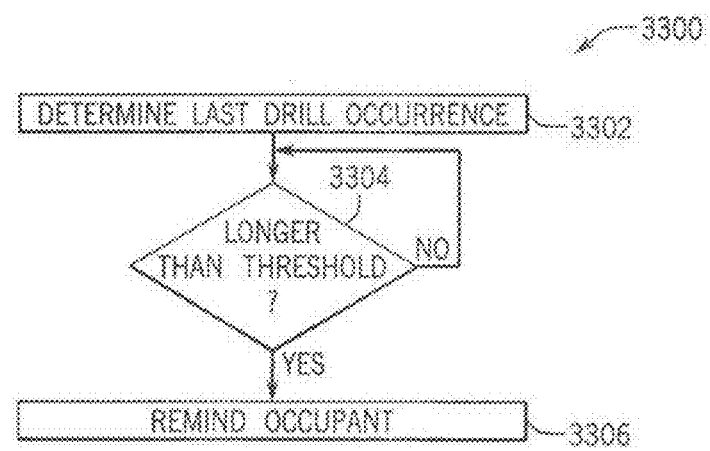
FIG. 33 illustrates a process for reminding a user to drill, according to an embodiment.

Using these options, a drill may be performed. However, in some situations, a user may forget to perform drills regularly. Accordingly, one or more smart devices in the smart network may track when and/or how drills are performed. Moreover, incentives such as monetary incentives (e.g., an insurance rebate) and/or social or intrinsic incentives (e.g., social reports to social media and/or badges or achievements) may be offered to encourage hazard preparedness by scheduling and conducting hazard drills. In some embodiments, the smart devices and/or a network service (e.g., the Nest service) may track each drill type to ensure that each drill type has occurred frequently and/or correctly. As illustrated in the process 3300 of FIG. 33, the smart device and/or a network service may determine when the last drill occurred using the tracked drill information (block 3302). The smart device determines whether the period since the last drill is greater than a threshold (block 3304). If the smart device determines that the last drill was performed more than a threshold in the past, the smart device may remind the occupant (block 3306). In some embodiments, the occupant may be reminded via audio message, a color change of an LED, an electronic message via email or text message using a remote service (e.g., Nest service), notification via a display of the smart device or another smart device in the smart network, another suitable method for reminding an occupant, or some combination thereof. In some embodiments, the reminder to the occupant may include incentives for conducting the drill, as will be discussed below.

Figure 34:
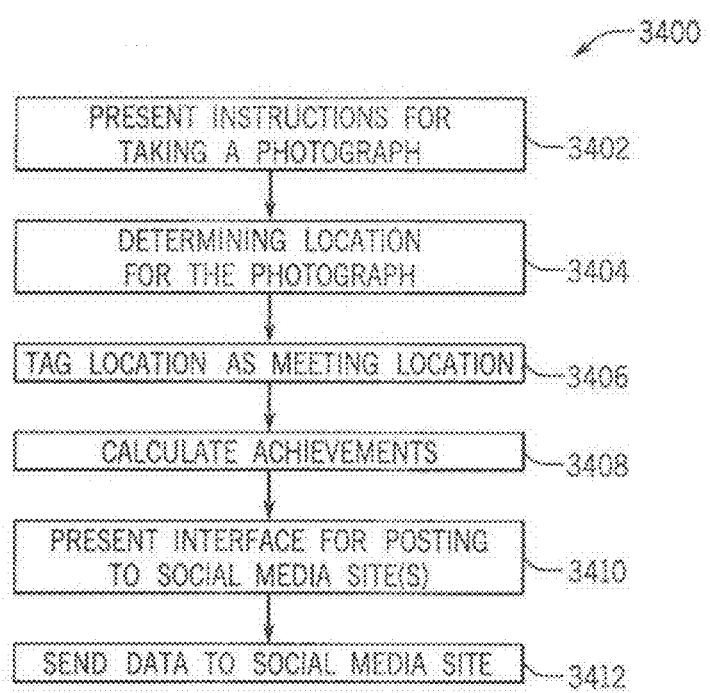
FIG. 34 illustrates a process that may be used to share drill information, according to an embodiment.

As discussed in reference to FIGS. 8 and 25, a drill may be followed by a social report. FIG. 34 illustrates a process 3400 that may be used to share drill information. An electronic device, such as a mobile phone used to initiate the drill, may present instructions to a user for taking a photograph after the drill (block 3402). The electronic device or another device may determine a location for the photograph (e.g., from geotagging information associated with the photograph and/or from a GPS measurement at the time of the photograph) (block 3404). Using this location information, the electronic device may associate the photo location as the meeting location after an emergency or drill (block 3406). Additionally or alternatively, this location information may be provided manually by the user who initiated the hazard drill or may be provided by indicating on the electronic device that the user has arrived at the meeting location (and a GPS measurement or other location information may be gathered by the electronic device at that point). In one embodiment, the electronic device or a network service (e.g., the service) may compare the location of the meeting point with the location of the building. If the location appears to be too remote or too close to the building, the electronic device or the network service (e.g., the service) may identify the meeting location as such. The electronic device and/or the network service (e.g., the service) may indicate to the user that the meeting point should be moved accordingly in future drills or in an actual emergency (e.g., to a location farther from the building). In some embodiments, the electronic device and/or the network service (e.g., the service) may correspondingly propose retrying the hazard drill with the new meeting point.

In some embodiments, this meeting location information may be shared with first-responder personnel to assist in responding to an actual emergency (e.g., fire or police). The location information associated as the emergency meeting location and/or the photograph may also be used in future hazard drills and/or in an actual emergency by the hazard detectors 400. For example, in a future drill or in an actual emergency, the hazard detectors 400 may announce "GET TO THE MEETING PLACE: ACROSS THE STREET AT 12420 SWEETWATER LANE" or "GET TO THE MEETING PLACE: BASEMENT TORNADO SHELTER" as appropriate. In addition, the photograph may also be used to identify the number of people who participated in the drill (e.g., by counting faces the number of faces in the drill completion photograph plus accounting for the person taking the photograph).

Continuing with the flowchart of FIG. 34, one or more smart devices may determine various information related to the drill, such as time of completion, whether everyone avoided the identified location of hazard (e.g., by noting occupancy or the lack of occupancy in places simulated as having smoke or fire), the number of people leaving the building (e.g., as detectable through the number of faces counted in the drill completion photograph, manual entry by the user of the initiating device, and/or by occupancy monitoring), noise level of occupants when leaving, and/or any other suitable factors that relate to proper hazard drill behavior. Using this information, the smart devices may calculate achievements related to proper execution of the drill (block 3408). In other words, the drill may be incorporated as part of a pseudo-game to incentivize preparedness through practicing hazard drills. In some embodiments, drill results may be integrated with a mobile device application that trains the family. In some embodiments, the electronic application may award achievements, post achievements to social sites, unlock portions of a game in or related to the electronic application based on achievements, award items in the game based on achievements, or other actions that may incentivize participation in a drill or training. Moreover, the achievements may be determined in any suitable way. For example, achievements may be given when a monthly frequency of drill practice exceeds a threshold (e.g., more than once every 6 months), when a threshold total number of drills has been completed (e.g., 2, 3, 4, 5, 6, or more drills), when certain types of drills have been completed (e.g., when smoke, CO, fire, and/or earthquake drills have been completed), when certain types of drills have been completed for certain geographic areas (e.g., an earthquake drill in California or a tornado drill in Oklahoma), when an absolute or average time of completion of the hazard drills falls beneath a threshold, when a hazard scenario is dealt with appropriately (e.g., a room simulated to have had smoke detected in it for the purposes of the hazard drill is avoided), and so forth. The electronic device may also present an interface for posting the received achievements, drill completion photograph, and/or other drill information to one or more social media sites (block 3410). In some embodiments, by posting the achievements to a social media site, various incentives may be provided to the user, such as financial incentives (e.g., discounts or rebates for hazard insurance), unlocking game portions of certain video games that may be locked until respective achievements have been attained, or certain media downloads (e.g., a free or discounted download from the Google Play store). After receiving an indication of a desire to post the information, the electronic device may send the drill information or achievement to the social media site (block 3412).

Figure 35:
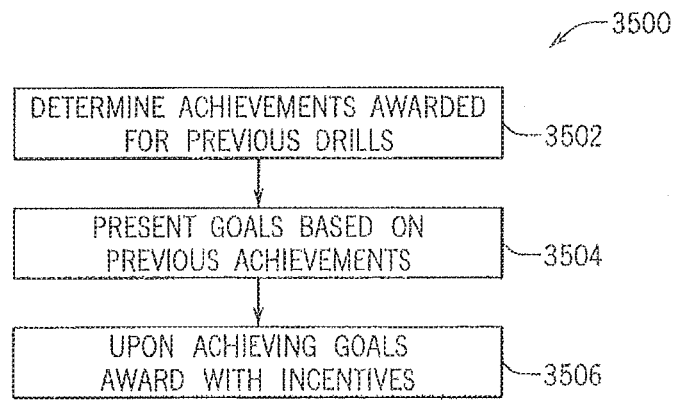
FIG. 35 illustrates a process for determining incentives, according to an embodiment.

As part of the game scheme for the drills, additional goals for future achievements or incentives may be based on previous achievements. FIG. 35 illustrates a process 3500 for determining incentives. The process 3500 begins by determining previous achievements awarded for past drills (block 3502). For example, a previous achievement may have been awarded due to completion of a previous drill or a completion time of the drill. Based on the previous achievements, goals are created and may be presented to the user (block 3504). For example, if a previous drill was completed in nine minutes, a new goal for the same drill type may be presented as an eight minute and thirty second target. In addition to the goal, the electronic device may present incentives for completing the next goal, such as financial discounts on insurance or level unlocks in a game related to drills or emergency situations. Upon achieving the goals, the incentives may be awarded (block 3506). In some embodiments, the electronic device may provide the user an option to select which of the incentives the user desires. For example, the electronic device may present a user an option to unlock a game level or receive a credit on insurance payments from the building owner's cooperating insurance company.

Figure 36:
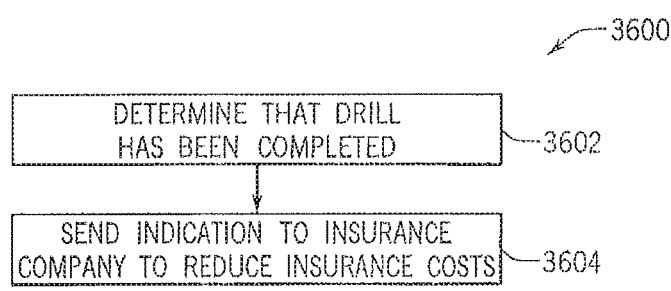
FIG. 36 illustrates a process for reducing insurance costs based on drills, according to an embodiment.

FIG. 36 presents a process 3600 for sending a notification to receive an insurance discount. Anytime that an electronic device determines that a drill has been successfully completed (block 3602), the electronic device may send an indication to the insurance company instructing the insurance company to reduce insurance costs to the building owner (block 3604). In some embodiments, the type of drill and various achievements may determine the amount of cost reduction. For example, a drill complete once a year may reduce insurance premiums by $1 monthly, but if a drill is complete once every six months may reduce insurance premiums by $2 monthly.

Figure 37:
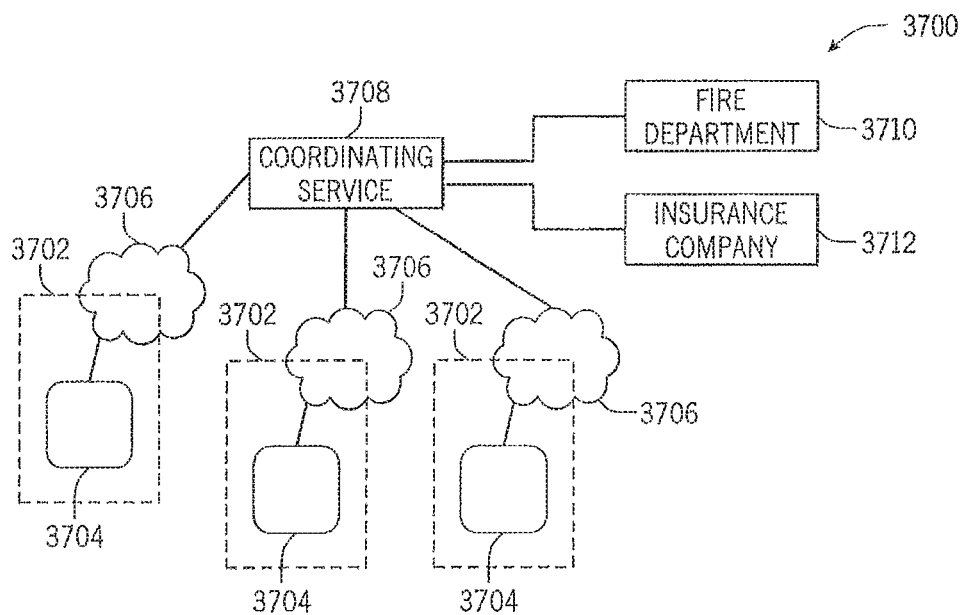
FIG. 37 illustrates a system in which drill completions may be verified, according to an embodiment.

FIG. 37 illustrates a system 3700 that may be used to inform communicate goals and achievements to occupants and share achievements with insurance companies. The system 3700 includes buildings 3702 that each include one or more smart devices 3704 (e.g., hazard detector 400) that connect through a network 3706 to a coordinating service 3708, such as the Nest service. When the coordinating service 3708 receives indication of a completed drill, the information may be sent to a fire department 3710 or an insurance company 3712.

e. Verifying Completion and Learning for Actual Emergency

Figure 38:
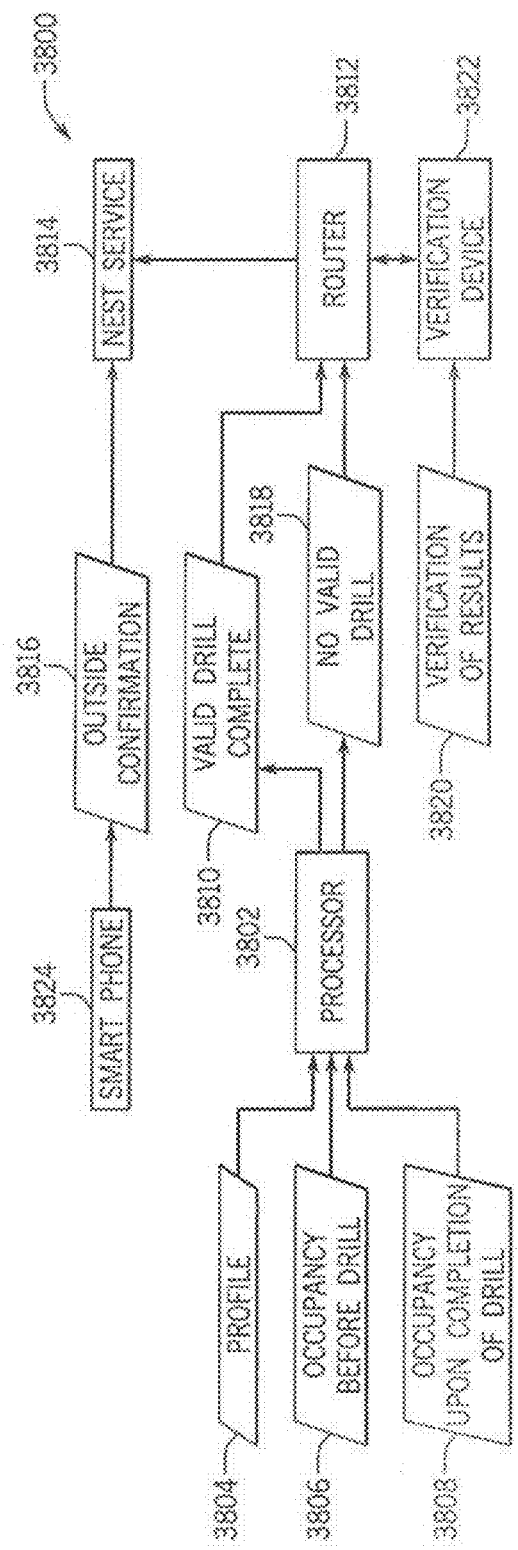
FIG. 38 illustrates a scheme for verifying that a drill has been successfully completed, according to an embodiment.

Because an insurance company may want to ensure that drills are successfully completed, additional verification measures may be provided. FIG. 38 illustrates a block diagram of a verification scheme 3800 that may be used to verify that the drill has been completed. Within the scheme 3800, a processor 3802 accesses a profile 3804, occupancy data reflecting a period before the drill 3806, and occupancy data reflecting a period after the drill 3808. The profile 3804 includes information related to occupants of the home. FIG. 39 illustrates a profile 3900 that may be used to verify completeness of drills as well as share important information with responders (e.g., fire department) when an emergency message is sent. As illustrated, the profile 3900 may include a number of adults 3902, information about the adults 3904, number of children 3906, information about the children 3908, number of pets 3910, and emergency contact information. The profile 3900 may also include other information that may be important in rescuing occupants during an emergency, such as locations of children within the home.

Returning to the example of FIG. 38, the processor 3802 may determine whether a drill is complete or incomplete. In some embodiments, the processor 3802 may determine that the drill is complete when the number of people leaving the building is equal to a percentage (e.g., 80%) of people on the profile or equal to the number of people detected in the house. In some embodiments, no drill may be verified if less than a number (e.g., 2) of people have left the building during the drill. If the processor 3802 determines that the drill is complete, a valid drill complete message 3810 is sent via a router 3812 that connects to the service 3814 to send an outside confirmation 3816 to an outside agency such as the insurance company 3712.

The scheme 3800 may also include an outside verification. For example, one or more buildings or building units may be synchronized between multiple units to be drilled concurrently. In some embodiments, the synchronized drill may be sent to the insurance company 3712 that may send a representative to ensure that the drills have been successfully completed. Additionally, or alternatively, occupants of one building or unit may confirm a completed drill of other buildings or building units in the area. For example, a coordinating user may be designated in a neighborhood or apartment complex to confirm that drills have been completed by sending a verification of results 3820 as the outside confirmation 3816. In some embodiments, the verification of results 3820 may be sent electronically using a verification device 3822 either directly with the confirmation service or via the service 3814. In some embodiments, the scheme 3800 may employ additional devices to determine when a drill has been properly completed. For example, a smart phone 3824 may send GPS data as outside confirmation 3816 that the user has exited the building.

f. Types of Hazard Drills and Coordination by Disparate Building Devices

As previously discussed, the hazard detector 400 may be used to determine or notify building occupants of various emergency types. To prepare for each emergency type, when scheduling or starting a drill, the drill initiation smart device may request a desired drill type from a user (block 4000). As previously discussed, in some embodiments, during a configuration of a drill, the configuring smart device may present options for types of drills to be initiated or scheduled. For example, the configuring device may present an option to perform a fire drill, a CO drill, an earthquake drill, a flood drill, a tornado drill, a hurricane drill, a shelter in place drill. The configuring smart device may then receive an indication of drill type (block 4002). In some embodiments, the smart device may present options related to the selected drill type. Using either default or received options, the smart device may then send instructions to other smart devices to perform drill-type specific actions during the drill (block 4004).

For example, during a smoke alarm drill or emergency event, the hazard detectors 400 or other smart devices may instruct the occupants to leave the building while remaining low, the lights may be bright or hued (e.g., orange or yellow which is less likely to cause glare in smoke), unlock the doors, contact emergency personnel, turn on the irrigation system to reduce likelihood of fire spreading to neighbors, turn on lights to illuminate exit path by switching smart switches, or performing other actions to aid occupants in exiting the building or protecting the building. The smart devices may also switch off non-essential devices during the drill or emergency. For example, during a fire drill, the smart network may instruct a dryer, refrigerator, HVAC, or other large appliances to switch off to reduce power consumption or electrical current through the house during a fire. Although it may be appreciated, that in some embodiments, it may be desirable to contact emergency personnel only during emergencies. In other embodiments, emergency personnel may be involved in drills and contacted as part of the drill either before or during the drill. Additionally or alternatively, a pseudo-emergency personnel contact may be used during a drill to emulate an actual emergency situations. For example, an application running on a smart phone may run a prerecorded message similar to questions that may be asked by emergency personnel during an actual emergency.

During a CO drill, the hazard detectors or other smart devices may instruct the occupants to exit the building while remaining upright, instruct occupants to open windows if they can be opened safely, unlock windows and doors, instruct users to leave the door open, turn on ceiling fans, contact emergency personnel, or other actions that may aid the occupants in exiting the building or ventilating the building.

During an earthquake drill, the hazard detectors 400 or other smart devices may instruct the occupants to remain in the house but go to safest places (e.g., under a desk or door jam), turn off one or more devices such as HVAC, stove, dryer, or other devices, or perform other actions that may aid in an earthquake. Similarly, during a tornado or hurricane, similar actions may be taken. During a flood drill or emergency, the smart devices may contact emergency personnel, turn off irrigation systems, or instruct the occupants to remain indoors or leave the building based on the advancement of the storm, elevation of the house, location of flood plains, or other factors. During a shelter in place drill, the smart devices may instruct the occupants to stay in doors, lock doors and windows, and stay away from windows. The smart devices may also switch off devices such as televisions, stereos, and lights.

As may be appreciated, the smart network may employ multiple devices that are not conventionally automated to assist during drills or emergencies. For example, devices that may be employed during a drill or emergency may include smart switches, refrigerators, dryers, washing machines, televisions, smart outlets, thermostats, irrigation systems, handheld devices, door locks, window locks, security sensors, or other devices that may aid during a drill or emergency. However, due to different building sizes, building shapes, and arrangements of devices within the buildings, it may be useful to use drills as learning periods or fine tuning periods to confirm that devices comply with desired device behavior during a drill or emergency. For this reason, in some embodiments, the questionnaire 2204 presented to a user after a drill may confirm device behavior complies with desired actions during the drill or emergency (block 4102), as illustrated in FIG. 41. In some embodiments, the questionnaire 2204 may be available at any point (e.g., via an account profile), but a reminder to update the questionnaire 2204 may be presented at the time of completion of the drill. If some of the devices are not initially behaving as desired, a configuration device may be used to adjust undesired behaviors (block 4104). For example, the configuration device may be used to train the devices how to sequentially strobe toward a fire exit, disable certain features (e.g., leave dryer on) during drills, or other behaviors that may be adjusted to achieve a personalized drill behavior and/or personalized behavior for an actual emergency. By providing customization, users may be capable of providing an environment specific to the arrangement of the devices, layout of the building, or user preferences that reduces exit time. In fact, these settings may be fine tuned as part of the game scheme to encourage users to attempt different settings to determine which are more helpful for the user in the specific type of drill.

The hazard detection unit may provide a user with a safety report, e.g., a report including a summary of alarms and pre-alarms that may have been generated during the past month or another time period. The safety report may be generated by the hazard detection unit, an online management account, or an application program and provided to the user. This report may, for example, allow users to review changes in detected carbon monoxide levels each month for one or more hazard detection units. Health check monitoring may also be available via the application program.

Networked connected thermostats and/or other network connected devices (e.g., the devices shown in FIG. 1) may be used in combination with this hazard detection unit, and may provide users with integrated features. For example, data obtained from PIR sensors of the hazard detection unit can be provided to a network connected thermostat to improve the accuracy of occupancy detection by the thermostat, and therefore permit a more accurate temperature setting response to occupancy by the thermostat. As another example, the hazard detection unit may communicate a signal over Wi-Fi to a network connected thermostat or HVAC system to turn off the furnace and/or turn on or increase fan speed when the hazard detection unit generates a CO alarm; users may be notified of this communication via email or an application program. Furthermore, smart bulbs may glow different colors based on drill/alert/emergency state.

g. History

Figure 42:
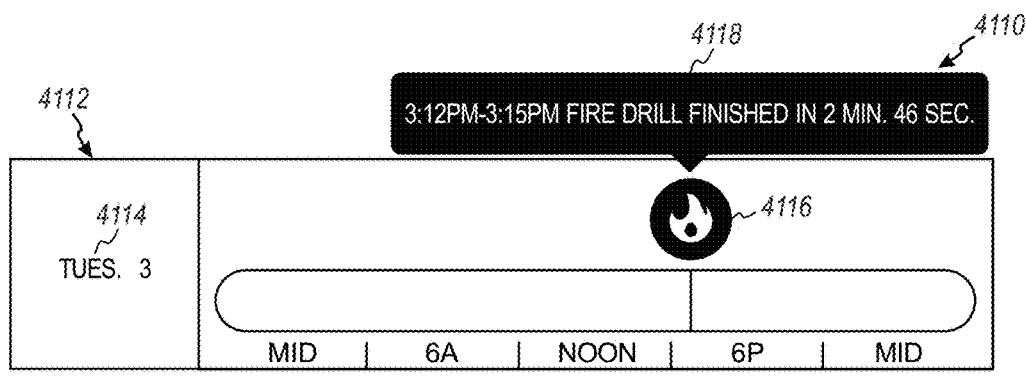
FIG. 42 illustrates a device log that may be used to display previous events on a particular device or network, according to an embodiment.

In some embodiments, completed drills may be tracked by being added to an event log for the hazard detector and/or the smart network. Such event history may be accessible via a device log 4110, as illustrated in FIG. 42. The device log 4110 includes one or more time periods 4112 that include an indicator 4114 to identify the time period displayed in the time period. As illustrated, the time period 4112 corresponds to a single day from midnight to midnight. However, other embodiments may include other periods of time, such as hours, days, weeks, and/or months. The device log 4110 also includes an event indicator 4116 that indicates that an event occurred at some point in the past. The event indicator 4116 can be an icon that indicates the type of event that occurred. Furthermore, the device log 4110 may also include an additional information banner 4118. In some embodiments, the additional information banner 4118 may be presented as long as an event indicator 4116 is present in the device log 4110. However, in certain embodiments, the additional information banner 4118 may appear when the event indicator 4116 is selected (e.g., clicked, moused over, etc.).

Figure 43:
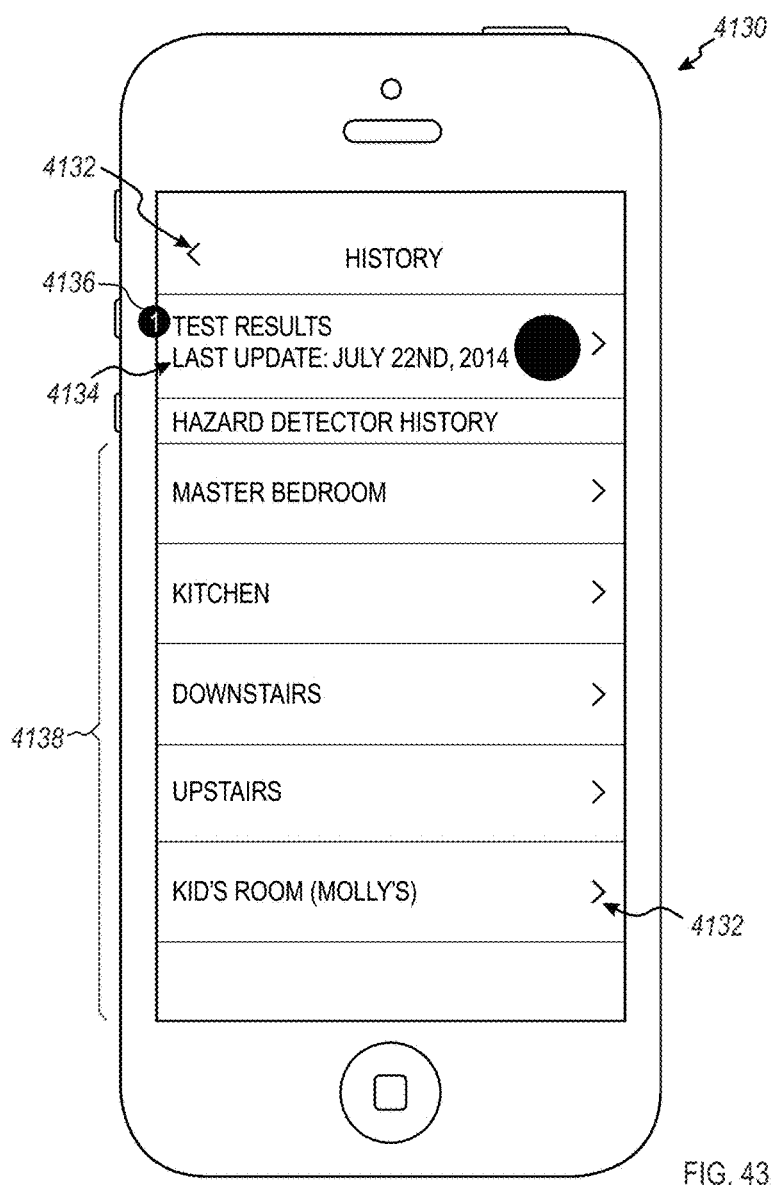
FIG. 43 illustrates a drill history screen that may be displayed to enable review of previous drills, according to an embodiment.

Additionally or alternatively, drill results can be used to enhance test results for the smart devices in the smart network. For example, during the drill, each smart device may run verify that various components (e.g., speaker, sensors, voice, batteries, Internet, network connections, etc.) are functioning properly. Furthermore, during and/or after the drill, each device may perform diagnostics to ensure that the components of the devices are functioning properly. This information may be tracked and reviewed using a history page 4130, as illustrated in FIG. 43. As illustrated, the history page 4130 may be presented via a smartphone via an application program. Additionally or alternatively, the history page 4130 may be accessed by a web browser or application program via any suitable computing device.

As illustrated, the history page 4130 may include navigation icons 4132 that indicate that portions of the history page 4130 may be selected to navigate back to a main menu or drill down further into the history reflected in the history page 4130. The history page 4130 also includes a test results indicator 4134. The test results indicator 4134 may display information about the most recent test results, such as the date of the last test results. Moreover, the test results may also include an indicator of the overall health of the smart network determined from the test. For example, a background for the test results indicator 4136 can change color based on the tests. For example, if important components (e.g., sensors) have not passed the tests, the background may change to red. If less important components (e.g., Internet) have not passed the tests, the background may change to yellow. If all components have passed, the background may be green or blue. If the information has changed in the test results since the last viewing, the test results indicator 4134 may include a notification 4136 of such changes. The history page 4130 may also include an array of devices 4138 that provide a list of the devices available in the smart network and/or the account. In some embodiments, selecting a device from the array of devices 4138 may open a device log (e.g., device log 4110) specific to the devices.

Figure 44:
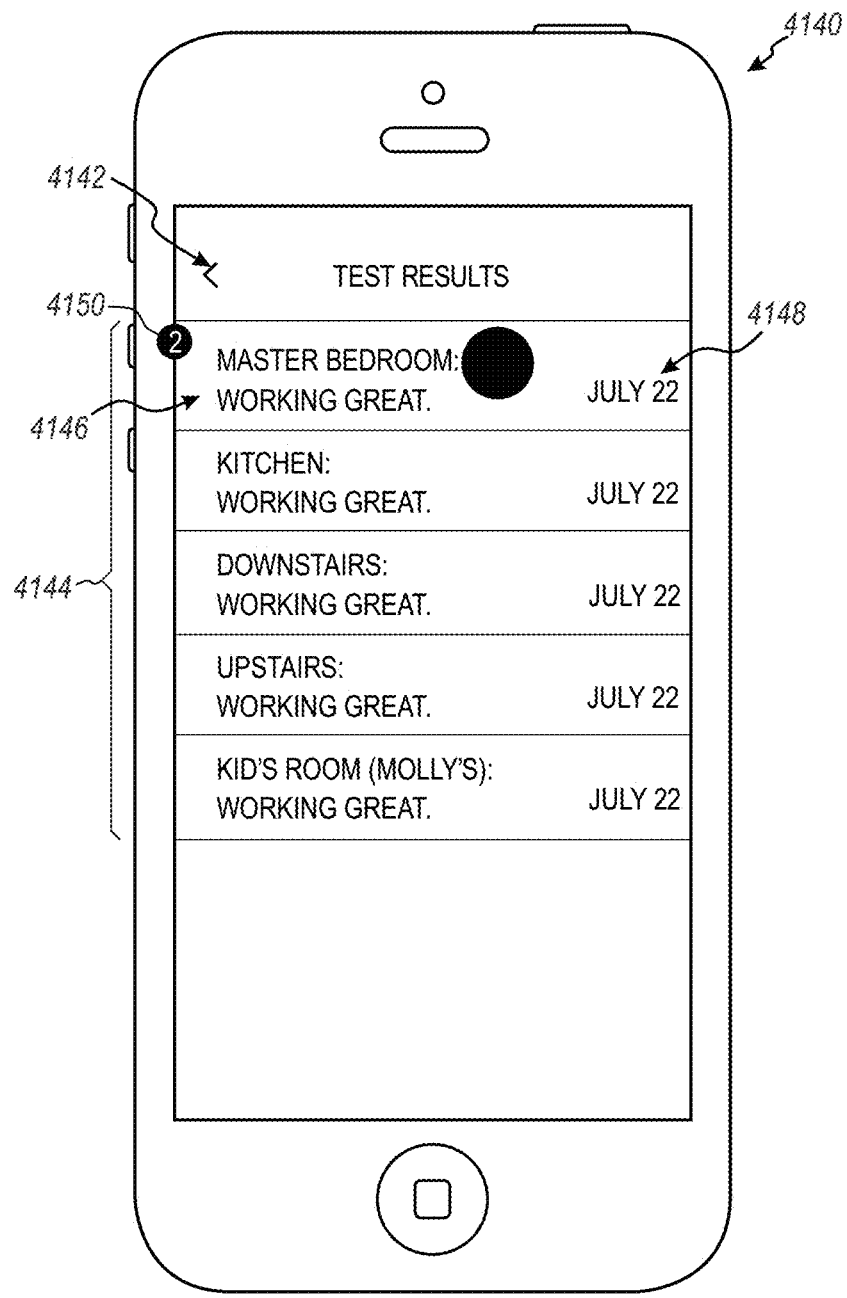
FIG. 44 illustrates test results for a previous drill, according to an embodiment.
Figure 45:
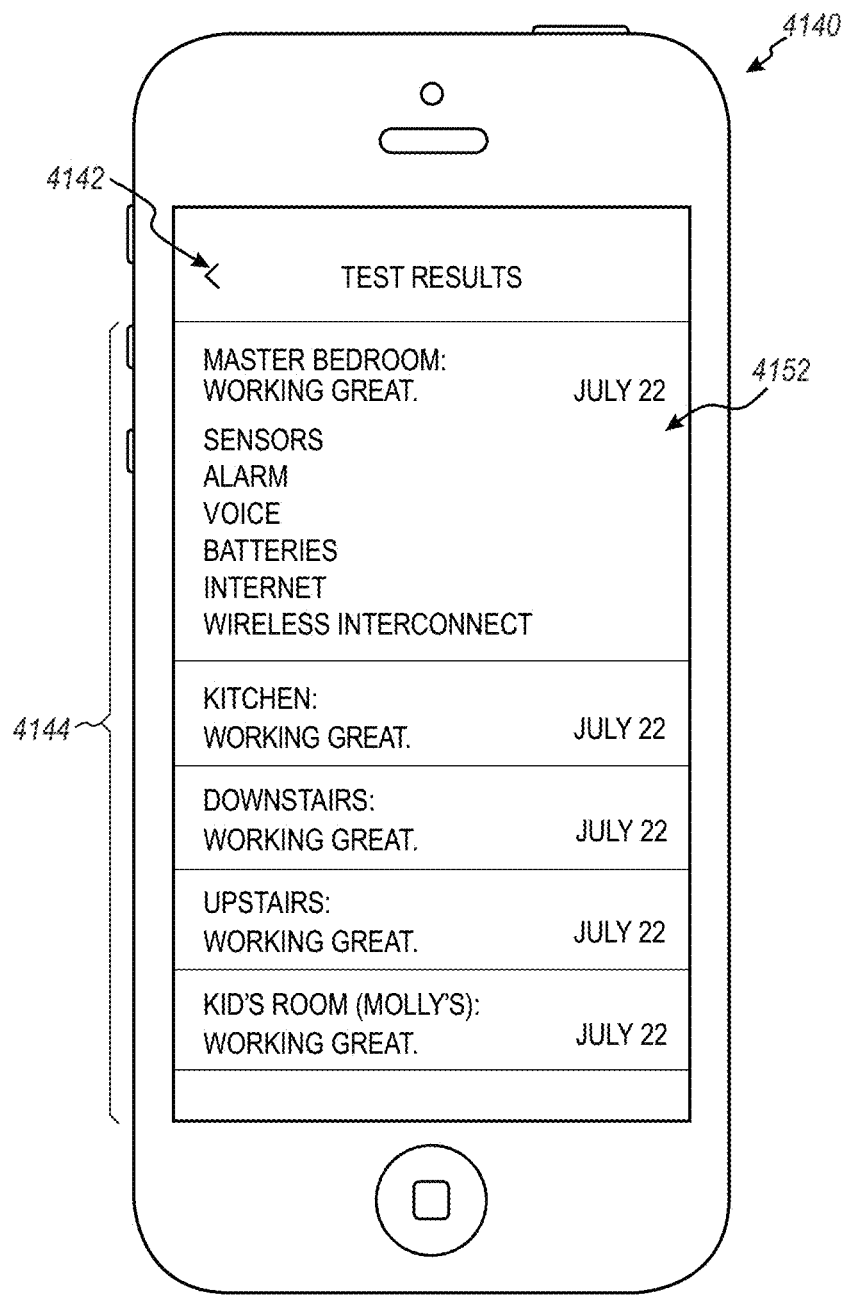
FIG. 45 illustrates a drilled down screen of the test results of FIG. 44, according to an embodiment.

When the test results indicator 4134 is selected a test results page 4140 is opened using the computing device, as illustrated in FIG. 44. From the test results page 4140, a back item 4142 may be selected that navigates the computing device back to the history page 4130. The test results page 4140 also includes a list of devices 4144 that each includes a device test status 4146 and a date 4148 for the most recent results. Each entry may also include a notification 4150 that indicates that whether the specific test results for the device have been viewed since the last change and/or whether significant changes have occurred since the last viewing. When a particular entry is selected, the selected entry may be expanded within the test results page 4140, as illustrated in FIG. 45. In other words, the remaining portions of the list 4144 are pushed down upon selection of the entry. In some embodiments, when viewing the expanded results, each component of the device corresponding to the entry may be presented along with its status. In certain embodiments, the statuses for the components in the device may be manually changed. For example, if a user replaces the batteries since the recent test, the user may change the status from failed to passed. However, in some such embodiments, a new test results entry may be created by copying the previous test and replacing and/or conducting a new diagnostic test.

h. Edge Cases

In some embodiments, a currently running drill may cease before a user indicates that the drill has been completed (e.g., power loss, network loss, actual emergency, etc.)

i. Power Off

Figure 46:
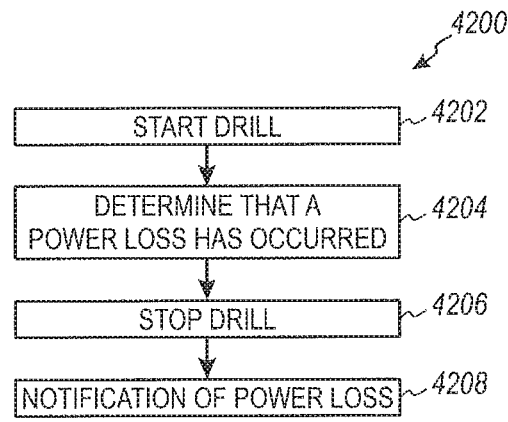
FIG. 46 illustrates a process for handling a power loss during a drill, according to an embodiment.

FIG. 46 illustrates a process 4200 for dealing with a power loss during a drill. After a smart device has started a drill (block 4202), a smart device determines that power loss has occurred (block 4204). The device detecting power loss and initially starting the drill may be different devices. Instead, the device determining that the power loss has occurred may start a drill locally in response to receiving a drill initiation message from other devices. For example, a hazard detector may determine that line power has ceased and that the hazard detector is using battery power. To conserve battery power, the smart device may stop the drill (block 4206). For example, the smart device may send messages to other devices to cease drilling. In some embodiments, stopping the drill includes notifying (e.g., audibly, visually, etc.) drill participants of the drill ending. The smart device can also send notifications to the service and/or participants indicating that the drill was halted due to the power loss (block 4208). For example, notification may be sent to the service that causes the service to send notification to an application program (e.g., running on a smart phone) to be viewed by an administrator for the smart network.

Although the foregoing contemplates a power loss, drilling may also be halted if connectivity is lost between devices. For example, if the devices determine that connectivity between the devices have cease, each device may locally stop the drill and notify (e.g., audibly, visually, via electronic message, etc.) that the connection between devices has terminated.

ii. Real Alarm

Figure 47:
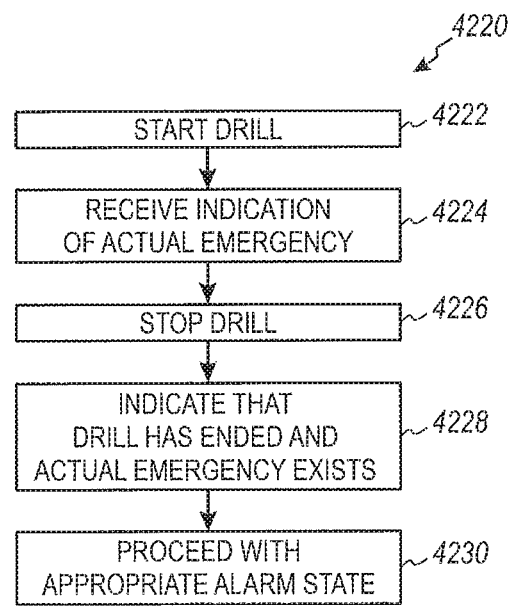
FIG. 47 illustrates a process for handling an actual emergency during a drill, according to an embodiment.

FIG. 47 illustrates an embodiment of a process 4220 where an actual emergency begins during an alarm. While a device is drilling (block 4222), the device receives an indication that an actual emergency exists (block 4224). This indication may be direct determination of emergency using sensors or indirect determination via an electronic message indicating that another device has determined that an actual emergency has occurred. In response to the indication, the device stops the drill (block 4226). In some embodiments, a stop drill signal is propagated through the smart network. In certain embodiments, the indication is propagated alone and used to indicate that the drill should stop on all devices. The device also indicates that the drill has ended and that an actual emergency exists (block 4228). For example, in some embodiments, the device may audibly state "The drill has ended, because there is a fire in the bedroom." Additionally or alternatively, displayed text and/or colors may change from drill representations to actual emergency representations. In some embodiments, each device makes such notifications as soon as possible. Additionally or alternatively, the devices attempt to coordinate notifications to synchronize announcements. After the notification has been made, the device may proceed with the appropriate alarm state (block 4230). For example, the device may proceed with normal protocols related to fire or CO detection. In some embodiments, the notification of drill ending may be repeated periodically during the alarm for the actual emergency.

III. Hazard Detector Devices

Additional features and functions may be added to the hazard detection unit over time (e.g., after a user purchases a hazard detection unit or after the hazard detection has shipped to retailers). The hazard detection unit may already include the hardware necessary to support these additional features and functions, and software updates may be applied to the hazard detection unit to add these additional features and functions. Examples the additional functions and features are described below.

The hazard detection unit may be calibrated (e.g., at the unit's user interface, an application program or an online management account) based on the location (e.g., the bedroom or the kitchen) in which it is located. This location or room specific calibration may be used to increase the accuracy of the alarms produced by the hazard detection unit, enhancing home safety and reducing the occurrence of false or unnecessary alarms. For example, when placed near or in a kitchen, the hazard detection unit may be calibrated to be less sensitive to smoke so that an alarm is not unnecessarily generated when a normal level of smoke is produced by cooking or some other safe kitchen activity. However, a hazard detection unit placed in or near a bedroom may be calibrated to be more sensitive to smoke because any level of smoke in a bedroom may not be normal and may justify generating an alarm. Smoke level data collected over time by the hazard detection unit may be used to determine common and uncommon smoke levels and to adjust the location specific calibration accordingly (e.g., the sensitivity of the hazard detection unit may be calibrated to only generate alarms when uncommonly high levels of smoke are detected). In addition, as users hush or silence hazard detection units (e.g., by waving or manually hushing the alarm), the hazard detection unit may learn what hazard levels the user associates with necessary alarms. For example, this learning hush feature may learn over time that certain smoke levels in the kitchen are typically hushed while others are not typically hushed. Thereafter, the hazard detection unit may only generate alarms when smoke levels are detected that were not historically hushed or silenced.

The hazard detection unit may provide users with relevant and actionable information concerning what to do after an alarm has been triggered. This information may be provided during an alarm in the form of speech to help users that may be disoriented by the alarm and/or the danger occurring in a home. In order to familiarize users with this information before an alarm is generated, this information may also be provided during the setup process of the hazard detection unit.

As previously discussed, the hazard detection unit may also include a fire drill feature (e.g., random or scheduled times where an alarm will sound regardless of the presence of any hazards). This fire drill feature may provide users with opportunities to experience an alarm and to practice responding to it. In order to prevent confusion, the hazard detection unit's fire drill alarm may indicate that it is a fire drill alarm, not a real alarm.

Occupancy information may be detected by a hazard detection unit so that it can be provided at an application program during an alarm or drill. For example, during an alarm or drill, the application program may provide a notification that "A person was in Bedroom 1 at 11:21 p.m. last night." In order to avoid providing information that is no longer accurate, this notification may only be provided if the occupancy information is updated shortly before an alarm is generated.

Embodiments of this hazard detection unit listed under UL 268 may compatible with a Security Control Panel. A dongle may be used to connect the hazard detection unit to security control panels over 4-wire connections.

In addition to being able to utilize Wi-Fi, the hazard detection unit may be able to create or join other networks (e.g., 6LoWPAN or other low-power communication protocols). These other networks may be used to wirelessly connect to a multiplicity of network connected devices (e.g., the devices shown in FIG. 1).

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

As briefly described above, the light ring of the disclosed hazard detector, such as the Nest Protect™, may be used to provide a halo appearance of light around and behind the lens button of the hazard detector, being particularly useful as a method of communicating with a nearby user. For some embodiments, the light ring is configured to receive light from a plurality of light sources (e.g., a plurality of light pipes or light conduits, a plurality of strategically placed LEDs, or other methods of light transfer or creation) and to distribute that light in one of a spatially varying manner around the light ring (e.g., different light intensities and/or colors at different radial angles, ranges of radial angles, or radial zones around the center of the ring when viewed from the front), a time-varying manner, or temporospatially varying manner so as to provide certain predetermined visual effects that serve as certain predetermined communication signals for perception by nearby occupants. Although it is not outside the scope of the present teachings for the hazard detector to be provided with a dot-matrix display or LCD screen (such as those provided on smartphones) for communicating status and other information to a user, the light ring and associated methodologies as described herein have been found to provide an informative, visually pleasing, and compelling user interface experience that promptly and effectively provides useful visual communication without requiring the close proximity and degree of eye focusing effort associated with reading a dot-matrix display screen.

For one embodiment representative of one such communication methodology, there are provided judiciously persistent, and yet at the same time pleasant, communications to nearby occupants regarding a status of the hazard detection unit by the use of a modulated glow of halo light emitted by the light ring. For some embodiments, the modulated glow of halo light is emitted responsive to one or more triggers indicating that it may be useful to communicate status information to a nearby occupant, wherein the time pattern, spatial pattern, color, or other visual characteristic of the modulation is representative or indicative of a particular condition to be communicated to the occupant and/or recommended action to be taken by the occupant. One example of a triggering event may be the shutting off of a room light as detected by an ambient light sensor of the hazard detection unit. Examples of the type of modulated glow can include a fade-in uniform glow of a pleasant color or non-alarming color, such as green, to communicate a reassurance that the status of the hazard detector is "everything is okay." The fade-in glow can comprise, for example, a one-second ramp-up of light intensity from dark to bright, followed by a one-second glow at full brightness, followed by a one-second fade-out from bright to dark. Advantageously, the temporal variation enhances the ability of the user to notice the advisory light even when they were not directly looking at it, while at the same time the color and fade-in nature of the glow maintains a degree of pleasantness. Advantageously, at the same time, battery life of battery-powered versions of the hazard detection unit is preserved by virtue of the temporary nature of the modulated glow. Another type of modulated glow, which can optionally be combined with a fade-in characteristic, is a rotating halo-sweep effect, which emulates the visual effect of one or more point light sources traveling around a perimeter of the circle, each of them leaving a comet-like tail of light in its wake.

Another example of a type of modulated glow can be a fade-in glow of a somewhat more concerning color, such as yellow, to suggest that the user may want to investigate one or more anomalous, but not necessarily severe, conditions that have been determined to be present. An example of such a condition could be that a charge level of a battery on-board the hazard detector is starting to get low, although not low enough for mandatory replacement, and should be replaced in the reasonably not-too-distant future. It will be appreciated by one skilled in the art that this type of advance notification for a low-battery condition in a hazard detector will promote a relatively pleasant user experience in comparison to that provided by many conventional smoke and/or CO detectors currently on the market, which are configured to act only when the battery becomes low enough to require mandatory replacement in the form of intermittently emitted short loud chirps, chirps which can often awake sleeping occupants, whose frustration is then often exacerbated by a need to empirically localize which of multiple installed units is actually emitting the chirp, and whose safety can then often be compromised by a sleepy decision to simply remove the battery "temporarily" and replace it during waking hours. Notably, although the hazard detection unit is preferably configured to indeed emit such short loud chirps when the battery does indeed require mandatory replacement for purposes of maintaining consistency with governmental or industry regulations, such unpleasantness is often advantageously avoided by virtue of the above-described advance yellow modulated-glow notifications which lead to battery replacement prior to reaching the low mandatory-replacement levels. It is to be appreciated that although "yellow" is used herein to identify a "concerning" color, it is representative of any of a variety of "concerning" colors or color combinations that can be used according to the present teachings to indicate an anomalous condition.

According to some embodiments, the triggered yellow modulated glow provided by the light ring can be indicative of the presence of one or more of a plurality of different potential anomalous conditions, and the yellow modulated glow serves as an invitation to the user to make an inquiry into the particular nature of the detected anomalous condition(s). For some embodiments, the yellow modulated glow is stored at a cloud server of a web-based service associated with the smart, network-connected hazard detector, to which the user can log on using their personal computer, tablet, or smartphone to investigate the particular status of the unit. For purposes of battery conservation in battery-only units that connect to the cloud service by Wi-Fi connection through a conventional home router, the hazard detection unit is configured to upload status information to the cloud service by Wi-Fi connection only upon the occurrence of particular events (such as the user pressing the lens button, alarm or pre-alarm conditions, the detection of a user waving their hand at the unit as detected by onboard PIR/ultrasonic sensors, etc.), or if no such events have occurred recently, then at least once every 12 or 24 hours. Alternatively or in conjunction with user inquiry to the cloud server, the nature of the particular anomalous condition indicated by the yellow modulated glow can be communicated directly by the hazard detector using a real-time audio (or audiovisual) response to a user inquiry made directly thereto upon perceiving the yellow modulated glow. For some embodiments, the real-time audio response can be made to the user using a computer-synthesized or pre-recorded voice emitted using an onboard speaker (e.g., "The yellow light was shown because my battery is starting to get low.") For some embodiments, the user inquiry to evince this response upon seeing the yellow modulated glow can be made by virtue of pressing the lens button. For some embodiments, the user inquiry is established by virtue of a back-and-forth wave gesture made by the user's hand while the user is facing the unit, the unit having one or more sensors capable of detecting the wave gesture motion as described in the commonly assigned U.S. Ser. No. 61/847,906, supra. For some embodiments, as discussed in U.S. Ser. No. 61/847,906, supra, a combination of PIR and ultrasonic sensor information is used to detect a user wave gesture motion without requiring optical sensing/optical recognition techniques, thereby providing an advantage of enabling the wave gesture recognition while also keeping electrical power requirements suitably low to preserve battery life in battery-only units. However, it is to be appreciated that the scope of the present teachings is not so limited, and that other inquiry methods and detection techniques can be used without departing from the scope of the present teachings including, but not limited to, optical recognition techniques (i.e., visually "seeing" the user waving their hand), audio or speech recognition techniques (e.g., the user clapping their hands twice or saying "please explain the yellow light" or similar such inquiries), ambient light sensing techniques (e.g., the user flipping the room light switch on and off three or more times), or other methods.

In one scenario provided according to one or more embodiments that shows the usefulness and appeal of such features, the hazard detection unit may be installed in the bedroom of a child who is being tucked in by her mother for the night. After tucking in the child, the mother turns the light out as she walks toward the door. Just then, the hazard detection unit senses the turning off of the light by virtue of the on-board ambient light sensor, and then proceeds to show a fade-in uniform glow for a short time (e.g., two to three seconds) of a pleasing green color using the light ring. The mother sees the light out of the corner of her eye as she walks out the door and is pleasantly reassured that the hazard detection unit, which will be in her child's midst throughout the night, is signaling that no anomalies are detected, and she is pleased that she installed the hazard detection unit in furtherance of keeping her child and family safe. In an alternative scenario in which the yellow modulated glow is presented and perceived by the mother, the mother hesitates, walks toward the unit, and waves her hand in a wave gesture. As she is waving or very shortly thereafter, she hears the unit say "My battery is starting to get low, please replace in the near future." While knowing she should take some action reasonable soon to have the battery replaced, she is pleasantly reassured in knowing her family will not be woken up by irritating chirps in the middle of the night, and that there are otherwise no anomalies reported other than the battery issue by the unit. As an alternative to hand wave gesturing to the unit, the mother can walk out and close the child's bedroom door, and then access her web site account corresponding to the unit using her computer, tablet, or smartphone to see the reason for the yellow modulated glow. Providing a smart, network-connected household hazard detector that uses a modulated light glow such as can be provided by a halo light having temporal, spatial, or temporospatial modulation to facilitate seamless, easily-perceived yet information-rich communications with users has been found to substantially increase user appeal, which can advantageously increase the ubiquity of smart, network-connected household hazard detectors, which can in turn prove to be a boon for household safety and public safety.

According to some embodiments, a judiciously invoked lighting feature, which is termed herein a pathlighting feature, is also provided by virtue of the light ring (or other light-emitting element mounted upon or associated with the hazard detector) in conjunction with one or more ambient light sensors mounted on or associated with the hazard detector. According to some embodiments, the hazard detection unit is configured to emit a predetermined amount of illumination at a predetermined power level upon the detection of motion by the one or more motion sensors of the hazard detector. According to some embodiments, the hazard detector is configured to detect the presence of one or more conditions indicating that there is an occupant likely requiring additional ambient light in moving from one location to another, and to actively emit an amount of light sufficient to facilitate that occupant movement. Preferably, a determination of conditions sufficient to trigger an emitting of supplemental light takes into account a combination of (i) at least one user-induced sensor reading by the hazard detector, such as the sensing of user movement in the room or hallway (such as by a PIR or active motion detector, low-light-sensitive video sensor, heat sensor, etc.) and/or the sensing of an audible user request (e.g., a voice command from the user saying "light my path" or "pathlight"), (ii) at least one current ambient light level reading, and (iii) at least one historical ambient light level reading. Thus, for example, if the user is not making motions consistent with a significant change of location in the room or hallway, or if the room is not dark enough to require additional ambient lighting in view of the historical lighting pattern of the room, then no light is output from the hazard detector.

For some embodiments that are particularly advantageous for battery-only hazard detector units in preserving power, the intensity of the light emitted is adaptive, such that the particular amount of marginal light supplied is not substantially greater than the particular amount of marginal light needed by the human occupant to achieve the goal of moving from one place to the other in the room or hallway in a reasonably safe manner. Preferably, the adaptation response of the human visual system is taken into account in determining both the need for additional illumination and the amount of additional illumination provided. Advantageously, in addition to preserving electrical power for embodiments in which the hazard detector is a battery-only unit, the limiting of the light intensity may also lead to a more optically comfortable experience for the moving occupant.

Thus, in one scenario illustrating the features and advantages of one or more described embodiments, a student who has been studying under relatively bright ambient lighting for several hours decides to pull down all window shades, turn off the light, and crawl into bed. However, 20 seconds after lying down, the student realizes they have not brushed their teeth and stands up at the side of the bed to walk toward the door. Upon detecting the student standing up at the bed, the hazard detector emits light at a first level as the student walks toward and out the door to the bathroom. When implemented according to some embodiments, that first light level is substantially brighter than a second level of light that would be provided by the hazard detector in an alternative scenario in which the student had performed all those same actions, but had instead been studying under relatively dim light for those several hours. This is because the student's eyes would not need as much light since they had already been adjusted to a low light level just before turning out the light 20 seconds earlier. Furthermore, that first light level is substantially brighter than a third level of light that would be provided by the hazard detector in a different alternative scenario in which the student had performed all those same actions, but had instead has been lying in bed for 20 minutes before realizing they had not brushed their teeth. The third level of light can be substantially dimmer than the first level of light, because the human visual response of the student has had 20 minutes to adapt to the darkness, such that relatively little light is needed for safe passage to the door of the room, and indeed such that the student may even have experienced some degree of discomfort (squinting) if the relatively bright first amount of light had been provided.

Certain embodiments describing features or characteristics that may accompany or be used alternatively to the above-described status communication methods and/or pathlighting methods are presented here by way of example and not by way of limitation. For some embodiments, the wave gesture recognition feature associated with the above status communications method can have a default "enabled"

status, but can be disabled by the user by logging on to their account at the web-based cloud service provider and accessing a corresponding feature enable/disable menu. For other embodiments, the wave gesture recognition feature can have a default "disabled" status, but can be enabled by the user by logging on to their online account. For some embodiments, the described automated pathlighting feature can have a default "disabled" status, but can be enabled by the user by logging on to their online account. For other embodiments, the pathlighting feature can have a default "enabled" status, but can be enabled by the user by logging on to their online account.

For some embodiments, a variety of different triggers by which the hazard detector may be caused to communicate status information to users can be used including, but not limited to: upon sensing a first entry of an occupant into a space, such as by motion detection, after predetermined period of vacancy in that space; upon sensing a substantial vibration, such as by an onboard accelerometer, that may be indicative of a nearby door being closed or opened; upon sensing an audio sound similar to that of a door being opened or closed; upon a user request for status actuated by pressing a button on the device; upon a user voice request for status information (e.g., "Present device status"); after sensing an entrance of a new occupant in an already-occupied room, such as by automated facial recognition, or by RFID, NFC, or other electromagnetic signature associated with the new entrant's smartphone or other wearable device; upon sensing a substantial pressure change that may be indicative of a window or door being opened or closed; upon a sensed or communicated "scene change" to a room in the form of modified lighting, modified window shade positioning, modified entertainment system settings, or other "scene change"; upon detecting the presence of more occupants than a predetermined number of occupants or more than a learned "normal" number of occupants; or more generally, upon the happening of one or more sensed events and/or received communications by which, when assessed in view of one or more predetermined or learned parameters, a conclusion or inference can be made that it would be useful to communicate a device status to an occupant. For some embodiments, a variety of different triggers by which the hazard detector may be caused to light a path for an occupant, or otherwise increase an ambient light level in a space, can be used including, but not limited to: receiving a voice command from the occupant; sensing that a bright television in a relatively dim room has been turned off; sensing general or specified audio activities during sleeping hours after a substantial period of quiet (e.g., the creaking of a bedframe or floorboards); or more generally upon the happening of one or more sensed events and/or received communications by which, when assessed in view of current and historical ambient light measurements and one or more other predetermined or learned parameters, a conclusion or inference can be made that it would be useful to increase an ambient light level in a space for the benefit of an occupant.

Certain embodiments describing features or characteristics that may accompany or be used alternatively to the above-described status communication methods and/or pathlighting methods are presented here by way of example and not by way of limitation. While the use of a halo light represents one particularly effective physical configuration for emitting modulated light patterns recognizable from multiple distances, other configurations such as multiple concentric haloes, multiple individual lights of varying shapes, a single individual point light judiciously time-modulated, or multiple individual point lights arranged in regularly or irregular patterns can be used. While communicating a status of the hazard detector itself based on information represents one particularly advantageous set of information to communicate, any of a variety of other statuses associated with the household or family can be communicated by the above-described status communication methods including, but not limited to: a general or specific security status of the home (showing, for example, the green modulated glow to communicate an "all is well" status, a yellow modulated glow if the garage door is still open at a late evening hour); a general or specific network status of the home network (e.g., the router/modem has lost broadband communication with the ISP); a general or specific household operational status (e.g., a yellow modulated glow if the sprinkler system malfunctioned last night); a general or specific household efficiency status (e.g., the gas pool heater has exceeded a predetermined cost threshold for the month); a general or specific household obligational status (e.g., a yellow modulated glow if a past-due e-mail from a utility company, paid content provider, or communications company has been received); or any of a variety of other predetermined or learned household-related or family-related statuses for which a trigger, conclusion, or inference can be established that it would be useful to communicate such household-related or family-related status to a user.

According to some embodiments in which an audible voice or audible sound is used to communicate with the user, the hazard detection unit is configured to automatically vary the loudness of the speaker according to a static and/or dynamic audio profile of the room or hallway in which it is installed. Thus, for example, if the communication is to be made during a time of high ambient noise (e.g., the kids are playing loudly or visitors are shouting at the football game on television), then the loudness of the speaker is increased, whereas if it is currently quiet and there has been an extended period of quiet, the loudness of the speaker can be decreased.

In view of the described embodiments hereinabove and hereinbelow, it will be recognized by those of skill in the art that various modifications, alternative constructions, and equivalents may be used without departing from the spirit of the disclosure. By way of example, various user interfaces for operating hazard detectors, HVACs and other devices have been provided yet the designs are meant to be illustrative and not limiting as to the scope of the overall disclosure. By way of further example, while methods and systems have been described for receiving hazard detection and hazard detector status information, it is contemplated that these methods may be applied to receive and/or communicate other information. It is to be further appreciated that the term hazard detector, as used hereinabove and hereinbelow, can include hazard detectors having direct wired connection with hazard response systems, and can further include hazard detectors that do not connect directly with the hazard response systems, but that provide alerts concerning detected potential hazard conditions. By way of further non-limiting example, although it has been found particularly advantageous to provide one or more of the above-described event-triggered modulated-light-glow device status communication methods in the context of a hazard detector not outfitted with a dot-matrix display, it is to be appreciated that the scope of the present teachings is not so limited, and that in other embodiments such event-triggered modulated-light-glow device status communication methods can be provided in a hazard detection unit that does provide a dot-matrix display that can be read at close-up range. For some embodiments, the above-described event-triggered modulated-light-glow device status communication methods can be provided by the dot-matrix display itself without requiring a separate light ring or other light-source pattern, wherein the visual effects of the above-described event-triggered modulated-light-glow device status communication methods are provided by the dot-matrix screen itself. In still other embodiments, the hazard detector uses its presence detection and proximity detection modules to determine whether a detected occupant is close enough to the unit to read the dot-matrix display, wherein the status information is set forth in text form or other more conventional electronic display form if the user is close enough to read it, but wherein the status information is set forth using modulated-light-glow methods similar to those described hereinabove if the user is not close enough to read the conventional dot-matrix display form of the information. By way of further non-limiting example, although it has been found particularly advantageous to provide one or more of the above-described user interface buttons and event-triggered modulated-light-glow device status communication methods in the context of a household hazard detector, it is to be appreciated that the hardware and software for carrying out such apparatus and methods can be provided in conjunction with any of a variety of different household devices including, but not limited to, thermostats, security panels, security-related devices, security-related displays, household appliances, network communication equipment, lighting fixtures, household service robots, HVAC equipment, irrigation equipment, entertainment devices and systems, doorbell or other entryway automation systems, and more generally any of the devices or systems set forth or associated with the smart-home environment of FIG. 1, supra, without departing from the scope of the present teachings.

By way of still further non-limiting example, although it has been found particularly advantageous to provide one or more of the above-described pathlighting functionalities, up to and including a user-adaptive and ambient-light-adaptive pathlighting functionality, in conjunction with a household hazard detector, with one particular advantage being directed to increasing the ubiquity of household hazard detectors (a benefit to both private household safety and public safety) by increasing their popularity by favorable impressions upon users by virtue of the pathlighting functionality, with another particular advantage conversely to improve night time safety by virtue of promoting at least as many pathlighting devices as there are hazard detectors in homes, it is to be appreciated that the hardware and software for carrying out such pathlighting methods can be provided in conjunction with any of a variety of different household devices including, but not limited to, thermostats, security panels, security-related devices, security-related displays, household appliances, network communication equipment, lighting fixtures, household service robots, HVAC equipment, irrigation equipment, entertainment devices and systems, doorbell or other entryway automation systems, and more generally any of the devices or systems set forth or associated with the smart-home environment of FIG. 1, supra, without departing from the scope of the present teachings.

The invention claimed is:

1. A method for conducting a drill comprising:
    receiving, at an electronic device, an indication to conduct a drill via a first interface of the electronic device; and
    propagating a drill state corresponding to the drill via a second interface of the electronic device, wherein the first and second interfaces are configured to connect to different interface types.

2. The method of claim 1, wherein first interface of the electronic device comprises a Bluetooth wireless interface.

3. The method of claim 1, wherein the second interface of the electronic device comprises an 802.15.4 or 802.11 wireless interface.

4. The method of claim 1, wherein receiving the indication is received at a hazard detector.

5. The method of claim 1, wherein receiving the indication is received from a cellular phone.

6. An electronic device comprising:
    an input interface;
    a wireless interface having a first wireless interface type;
    a processor; and
    memory storing instructions thereon, that when executed, are configured to cause the processor to:
    receive, via the input interface, an indication to conduct a drill via the first interface; and
    send a drill command to a network device via the wireless interface that is configured to cause the network device to propagate the drill command to other network devices via a network wireless interface having a second wireless interface type.

7. The electronic device of claim 6, wherein instructions are configured to cause the processor to:
    determine that the drill has ended; and
    after the drill has ended, present a checklist of recommended actions during the drill.

8. The electronic device of claim 7, wherein the instructions are configured to cause the processor to:
    determine whether any recommended actions have not been checked; and
    for each recommended action unchecked, present explanations for the unchecked recommended actions.

9. The electronic device of claim 8, wherein the instructions are configured to cause the processor to provide a selectable link to additional information, safety organizations, or statistics for the unchecked recommended actions.

10. The electronic device of claim 6, wherein the instructions are configured to cause the processor to display drill results for the drill after completion.

11. The electronic device of claim 10, wherein the instructions are configured to cause the processor to present the drill results relative to previously completed drills or previously input goals.

12. The electronic device of claim 11, wherein the instructions are configured to cause the processor to present the drill results relative to similarly sized locations or locations in a similar area.

13. The electronic device of claim 6, wherein the instructions are configured to cause the processor to:
    determine that a period of time since a previous drill has exceeded a drilling period threshold; and
    present a reminder that a drill should to be conducted.

14. A method for initiating a drill comprising:
    receiving, via an input interface of an electronic device, an indication to conduct a drill via the first interface; and
    sending a drill command to a network device via a wireless interface of the electronic device having a first wireless interface type that is configured to cause a remote device to propagate the drill command to network devices via a network wireless interface having a second wireless interface type.

15. The method of claim 14, wherein the first interface type is an 802.15.1 interface type and the second interface type is an 802.15.4 or 802.11 interface type.

16. The method of claim 14 comprising:
determining that the drill has been completed; and
causing drill results for the completed drill to be sent to a remote service to cause a reduction in insurance costs.

17. The method of claim 16 comprising:
anonymizing the drill results;
presenting a confirmation screen prior to sending the drill results; and
sending the anonymized drill results only when approval is given to send the drill results.

18. The method of claim 14 comprising instructing a user to take a photograph at a predesignated meeting location after the drill has been completed.

19. The method of claim 18 comprising posting the predesignated meeting location to a social media site after the photo has been taken.

20. The method of 18 comprising tagging the location of the photograph as the predesignated meeting location for a drilling location.

* * * * *